US011437017B2

(12) United States Patent
Kephart et al.

(10) Patent No.: US 11,437,017 B2
(45) Date of Patent: Sep. 6, 2022

(54) EMBODIED NEGOTIATION AGENT AND PLATFORM

(71) Applicants: International Business Machines Corporation, Armonk, NY (US); RENSSELAER POLYTECHNIC INSTITUTE, Troy, NY (US)

(72) Inventors: Jeffrey Owen Kephart, Cortlandt Manor, NY (US); Hui Su, West Roxbury, MA (US); Maira Gatti de Bayser, Rio de Janeiro (BR); Melina de Vasconcelos Alberio Guerra, Rio de Janeiro (BR); Rahul Divekar, Troy, NY (US); Matthew Peveler, Troy, NY (US); Xiangyang Mou, Troy, NY (US); Lisha Chen, Troy, NY (US)

(73) Assignees: International Business Machines Corporation, Armonk, NY (US); RENSSELAER POLYTECHNIC INSTITUTE, Troy, NY (US)

( * ) Notice: Subject to any disclaimer, the term of this patent is extended or adjusted under 35 U.S.C. 154(b) by 0 days.

(21) Appl. No.: 16/937,342

(22) Filed: Jul. 23, 2020

(65) Prior Publication Data
US 2022/0028366 A1 Jan. 27, 2022

(51) Int. Cl.
*G10L 15/26* (2006.01)
*G10L 13/04* (2013.01)
(Continued)

(52) U.S. Cl.
CPC ............ *G10L 13/04* (2013.01); *G06T 13/205* (2013.01); *G10L 13/10* (2013.01); *G10L 15/26* (2013.01);
(Continued)

(58) Field of Classification Search
CPC ......... G10L 13/04; G10L 13/10; G10L 15/26; G10L 21/10; G10L 2021/105; G06T 13/205
(Continued)

(56) References Cited

U.S. PATENT DOCUMENTS 7,103,580 B1   9/2006 Batachia et al.
7,373,325 B1   5/2008 Hadingham et al.
(Continued)

OTHER PUBLICATIONS

G. Zoric, K. Smid and I. S. Pandzic, "Automatic facial gesturing for conversational agents and avatars," Proceedings of the 2005 International Conference on Active Media Technology, 2005. (AMT 2005)., 2005, pp. 505-510, doi: 10.1109/AMT.2005.1505411. (Year: 2005).*

(Continued)

*Primary Examiner* — Bharatkumar S Shah
(74) *Attorney, Agent, or Firm* — Anthony Curro; Otterstedt & Kammer PLLC

(57) ABSTRACT

Human speech signals that are uttered within an environment are transcribed; the environment includes one or more avatars representing one or more software agents; the human speech signals are directed to at least one of the avatars. At least one non-speech behavioral trace is obtained within the environment; the trace is representative of non-speech behavior directed to the at least one of the avatars. The transcribed human speech signals and the at least one non-speech behavioral trace are forwarded to the one or more software agents. A proposed act is obtained from at least one of the agents; responsive thereto, a command is issued to cause the avatar corresponding to the software agent from which the proposed act is obtained to emit synthesized speech and to act visually in accordance with the proposed act.

20 Claims, 40 Drawing Sheets

(51) Int. Cl.
  *G10L 21/10* (2013.01)
  *G06T 13/20* (2011.01)
  *G10L 13/10* (2013.01)
(52) U.S. Cl.
  CPC ........ *G10L 21/10* (2013.01); *G10L 2021/105* (2013.01)
(58) Field of Classification Search
  USPC ........................................................ 704/258
  See application file for complete search history.

(56) References Cited

U.S. PATENT DOCUMENTS

| | | | |
|---|---|---|---|
| 7,756,772 | B1 | 7/2010 | Konopnicki et al. |
| 9,530,412 | B2 | 12/2016 | Selfridge |
| 2004/0138957 | A1 | 7/2004 | Bartolini et al. |
| 2008/0235581 | A1* | 9/2008 | Caporale ................. A63F 13/12 715/706 |
| 2008/0306864 | A1 | 12/2008 | Foley et al. |
| 2010/0083139 | A1* | 4/2010 | Dawson .................. A63F 13/12 715/757 |
| 2012/0290485 | A1 | 11/2012 | Ozonat et al. |
| 2013/0051548 | A1* | 2/2013 | Chavez ................ G06Q 10/101 379/265.09 |

OTHER PUBLICATIONS

A. J. Cowell and A. K. Cowell, "Avatars in Analytical Gaming," 2009 International Conference on Computational Science and Engineering, 2009, pp. 1174-1179, doi: 10.1109/CSE.2009.448. (Year: 2009).*

B. Limthanmaphon, Yanchun Zhang and Zhongwei Zhang, "An agent-based negotiation model supporting transactions in electronic commerce," Proceedings 11th International Workshop on Database and Expert Systems Applications, 2000, pp. 440-444, doi: 10.1109/DEXA.2000.875063. (Year: 2000).*

N. I. Badler, "Real-time virtual humans," Proceedings The Fifth Pacific Conference on Computer Graphics and Applications, 1997, pp. 4-13, doi: 10.1109/PCCGA.1997.626166. (Year: 1997).*

Rahul Divekar, Xiangyang Mou, Lisha Chen, Maira Gatti de Bayser, Melina de Vasconcelos Alberio Guerra, and Hui Su, "Embodied conversational AI agents in a multi-modal multi-agent competitive dialogue," In Proceedings of the 28th International Joint Conference on Artificial Intelligence Aug. 10, 2019 (pp. 6512-6514). AAAI Press. Grace Period Disclosure.

Rahul Divekar, Hui Su, Jeffrey Owen Kephart, Maira Gatti de Bayser, Melina de Vasconcelos Alberio Guerra, Xiangyang Mou, Matthew Peveler, and Lisha Chen, "HUMAINE: Human Multi-Agent Immersive Negotiation Competition," In Extended Abstracts of the 2020 CHI Conference on Human Factors in Computing Systems Apr. 25, 2020 (pp. 1-10). Grace Period Disclosure.

Traum D, Rickel J. Embodied agents for multi-party dialogue in immersive virtual worlds. InProceedings of the first International joint conference on Autonomous agents and multiagent systems: part 2 Jul. 15, 2002 (pp. 766-773).

Peter Stone. 2003. Multiagent Competitions and Research: Lessons from RoboCup and TAC. In RoboCup 2002: Robot Soccer World Cup VI, Gal A. Kaminka, Pedro U. Lima, and Raul Rojas (Eds.). Springer Berlin Heidelberg, 2003, Berlin, Heidelberg, 224-237.

Zhao R, Wang K, Divekar R, Rouhani R, Su H, Ji Q. An immersive system with multi-modal human-computer interaction. In2018 13th IEEE International Conference on Automatic Face & Gesture Recognition (FG 2018) May 15, 2018 (pp. 517-524). IEEE.

Pp den Akker R, Traum D. A comparison of addressee detection methods for multiparty conversations. Proceedings of DIAHOLMIA. Jun. 24, 2009:99-106.

Rickel J, Marsella S, Gratch J, Hill R, Traum D, Swartout W. Toward a new generation of virtual humans for interactive experiences. IEEE Intelligent Systems. Jul. 2002;17(4):32-8.

Pappu A, Sun M, Sridharan S, Rudnicky A. Situated multiparty interaction between humans and agents. InInternational Conference on Human-Computer Interaction Jul. 21, 2013 (pp. 107-116). Springer, Berlin, Heidelberg.

Baba N, Huang HH, Nakano YI. Addressee identification for human-human-agent multiparty conversations in different proxemics. InProceedings of the 4th Workshop on Eye Gaze in Intelligent Human Machine Interaction Oct. 26, 2012 (pp. 1-6).

Biocca F, Harms C, Burgoon JK. Toward a more robust theory and measure of social presence: Review and suggested criteria. Presence: Teleoperators & virtual environments. Oct. 1, 2003;12(5):456-80.

Bohus D, Horvilz E. Multiparty turn taking in situated dialog: Study, lessons, and directions. InProceedings of the SIGDIAL 2011 Conference Jun. 2011 (pp. 98-109).

Chabot S, Braasch J. An immersive virtual environment for congruent audio-visual spatialized data sonifications. Georgia Institute of Technology. The 23rd International Conference on Auditory Display (ICAD—2017) Jun. 20-23, 2017, Pennsylvania State University p. 203-210.

Chabot S, Lee W, Elder R, Braasch J. Using a multimodal immersive environment to investigate perceptions in augmented virtual reality systems. Georgia Institute of Technology. The 24th International Conference on Auditory Display (ICAD—2018) Jun. 10-15, 2018, Houghton, Michigan p. 168-175.

Chen L, Su H, Ji Q. Face alignment with kernel density deep neural network. InProceedings of the IEEE/CVF International Conference on Computer Vision 2019 (pp. 6992-7002).

Das R, Hanson JE, Kephart JO, Tesauro G. Agent-human interactions in the continuous double auction. InInternational joint conference on artificial intelligence Aug. 4, 2001 (vol. 17, No. 1, pp. 1169-1178). Lawrence Erlbaum Associates Ltd.

Mutlu B, Kanda T, Forlizzi J, Hodgins J, Ishiguro H. Conversational gaze mechanisms for humanlike robots. ACM Transactions on Interactive Intelligent Systems (TiiS). Jan. 13, 2012;1(2):1-33.

Mohammad Y, Viqueira EA, Ayerza NA, Greenwald A, Nakadai S, Morinaga S. Supply chain management world. InInternational conference on principles and practice of multi-agent systems Oct. 28, 2019 (pp. 153-169). Springer, Cham.

Mell J, Gratch J, Baarslag T, Aydoğan R, Jonker CM. Results of the first annual human-agent league of the automated negotiating agents competition. InProceedings of the 18th International Conference on Intelligent Virtual Agents Nov. 5, 2018 (pp. 23-28).

Mell J, Gratch J. IAGO: interactive arbitration guide online. InProceedings of the 2016 International Conference on Autonomous Agents & Multiagent Systems May 9, 2016 (pp. 1510-1512).

Lin R, Kraus S, Baarslag T, Tykhonov D, Hindriks K, Jonker CM. Genius: An integrated environment for supporting the design of generic automated negotiators. Computational Intelligence. Feb. 2014;30(1):48-70.

Katzenmaier M, Stiefelhagen R, Schultz T. Identifying the addressee in human-human-robot interactions based on head pose and speech. InProceedings of the 6th international conference on Multimodal interfaces Oct. 13, 2004 (pp. 144-151).

Randall Jr W. Hill Jr., Jonathan Gratch, Stacy Marsella, Jeff Rickel, William Swartout, and David R. Traum. Virtual humans in the mission rehearsal exercise system. KI special issue on Embodied Conversational Agents. 2003;17(4).

Gravano A, Hirschberg J. Turn-yielding cues in task-oriented dialogue. InProceedings of the SIGDIAL 2009 Conference Sep. 2009 (pp. 253-261).

Gu E, Badler NI. Visual attention and eye gaze during multiparty conversations with distractions. InInternational workshop on intelligent virtual agents Aug. 21, 2006 (pp. 193-204). Springer, Berlin, Heidelberg.

Divekar RR, Mou X, Chen L, De Bayser MG, Guerra MA, Su H. Embodied Conversational AI Agents in a Multi-modal Multi-agent Competitive Dialogue. InIJCAI 2019 (pp. 6512-6514) 2019.

Jonge DD, Baarslag T, Aydoğan R, Jonker C, Fujita K, Ito T. The challenge of negotiation in the game of diplomacy. InInternational Conference on Agreement Technologies Dec. 6, 2018 (pp. 100-114). Springer, Cham.

(56) References Cited

OTHER PUBLICATIONS

Lin et al., Can automated agents proficiently negotiate with humans?, Communications of the ACM 53.1, Jan. 2010, pp. 78-88.
Yang et al., Offer with choices and accept with delay: a win-win strategy model for agent based automated negotiation, ICIS 2009 Proceedings, Jan. 2009, p. 180.
Kraus et al., Resolving crises through automated bilateral negotiations, Artificial Intelligence 172.1, Jan. 2008, pp. 1-18.
Binmore et al., Applying game theory to automated negotiation. Netnomics 1.1, Oct. 1999, pp. 1-9.
Oshrat et al., Facing the challenge of human-agent negotiations via effective general opponent modeling, Proceedings of The 8th International Conference on Autonomous Agents and Multiagent Systems—vol. 1, International Foundation for Autonomous Agents and Multiagent Systems, May 2009 pp. 377-384.
Guttman et al., Cooperative vs. competitive multi-agent negotiations in retail electronic commerce, International Workshop on Cooperative Information Agents, Jul. 1998, 15 pages.
Kephart et al., An embodied cognitive assistant for visualizing and analyzing exoplanet data, (IEEE Internet Computing 23 (2), Mar.-Apr. 2019, pp. 31-39.
Chen et al., A novel strategy for efficient negotiation in complex environments, In German Conference on Multiagent System Technologies, pp. 68-82. Springer, Berlin, Heidelberg, Oct. 2012.
Konovalov et al., The negochat corpus of human-agent negotiation dialogues, In Proceedings of the Tenth International Conference on Language Resources and Evaluation (LREC'16), pp. 3141-3145, May 2016.
Vahidov et al., Human-Agent Negotiations: The Impact Agents' Concession Schedule and Task Complexity on Agreements, In Proceedings of the 50th Hawaii International Conference on System Sciences, Jan. 2017, pp. 412-420.
Prajod et al., The Effect of Virtual Agent Warmth on Human-Agent Negotiation, In Proceedings of the 18th International Conference on Autonomous Agents and MultiAgent Systems, pp. 71-76, International Foundation for Autonomous Agents and Multiagent Systems, May 2019.
Mell, Human-like agents for repeated negotiation, Intelligence 246 Aug. 2017, pp. 34-52.
Oshrat et al., Facing the challenge of human-agent negotiations via effective general opponent modeling, In Proceedings of The 8th International Conference on Autonomous Agents and Multiagent Systems—vol. 1, pp. 377-384, International Foundation for Autonomous Agents and Multiagent Systems, May 2009.
Gratch et al., The Misrepresentation Game: How to win at negotiation while seeming like a nice guy, In Proceedings of the 2016 International Conference on Autonomous Agents & Multiagent Systems, pp. 728-737, May 2016.
Ding et al., Virtual reality negotiation training system with virtual cognitions, In International Conference on Intelligent Virtual Agents, Springer, Cham, Aug. 2017 (ABSTRACT, citations, pp. 119-120) DOI 10.1007/978-3-319-67401-8_14.
Divekar et al., HUMAINE: Human Multi-Agent Immersive Negotiation Competition, In Extended Abstracts of the 2020 CHI Conference on Human Factors in Computing Systems Extended Abstracts, pp. 1-10, Apr. 2020.
Wikipedia, Message passing, downloaded May 14, 2020 from https://en.wikipedia.org/wiki/Message_passing, pp. 1-6.
Plot 3-D Pareto Front—MATLAB & Simulink, downloaded from https://www.mathworks.com/help/gads/plot-3-d-pareto-set.html Apr. 21, 2020 pp. 1-5.
The Legend of Zelda—Wikipedia, downloaded from https://en.wikipedia.org/wiki/The_Legend_of_Zelda Jun. 5, 2020 pp. 1-35.
Allen D, Divekar RR, Drozdal J, Balagyozyan L, Zheng S, Song Z, Zou H, Tyler J, Mou X, Zhao R, Zhou H. The Rensselaer Mandarin Project—A cognitive and immersive language learning environment. InProceedings of the AAAI Conference on Artificial Intelligence Jul. 17, 2019 (vol. 33, No. 01, pp. 9845-9846).
Bulat A, Tzimiropoulos G. How far are we from solving the 2d & 3d face alignment problem?(and a dataset of 230,000 3d facial landmarks). InProceedings of the IEEE International Conference on Computer Vision 2017 (pp. 1021-1030).
Chen L, Ji Q. Kernel density network for quantifying regression uncertainty in face alignment. InNeurIPS Workshops 2018 (vol. 2, No. 3, p. 1-8.).
De Bayser MG, Guerra MA, Cavalin P, Pinhanez C. Specifying and implementing multi-party conversation rules with finite-state-automata. InWorkshops at the Thirty-Second AAAI Conference on Artificial Intelligence Jun. 20, 2018. pp. 713-719.
De Bayser MG, Pinhanez C, Candello H, Affonso M, Vasconcelos MP, Guerra MA, Cavalin P, Souza R. Ravel: a mas orchestration platform for human-chatbots conversations. InThe 6th International Workshop on Engineering Multi-Agent Systems (EMAS@ AAMAS 2018), Stockholm, Sweden 2018. pp. 1-8 plus appendix.
Divekar RR, Drozdal J, Zhou Y, Song Z, Allen D, Rouhani R, Zhao R, Zheng S, Balagyozyan L, Su H. Interaction challenges in ai equipped environments built to teach foreign languages through dialogue and task-completion. InProceedings of the 2018 Designing Interactive Systems Conference Jun. 8, 2018 (pp. 597-609).
Divekar RR, Zhou Y, Allen D, Drozdal J, Su H. Building human-scale intelligent immersive spaces for foreign language learning. iLRN 2018 Montana. 2018 pp. 94-103.
Divekar RR, Kephart JO, Mou X, Chen L, Su H. You talkin'to me? A practical attention-aware embodied agent. InIFIP Conference on Human-Computer Interaction Sep. 2, 2019 (pp. 760-780). Springer, Cham.
Khouzaimi H, Laroche R, Lefèvre F. Reinforcement Learning for Turn-Taking Management in Incremental Spoken Dialogue Systems. InIJCAI Jan. 1, 2016 (pp. 2831-2837).
Norouzian A, Mazoure B, Connolly D, Willett D. Exploring attention mechanism for acoustic-based classification of speech utterances into system-directed and non-system-directed. InICASSP 2019—2019 IEEE International Conference an Acoustics, Speech and Signal Processing (ICASSP) May 12, 2019 (pp. 7310-7314). IEEE.
Ravuri S, Stolcke A. Recurrent neural network and LSTM models for lexical utterance classification. InSixteenth Annual Conference of the International Speech Communication Association 2015 pp. 1-5.
Sheikhi S, Odobez JM. Combining dynamic head pose-gaze mapping with the robot conversational state for attention recognition in human-robot interactions. Pattern Recognition Letters. Nov. 15, 2015;66:81-90.
Tsai TJ, Stolcke A, Slaney M. A study of multimodal addressee detection in human-human-computer interaction. IEEE Transactions on Multimedia. Jul. 9, 2015;17(9):1550-61.
Zhu X, Liu X, Lei Z, Li SZ. Face alignment in full pose range: A 3d total solution. IEEE transactions on pattern analysis and machine intelligence Nov. 28, 2017;41(1):78-92.
[Akhtiamov et al., 2017] Oleg Akhtiamov, Maxim Sidorov, Alexey A Karpov, and Wolfgang Minker. Speech and text analysis for multimodal addressee detection in humanhuman-computer interaction. In INTERSPEECH, pp. 2521-2525, 2017.
[Andrist et al., 2016] Sean Andrist, Dan Bohus, Bilge Mutlu, and David Schlangen. Turn-taking and coordination in human-machine interaction. AI Magazine, 37(4):5-6, 2016.
[Divekar et al., 2018b] Rahul R Divekar, Matthew Peveler, Robert Rouhani, Rui Zhao, Jeffrey O Kephart, David Allen, Kang Wang, Qiang Ji, and Hui Su. CIRA: An Architecture for Building Configurable Immersive Smart-Rooms. In Proceedings of SAI Intelligent Systems Conference, pp. 76-95. Springer, 2018. pp. 76-95. Springer, 2018.
[Le Minh et al., 2018] Thao Le Minh, Nobuyuki Shimizu,Takashi Miyazaki, and Koichi Shinoda. Deep Learning Based Multi-modal Addressee Recognition in Visual Scenes with Utterances. IJCAI 2018, pp. 1546-1553,2018.

* cited by examiner

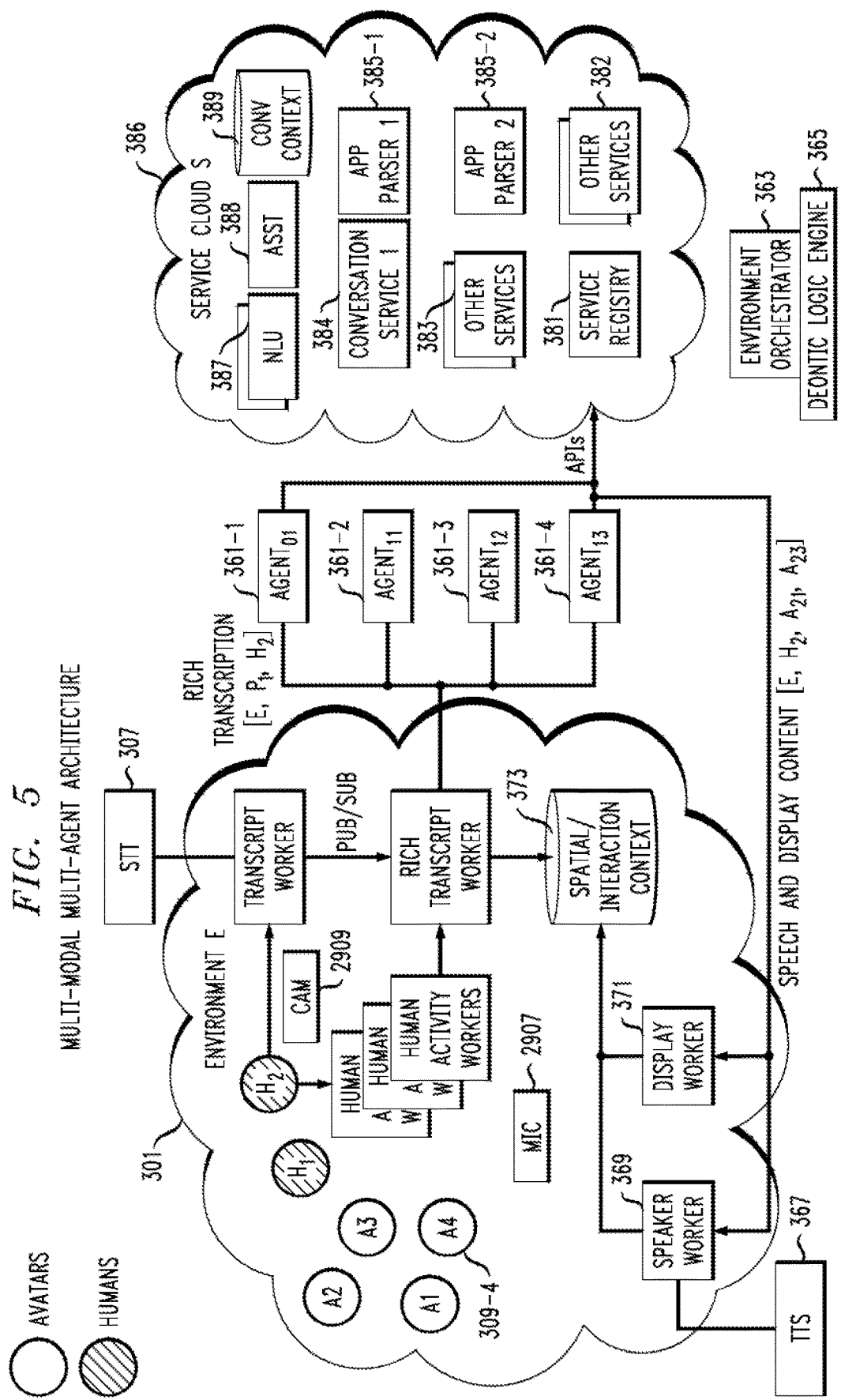
FIG. 5 MULTI-MODAL MULTI-AGENT ARCHITECTURE

FIG. 13

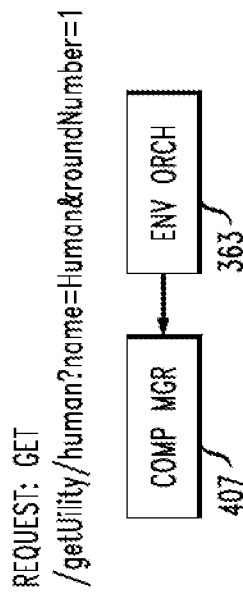

Response:
{
  "name": "Human",
  "roundNumber": 1,
  "currencyUnit": "USD",
  "utility": {
    "cake": {
      "type": "unitvaluePlusSupplement",
      "unit": "each",
      "parameters": {
        "unitvalue": 18.64,
        "supplement": {
          "chocolate": {
            "type": "trapezoid",
            "unit": "ounce",
            "parameters": {
              "minQuantity": 3,
              "maxQuantity": 6,
              "minValue": 3.63,
              "maxValue": 5.62
            }
          },
          "vanilla": { ... }
        }
      }
    },
    "pancake": { ... }
  }
}

REQUEST: GET
/getUtility/human?name=Human&roundNumber=1

COMP MGR 407 → ENV ORCH 363

REQUEST: POST/allocateGoods

Response:
{
    "status" : "Acknowledged"
}

FIG. 21B

REQUEST BODY:
```
{
    "cost" : 20,
    "products" : {
        "cake" : {
            "unit" : "each",
            "quantity" : 3,
            "supplement" : [
                {
                    "chocolate" : {
                        "unit" : "ounce",
                        "quantity" : 2
                    },
                    "vanilla" : {
                        "unit" : "teaspoon",
                        "quantity" : 2
                    }
                },
                {
                    "chocolate" : {
                        "unit" : "ounce",
                        "quantity" : 3
                    },
                    "vanilla" : {
                        "unit" : "teaspoon",
                        "quantity" : 1
                    }
                }
            ]
        },
        "pancake" : {
            "unit" : "each",
            "quantity" : 2,
            "supplement" : [
                {
                    "blueberry" : {
                        "unit" : "packet",
                        "quantity" : 2
                    }
                }
            ]
        }
    }
}
```

*FIG. 27A*
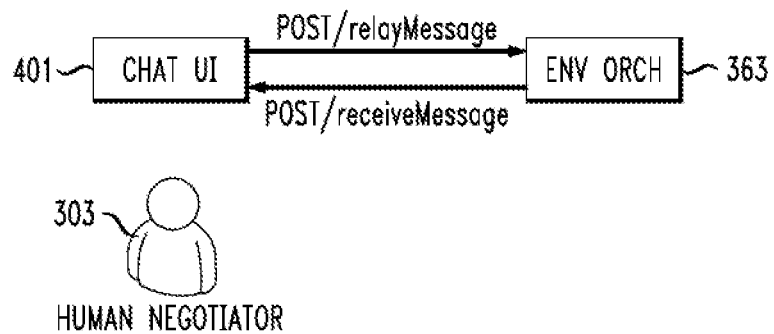
*FIG. 27B*
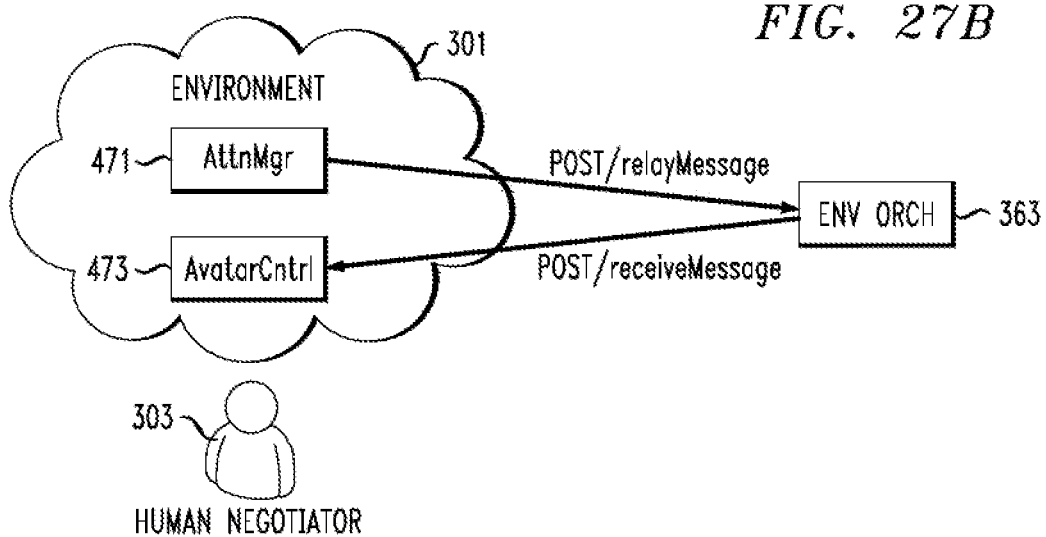
*FIG. 28*
| SENDER | UTTERANCE | STATUS | RULE |
|---|---|---|---|
| USER | @A1 DO YOU HAVE WATER? | BROADCAST | R1 |
| A1 | I WILL GIVE IT FOR $5 | BROADCAST | R3 |
| A2 | I WILL GIVE IT FOR $4 | BLOCK | R3 |
| A1 | I CAN DO A BETTER PRICE | BLOCK | R2 |
| A2 | I CAN DO A BETTER PRICE | BROADCAST | R4 |

*FIG. 30*

| T | S | H | UTTERANCE | STATUS | RULE |
|---|---|---|---|---|---|
| t1 | U | A1 | I WANT TO BUY TEA | BROADCAST | R1 |
| t1.1 | A1 | | YES, FOR $5 | BROADCAST | R3 |
| t1.1 | A2 | | ~~YES, FOR $6~~ | BLOCK | R3 |
| t1.2 | A2 | | I CAN GIVE IT TO YOU FOR CHEAPER | BROADCAST | R4 |

FIG. 31

Seller

Celia: 20.9 USD
Revenue: 30
Quantity: egg (4) flour (4) milk (2) sugar (2) chocolate (13)

Watson: 4.57 USD
Revenue: 8.45
Quantity: egg (1) flour (2) milk (2) blueberry (3)

Human Assistant

Round: 1  Money: 61.55  Warm-Up Time: 0  Round Time: 0  Post-Round Time: 0

Can I Make...?

[Check] [Save]
Potential Score: 79.4

Cakes
Base Ingredients Per:
- egg: 2
- flour: 2
- milk: 1
- sugar: 1

Number [2]

Cake 1 Additives
Chocolate (oz.) [5]
Vanilla (tsp) [0]

Cake 2 Additives
Chocolate (oz.) [5]
Vanilla (tsp) [0]

Pancakes
Base Ingredients Per:
- egg: 1
- flour: 2
- milk: 2

Number [1]

Pancake 1 Additives
Chocolate (oz.) [3]
blueberry (packet) [0]

Ingredients

| ingredient | required | have | need |
|---|---|---|---|
| egg | 5 | 5 | 0 |
| flour | 6 | 6 | 0 |
| milk | 4 | 4 | 0 |
| sugar | 2 | 2 | 0 |
| chocolate | 13 | 13 | 0 |
| vanilla | 0 | 0 | 0 |
| blueberry | 0 | 3 | 0 |

Offers

| Watson | | Celia | |
|---|---|---|---|
| cost | 0 | cost | 0 |
| egg | 0 | egg | 0 |
| flour | 0 | flour | 0 |
| milk | 0 | milk | 0 |
| sugar | 0 | sugar | 0 |
| chocolate | 0 | chocolate | 0 |
| vanilla | 0 | vanilla | 0 |
| blueberry | 0 | blueberry | 0 |

Utility

Cake           21.43
Additives
  Chocolate    Quantity 3 - 6
               Value 2.86 - 6.35
  Vanilla      Quantity 2 - 4
               Value 3.51 - 6.7

Pancake        24.08
Additives
  Chocolate    Quantity 3 - 6
               Value 2.09 - 4.18
  Blueberry    Quantity 1 - 3
               Value 3.43 - 4.3

*FIG. 32*

| GOOD | UNIT | BREAKEVEN COST RANGE |
|---|---|---|
| EGG | EACH | [0.25, 0.50] |
| FLOUR | CUP | [0.50, 1.00] |
| SUGAR | CUP | [0.50, 1.00] |
| MILK | CUP | [0.20, 0.40] |
| CHOCOLATE | OUNCE | [0.20, 0.40] |
| VANILLA | TEASPOON | [0.20, 0.40] |
| BLUEBERRY | PACKET | [0.25, 0.50] |

*FIG. 35A*

| PARAMETER NAME | DESCRIPTION | PARAMETER RANGE | UNIT |
|---|---|---|---|
| C | Value of plain cake | [15, 30] | USD |
| P | Value of plain pancake batch | [15, 30] | USD |
| cc_min ✗ | Min. amount of chocolate that can be added to a cake | [3, 3] | ounce |
| cc_max ✗ | Max. amount of chocolate that can be added to a cake | [6, 6] | ounce |
| Ucc_min | Min. extra value added to cake by adding the min. allowed amount of chocolate | [2, 4] | USD |
| Ucc_max | Max. extra value added to cake by adding the max. allowed amount of chocolate | [4, 8] | USD |
| cv_min ✗ | Min. amount of vanilla that can be added to a cake | [2, 2] | teaspoon |
| cv_max ✗ | Max. amount of vanilla that can be added to a cake | [4, 4] | teaspoon |
| Ucv_min | Min. extra value added to cake by adding the min. allowed amount of vanilla | [2, 4] | USD |
| Ucv_max | Max. extra value added to cake by adding the max. allowed amount of vanilla | [4, 8] | USD |
| pc_min ✗ | Min. amount of chocolate that can be added to a pancake batch | [3, 3] | ounce |
| pc_max ✗ | Max. amount of chocolate that can be added to a pancake batch | [6, 6] | ounce |

| | | | |
|---|---|---|---|
| Upc_min | Min. extra value added to pancake batch by adding the min. allowed amount of chocolate | [2, 4] | USD |
| Upc_max | Max. extra value added to pancake batch by adding the max. allowed amount of chocolate | [4, 8] | USD |
| pb_min | Min. amount of blueberry that can be added to a pancake batch | [1, 1] | packet |
| pb_max | Max. amount of blueberry that can be added to a pancake batch | [3, 3] | packet |
| Upb_min | Min. extra value added to pancake batch by adding the min. allowed amount of blueberry | [2, 4] | |
| Upb_max | Max. extra value added to pancake batch by adding the max. allowed amount of blueberry | [4, 8] | |

3701
```
{
  "status": "Acknowledged",
  "utility": <exact copy of utility info that was received in the POST body>
}

Or

{
  "status": "Failed; no message body",
  "utility": null
}
```

3703
```
{
  "roundDuration": 300,
  "roundNumber": 1,
  "timestamp": "2020-02-23T06:27:10.282Z"
}
```

3705
```
{
  "status": "Acknowledged"
}
```

3707
```
{
  "roundNumber": 1,
  "timestamp": "2020-02-23T06:32:10.282Z"
}
```

3709
```
{
  "status": "Acknowledged"
}
```

*FIG. 38*

3801
```
{
    "speaker": "Human",
    "addressee": "Watson",
    "text": "Watson I'd like to buy 5 eggs for $2",
    "role": "buyer",
    "environmentUUID": "abcdefg",
    "timestamp": 1582184608849
}
```

3803
```
{
    "status": "Acknowledged",
    "interpretation": {
        "text": "Watson I want to buy 5 eggs for $2",
        "speaker": "Human",
        "addressee": "Watson",
        "role": "buyer",
        "environmentUUID": "abcdefg",
    }
}
```

3805
```
{
    "text": "How about if I sell you 1 blueberry for 0.69 USD".",
    "speaker": "Celia",
    "role": "seller",
    "addressee": "Human",
    "environmentUUID": "abcdefg",
    "timestamp": "2020-02-23T02:22:39.152Z",
    "bid": {
        "quantity": {
            "bleuberry": 1
        },
        "type": "SellOffer",
        "price": {
            "unit": "USD",
            "value": 0.69
        }
    }
}
```

3807
```
{
    "status": "Acknowledged",
    "message": *message*
}
```

3809
```
{
    "status": "Failed",
}
```

FIG. 39

```
3901 {
    {
        "serviceMap": {
            "environment-orchestrator": {
                "protocol": "http",
                "host": "localhost",
                "port": 14010
            }
        }
    }
}

3903 {
    {
        "text": "How about if I sell you 5 egg for 3.73 USD.",
        "speaker": "Watson",
        "role": "seller",
        "addressee": "Human",
        environmentUUID": "abcdefg",
        "timestamp": "2020-02-20T08:08:05.825Z",
        "bid": {
            "quantiy": {
                "egg", 5
            },
            "type": "SellOffer",
            "price": {
                "unit": "USD",
                "value": 3.73
            }
        }
    }
}

3905 {
    {
        "status": "Acknowledged",
        "allResponses": [
            {
                "msgType": "submitTranscipt",
                "Status": "OK"
            },
            {
                "status": "acknowledged"
            },
            {
                "status": "Failed; round not active"
            },
            {
                "status": "Failed; round not active"
            }
        ]
    }
}
```

EMBODIED NEGOTIATION AGENT AND PLATFORM

The following disclosure(s) are submitted under 35 U.S.C. 102(b)(1)(A):

Rahul Divekar, Xiangyang Mou, Lisha Chen, Maira Gatti de Bayser, Melina de Vasconcelos Alberio Guerra, and Hui Su, "Embodied conversational AI agents in a multi-modal multi-agent competitive dialogue," In Proceedings of the 28th International Joint Conference on Artificial Intelligence 2019 Aug. 10 (pp. 6512-6514). AAAI Press.

Rahul Divekar, Hui Su, Jeffrey Owen Kephart, Maira Gatti de Bayser, Melina de Vasconcelos Alberio Guerra, Xiangyang Mou, Matthew Peveler, and Lisha Chen, "HUMAINE: Human Multi-Agent Immersive Negotiation Competition," In Extended Abstracts of the 2020 CHI Conference on Human Factors in Computing Systems 2020 Apr. 25 (pp. 1-10).

BACKGROUND

The present invention relates to the electrical, electronic and computer arts, and more specifically, to artificial intelligence (AI) and the like.

Fully-automated negotiation among two or more software agents has been a subject of academic study for at least 25 years. During this time, researchers have developed and published several sophisticated negotiation algorithms with optimization that are effective under various scenarios.

Systems supporting bilateral negotiation between humans and software agents are less common, but have been studied somewhat in the academic world. In these systems, humans communicate their bids to agents by typing text into a user interface (UI), and agents respond with text displayed in the UI.

Current techniques for human-agent negotiation typically focus on specific negotiation algorithms for agents or text-based forms of communication between one agent and one human. Thus, current UIs for human-agent negotiation are typically limited to text-based systems and are not multi-lateral (that is, they do not support human-agent interactions involving multiple agents or multiple humans).

SUMMARY

Principles of the invention provide techniques for an embodied negotiation agent and platform. In one aspect, an exemplary method includes transcribing human speech signals uttered within an environment including one or more avatars representing one or more software agents, the human speech signals being directed to at least one of the one or more avatars; obtaining at least one non-speech behavioral trace within the environment, the trace being representative of non-speech behavior directed to the at least one of the one or more avatars; forwarding the transcribed human speech signals and the at least one non-speech behavioral trace to the one or more software agents; obtaining, from at least one of the one or more software agents, a proposed act; and, responsive to the obtaining, issuing a command to cause one of the one or more avatars corresponding to the at least one of the one or more software agents from which the proposed act is obtained to emit synthesized speech and to act visually in accordance with the proposed act.

In another aspect, an exemplary system includes a memory; a non-transitory computer readable medium including computer executable instructions; and at least one processor, coupled to the memory and the non-transitory computer readable medium, and operative to execute the instructions to be operative to transcribe human speech signals uttered within an environment including one or more avatars representing one or more software agents, the human speech signals being directed to at least one of the one or more avatars; obtain at least one non-speech behavioral trace within the environment, the trace being representative of non-speech behavior directed to the at least one of the one or more avatars; forward the transcribed human speech signals and the at least one non-speech behavioral trace to the one or more software agents; obtain, from at least one of the one or more software agents, a proposed act; and, responsive to the obtaining, issue a command to cause one of the one or more avatars corresponding to the at least one of the one or more software agents from which the proposed act is obtained to emit synthesized speech and to act visually in accordance with the proposed act.

In still another aspect, another exemplary method includes obtaining, at a software agent, a representation of human speech signals uttered within an environment including an avatar representing the software agent, the human speech signals having been directed to the avatar; obtaining at least one non-speech behavioral trace from within the environment, the trace overlapping temporally with the human speech signals and being representative of non-speech behavior directed to the avatar; interpreting the human speech signals and the at least one non-speech behavioral trace, with the software agent, as a first act with associated parameters; generating a proposed act responsive to the first act; and submitting the proposed act to an environment orchestrator.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide a user interface that enables humans to negotiate with one or more software agents much as they would with other humans: via a combination of speech and non-verbal forms of communication such as head orientation or gesture. Moreover, one or more embodiments provide audio and/or visual representations of each negotiation agent that make it easier for humans to conceptualize and address the agents as distinct quasi-human negotiation partners, thereby further increasing the naturalness of the interaction. Additionally, one or more embodiments provide techniques whereby certain desired rules of negotiation can be enforced. The improved user interface enables human-machine negotiation that has heretofore not been feasible. Aspects of the invention also improve the technological process of human-machine interaction during human-machine negotiation; for example, by determining which avatar of a group of avatars is being addressed by the human; more accurately categorizing human-initiated negotiation acts by considering a non-speech behavioral trace in addition to human speech; more accurately signaling software agent intent to the human user via characteristics of the software agent's avatar; and/or enabling seamless integration of existing negotiation algorithms into a fully interactive multimodal (e.g. speech and head pose) conversational system (e.g. using an environment orchestrator).

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 is a block diagram of aspects of the invention;

FIGS. 7A, 7B, 8, 9, 10, 11A, 11B, 11C, 12, 13, 14, 15, 16, 17, 18, 19, 20, and 21A are combined block and data flow diagrams of aspects of the invention;

FIG. 21B shows an exemplary request and response for allocation of goods, according to an aspect of the invention;

FIGS. 22A, 22B, 23, 24, 25, 26, 27A, and 27B are combined block and data flow diagrams of aspects of the invention;

FIG. 28 shows a table of exemplary rules, according to an aspect of the invention;

FIG. 30 shows a table of exemplary utterances, according to an aspect of the invention;

FIG. 31 shows an exemplary screen shot of a chat user interface, according to an aspect of the invention;

FIG. 32 shows an exemplary screen shot of a human assistant user interface, according to an aspect of the invention;

FIGS. 35A and 35B show how a human buyer utility function can be specified by the parameters of the presented table, according to an aspect of the invention;

FIGS. 37, 38, and 39 show suitable bodies and responses in the form of JSON messages, according to aspects of the invention;

DETAILED DESCRIPTION

Figure 1:
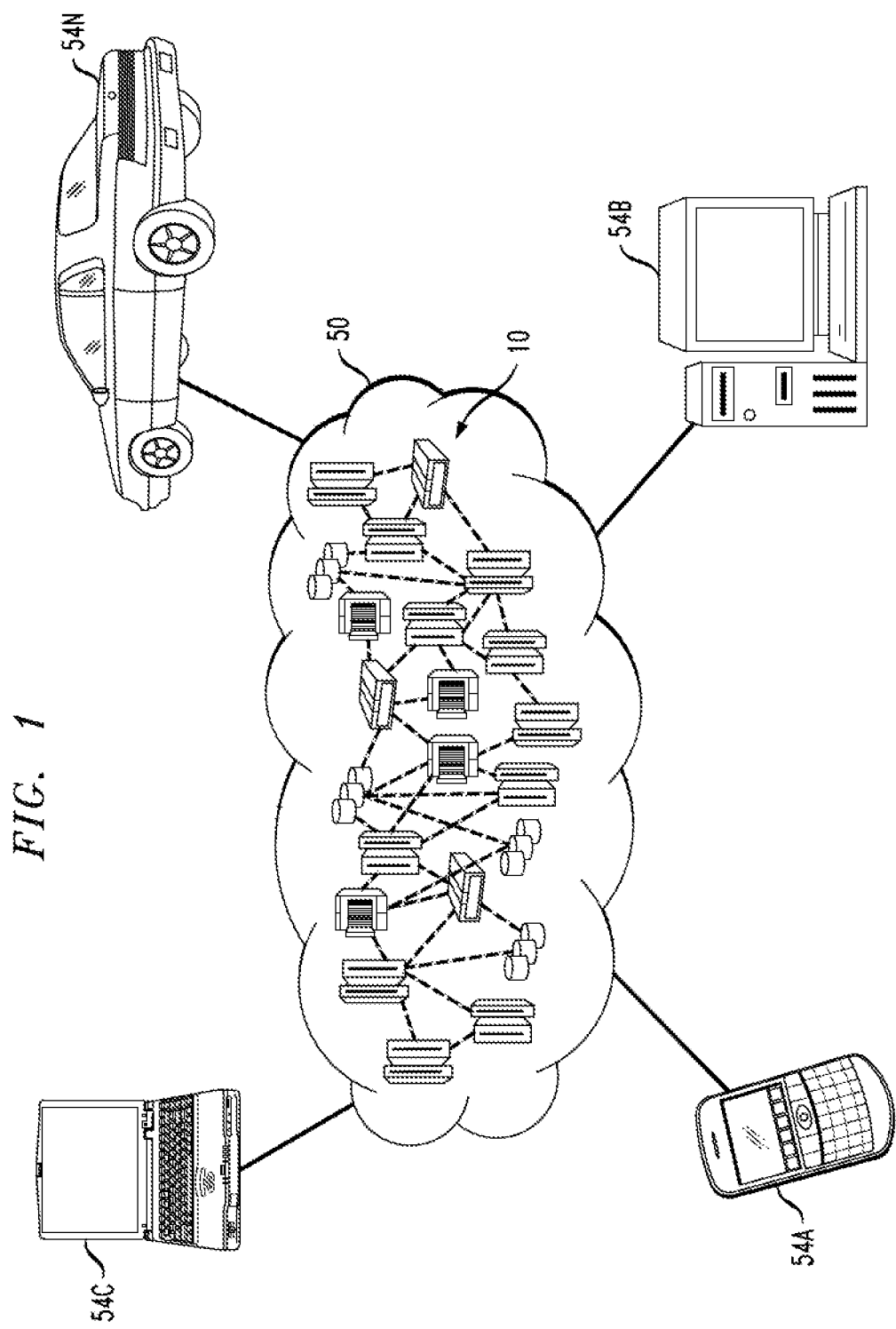
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
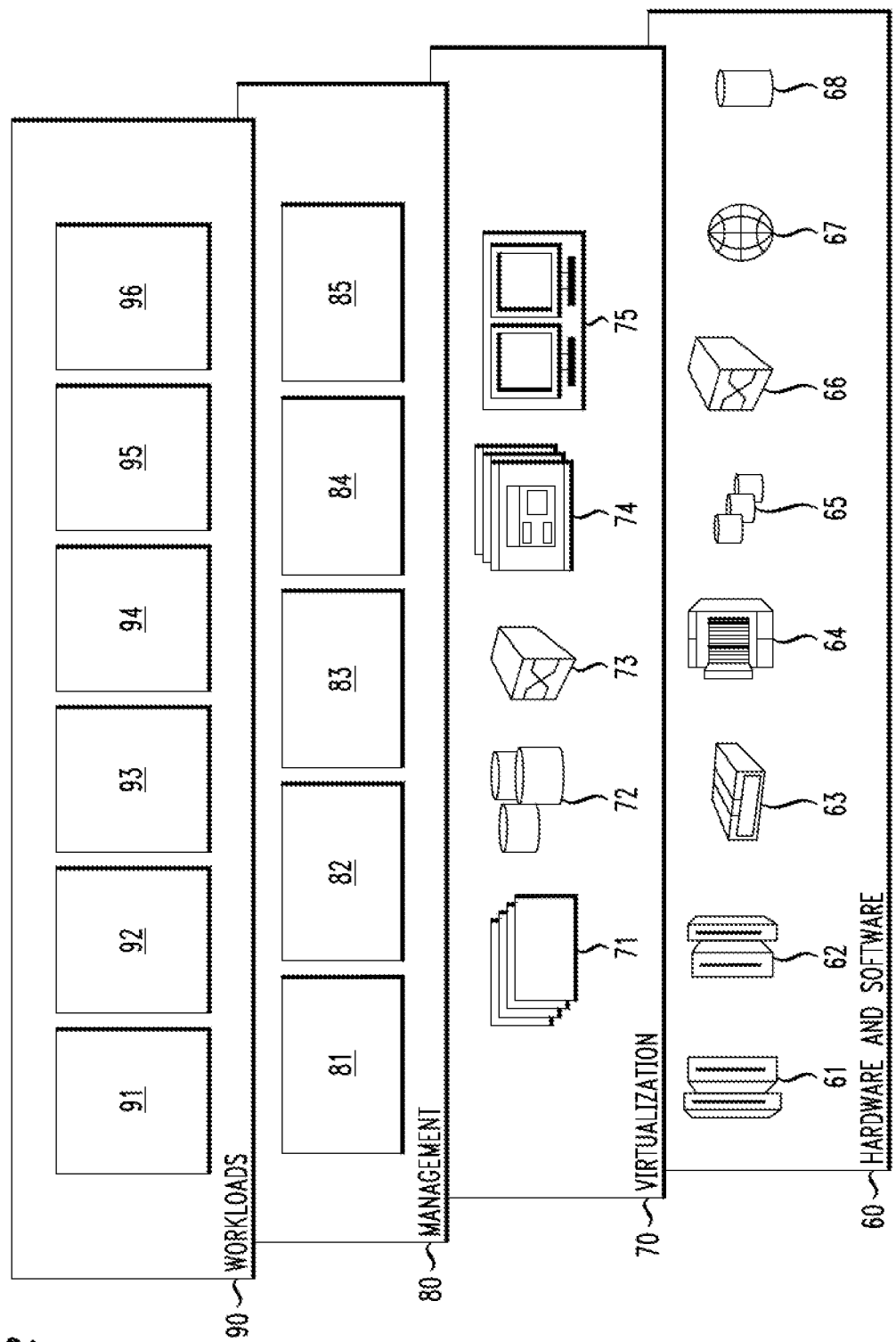
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to facilitate negotiations between software agents and humans via natural interaction.

Aspects of the invention provide an embodied negotiation agent and platform. Fully-automated negotiation among two or more software agents has been a subject of academic study for some time. During this time, researchers have developed and published several sophisticated negotiation algorithms with optimization that are effective under various scenarios. Systems supporting multi-lateral negotiation between humans and software agents are less common, but bi-lateral human-agent negotiation has been studied somewhat in the academic world. In these systems, humans communicate their bids to agents by typing text into a user interface (UI), and agents respond with text displayed in the UI. Existent patent literature on human-agent negotiation typically focuses on either specific negotiation algorithms for agents, or text-based forms of communication between agents and humans. Heretofore, for human to agent negotiation, human communications must be in a structured format (e.g. fill in the blank) that is suitable for agents, or possibly by typing in ordinary text.

It is not believed that there are currently any commercially feasible systems that support or employ human-agent negotiation, such as bilateral or multilateral negotiations between humans and software agents. A possible reason is that negotiation via text is too unnatural. One or more embodiments advantageously facilitate more natural human-agent negotiation as compared to prior art text-based communication. One or more embodiments enable multi-modal interaction between humans and agents, wherein humans negotiate with one or more virtual software agents via speech and gesture in a manner that emulates negotiation among humans. It is believed that the inability of humans to naturally communicate with the agent, rather than the negotiation/bidding algorithms used by the agents per se, is the factor most limiting the current state of the art. One or more embodiments utilize speech with a gesture or other non-verbal form of communication. Software agents that are capable of negotiating with humans via natural verbal and non-verbal interactions are referred to herein AS "embodied" negotiating agents because they in some sense co-exist in a physical space with humans. An embodied cognitive agent is a software agent that co-inhabits a physical space with people, and uses its understanding of what is happening in that space to act as a valuable collaborator on cognitive tasks.

One or more embodiments advantageously facilitate negotiations between software agents and humans via natural interaction. One or more embodiments include a negotiation platform which in turn includes an Environment and an Environment Orchestrator that supports multi-modal negotiation between at least one human and at least one agent. The interaction is based upon speech and, optionally, non-verbal forms of communication such as head orientation, gesture and facial expression. One or more embodiments also include a negotiation agent that uses the capabilities of the platform to negotiate with humans. Known negotiation/bidding algorithms can be employed with the platform and agent. One or more embodiments provide an enhanced user interface (UI) that enables practical human-agent negotiation not heretofore feasible.

Figure 3:
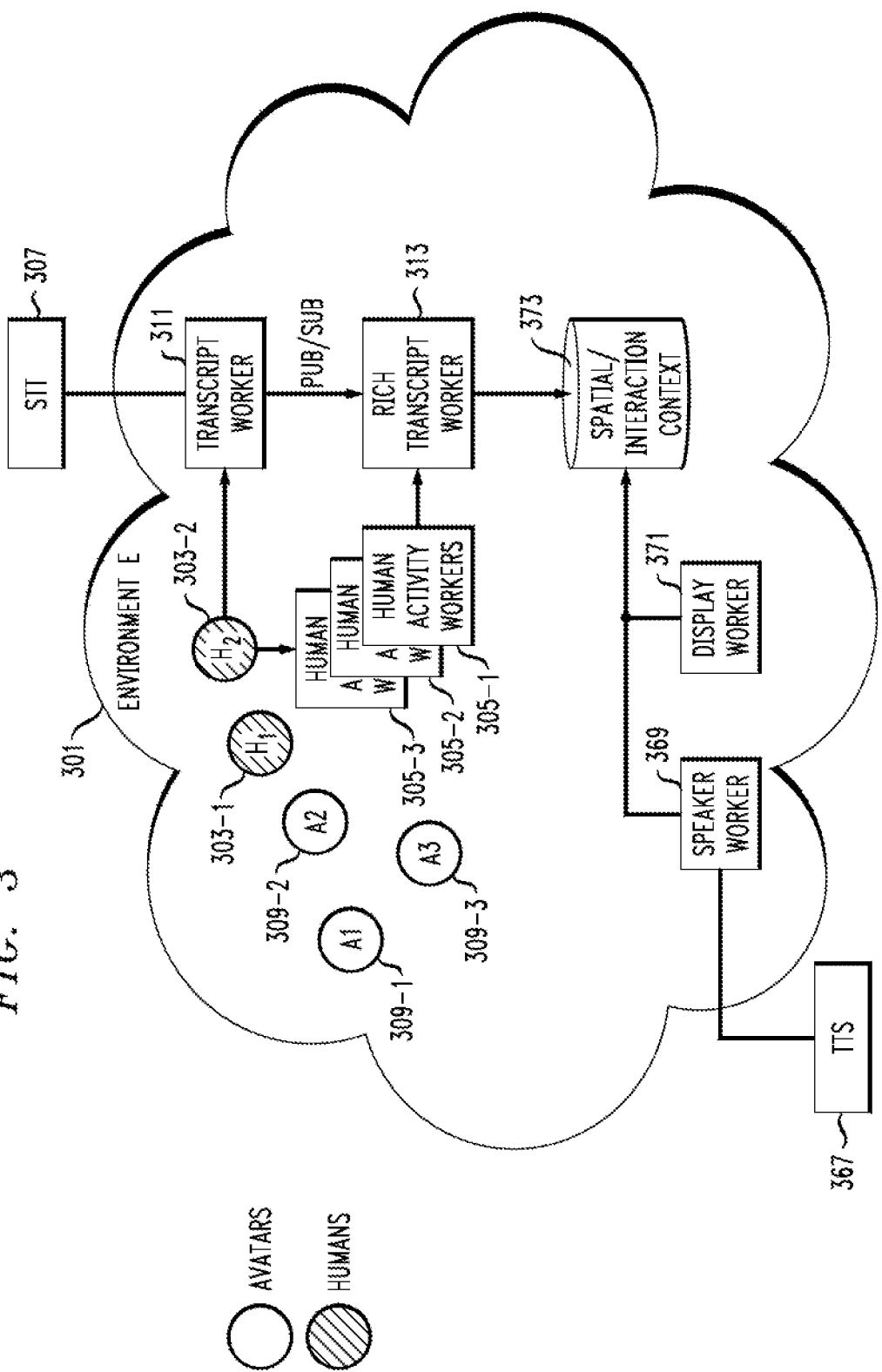
FIG. 3 is a block diagram of aspects of the invention.

Reference should now be had to FIG. 3. Environment 301 is an exemplary embodiment that includes a physical environment in which one or more human negotiators $H_1$, $H_2$ (numbered 303-1 and 303-2) are situated. The physical environment can range from a laptop computer to a conference room with one or two flat screen displays to a fully immersive environment (e.g. virtual reality (VR) or augmented reality (AR)). A collection of devices (e.g. audiovisual input devices such as microphones, cameras, etc.) collect signals reflective of human activity, and a collection of services are provided that process human activity signals into higher-level inferences about the human activity, e.g. To avoid clutter, the physical audiovisual input devices and the corresponding software services are depicted as "human activity workers" 305-1, 305-2, and 305-3. Speech signals can be transcribed to text using a suitable transcription engine (STT speech to text) 307 such as Watson™ STT available from International Business Machines Corporation, Armonk, N.Y., USA (WATSON™ is a mark of International Business Machines Corporation) or Google Cloud STT, available from Google LLC, Mountain View, Calif., USA. A suitable acoustic front end can be provided for feature extraction and the like, in a well-known manner. Gestures of the humans 303-1, 303-2 can be captured from video and classified from dynamic traces of joint positions.

Facial expressions of the humans 303-1, 303-2 can be classified from video of human negotiators' faces. In some embodiments of the invention, the SPEECH transcription engine may produce multiple possible transcriptions, each of which may be associated with a relative rank or score. For each of the one or more transcriptions, an utterance interpretation module attempts to extract a negotiation action type and associated parameters.

Thus, the services (software portions of workers 305-1, 305-2, 305-3) collect raw signals such as audio from the microphone(s), video from the camera(s), and the like. One human activity worker software portion might include, for example, a head orientation worker that zooms in on the face and detects the human's gaze angle/head orientation in two directions to determine what pixels the human user is looking at. Those pixels can then be mapped, for example, to an avatar representing one of the agents. Note avatars $A_1$, $A_2$, $A_3$ numbered 309-1, 309-2, 309-3. Facial expressions could include, for example, shock/disdain if a proposed price is excessively high. The transcript worker 311 turns the audio into text using STT engine 307.

One or more other agents collate the information together into a coherent representation of recent human activity in the environment. One or more embodiments employ a transcript as well as at least one non-verbal inference (verbal interaction context) in addition to the speech. A service such as rich transcript worker 313 collects the various verbal and non-verbal inferences into a single representation, and forwards that representation to each negotiation agent.

The items just discussed are on the input side; i.e., they involve inferring human activity and behavior of humans 303-1, 303-2. In one or more embodiments, human input in the form of offers causes the agent(s) to generate counter offer(s) (agents are discussed further below). When those offers are returned to the physical environment 301, synthesized speech can be played, the physical appearance of an avatar can change, and the like. Thus, in the physical environment, natural input is collected from humans, and the response of one or more agents is also rendered to humans in a relatively natural manner (for example, via cartoon avatars 309-1, 309-2, 309-3 that have a reasonable resemblance to an actual human). Display worker 371, Speaker worker 369, and text-to-speech service 367 are discussed below. In the exemplary embodiment, the overall spatial and interaction context is maintained in a data store 373; other embodiments could maintain the context elsewhere or in multiple locations.

Referring also to FIG. 5, note agents 361-1, 361-2, 361-3, and 361-4, as well as the environment orchestrator (EO) 363, which acts as a central clearing house, managing the overall flow of bids through the system. Specifically, it determines whether to approve each agent's bid for transmission, based upon certain prescribed conditions; informs each agent whether or not its bid has been approved for transmission; and, if it approves the bid for transmission, it sends messages to appropriate services (e.g. speaker and display workers 369, 371) located within the environment that cause the bid to be expressed audibly in the form of a synthesized voice, optionally accompanied by non-verbal actions by the avatar such as gestures (nodding head or waving an arm or hand), facial expressions, or variations in prosody intended to convey emotion. Reference characters are omitted for certain elements in FIG. 5 that are depicted, described, and numbered with respect to FIG. 3, to avoid clutter in FIG. 5. An additional avatar $A_4$ 309-4 is depicted.

Service 387 and the other services represented in the Service Cloud S 386 are examples of services that the agents 361 can employ, but the details are left to the agent developers in one or more embodiments. In the non-limiting example of FIG. 5, element 387 is a Natural Language Understanding module such as IBM's Watson™ NLU that assists with interpreting human utterances as negotiation or other speech acts; element 388 is a conversation agent such as IBM's Watson™ Assistant that can be used in conjunction with element 387 to help classify human utterances into various categories of negotiation or other speech act; and element 389 is a representation of the conversational context, which can be maintained by the conversation agent internal to the service (as it is for Watson™ Assistant) or externally, as shown in the example. Element 384 is an alternative conversation service that can be used in lieu of or in tandem with a first conversation service such as Watson™ Assistant; elements 385-1 and 385-2 are alternative parsers that further assist with interpreting human utterances combined with other elements of the rich transcription such as head orientation or pointing information. In one or more embodiments they assemble a full interpretation of the observed human behavior into a structured representation suitable for further processing by a negotiation algorithm— for example if the human is looking at the avatar associated with "Celia" and saying "Can I have two of those for $4" while pointing at loaves of bread, the parser derives, from inputs from various other services such as NLU, conversation agent, etc., a representation that includes information such as: addressee=Celia, good='loaves of bread', quantity=2, offeredPrice=$4, intent=BuyOffer. Element 381 is a service registry that makes it easier for the agents to locate and avail themselves of the services they need. Elements 382, 383 include "other services," it being understood that all the services shown are just examples, none of which must necessarily be included in any particular case. In principle, the agents could do all of the work they need to do internally, but in one or more embodiments they make use of various services.

In one or more embodiments, the agents 361-1, 361-2, 361-3, and 361-4 receive from the rich transcript worker 313 a rich transcription, i.e. a description of what is going on in the environment 301. These agents determine whether a response is required, using known negotiation algorithms. If they do respond, they send a message (bid) to the environment orchestrator 363. A resulting bid is converted into a human-friendly form (e.g. text) as well as, optionally, an indication of an action, tone of voice, etc. that should be performed/utilized by the avatar. The environment orchestrator determines whether the message from the agent is valid. There may be certain rules governing the negotiation that everyone wants enforced. For example, once the human speaks, each agent may be permitted to respond at most one time until the human speaks again.

In another aspect, agents may have names such as "Watson" or "Celia." If a human says, for example, "Watson, I will give you one dollar for a cup of sugar," then agents other than Watson (e.g., Celia) may be forbidden from making counter offers, at least for some period of time. That is to say, the agent who was addressed (Watson) may be given a first right to respond. Rules may address, for example, how many times an agent can respond, in what order agents are permitted to respond, and so on. In one or more embodiments, the environment orchestrator ensures enforcement of the rules (e.g. by blocking non-compliant messages).

Furthermore, the environmental orchestrator can inform an agent when the agent's message has been blocked, optionally with a reason for the blockage. The environmental orchestrator can also inform the agent when the message is accepted and can forward the accepted message to all the other agents as well as sending a message back into the environment so that the human can be informed vis synthesized speech and display. The environment together with the environment orchestrator can together be considered to form a platform.

In one or more embodiments, each agent is represented visually as an avatar (human-like, or not), and each agent interprets human utterances as negotiation acts such as:
Request bid
Accept bid
Reject bid
Offer/Counteroffer Furthermore, in one or more embodiments, each agent infers whether it is being addressed on the basis of verbal or non-verbal cues (such as head orientation); executes a negotiation algorithm to determine negotiation acts by human or other agents; converts a bid into human-friendly language (text+optionally avatar behaviors); and/or sends the bid to the environment orchestrator.

As noted, there are a wide variety of environments in which the avatar might be displayed, including a laptop display; an electronic touchscreen display resting on a table, mounted on a wall, or mounted on a mobile device such as a robot (e.g. telepresence robot available from Double Robotics, Inc. Burlingame, Calif. 94010 USA); an immersive panoramic screen that surrounds one or more human negotiator(s); robotic or other physical embodiment immersive environments realized through VR/AR/XR (XR=extended reality) headsets; holographic projections; and the like. Note that in one or more embodiments, a bid is the output of negotiation algorithm.

Figure 4B:
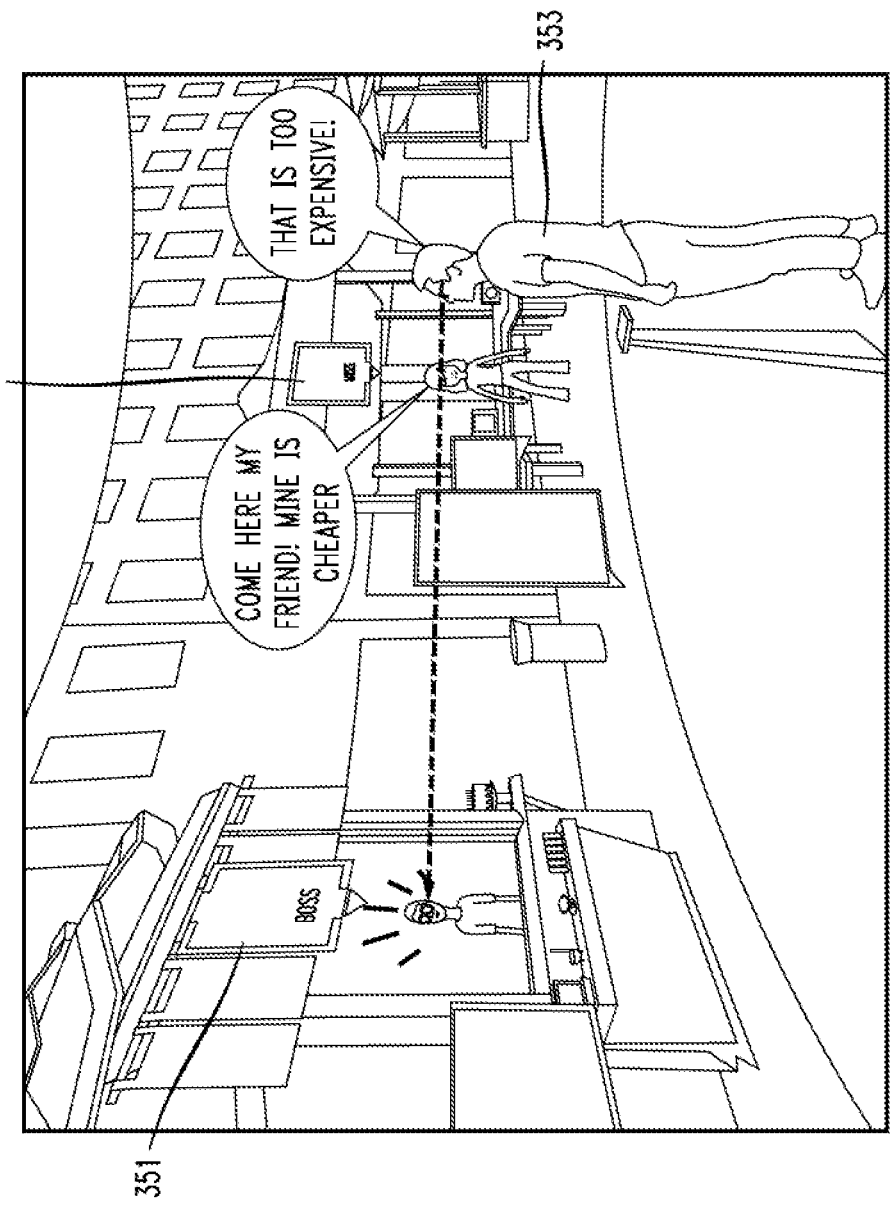
FIGS. 4A and 4B show a suitable exemplary immersive environment within which aspects of the invention can be implemented.
Figure 4A:
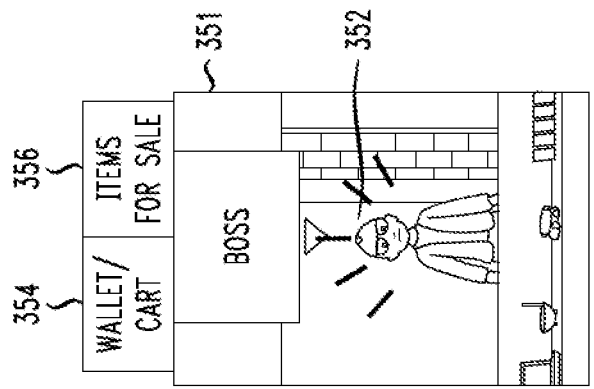

FIG. 4A shows a closeup of an exemplary avatar 351 ("Boss"). FIG. 4B shows an exemplary immersive environment with one human negotiator 353 and two agent negotiators represented by avatars 351, 355 ("Miss").

Referring again to FIG. 5, Ravel, available from International Business Machines Corporation, Armonk, N.Y., USA, is a non-limiting example of a deontic logic engine 365 to enforce the rules; the rules could also be encoded in custom computer code. References herein to "Ravel" should be understood as being generally representative of deontic logic engines. Deontic logic is a branch of symbolic logic concerned with issues such as permission and obligation. Deontic logic engine 365 can be considered as part of the environmental orchestrator. The service cloud 386 is an example of how agents can perform various tasks. For example, an agent can be tasked with taking information in human-understandable form and turning it into a form that can be used by a software agent. Consider: a human utters: "Celia, I will buy two cups of sugar and five ounces of chocolate from you for $3.50." This is translated into a mathematical representation. To accomplish this, the agent can use a cloud natural language understanding (NLU) service 387 such as Watson™ NLU (available from International Business Machines Corporation, Armonk, N.Y., USA), can use custom parsing code, and the like. Further, once the mathematical representation is obtained, the agent can be free to use any desired negotiation algorithm. Agents can thus be provided with considerable flexibility in how assigned tasks are accomplished.

In the negotiation environment E 301, human activity (speech, gesture, head orientation, etc.) are captured and summarized to produce an inferred Utterance U, Speaker S, and Addressee A. Optionally, services operating in E 301 may also produce inferred Gestures G, Facial expressions F, and/or Emotions Em. Optionally, services operating in E 301 may also produce less refined activity traces, including Audio (speech) and/or low-level body or joint positions and movements. Rich transcript service 313 in E 301 sends these summaries to each of the agents 361-1, 361-2, 361-3, and 361-4 participating in the system.

Each agent 361-1, 361-2, 361-3, and 361-4 then processes the information supplied by the rich transcript service into an interpretation of the human's negotiation actions (bid, acceptance, rejection, etc.); uses a negotiation algorithm (possibly implemented using external services) to generate a structured representation of a bid; converts the bid representation into a human-friendly bid including text plus an indication of action that should be taken by the avatar; and sends the proposed bid to an environment orchestrator 363.

The environment orchestrator 363 determines whether to forward the message to the environment and the other agents; forwards accepted messages to other agents; and/or interprets the message into commands issued to the environment that cause the avatar to speak and act according to the human-friendly bid.

One or more embodiments provide an automated negotiation agent that interacts naturally with humans by: receiving a transcription of human speech; receiving at least one additional human behavioral trace that overlaps temporally with the transcription of human speech; interpreting the transcription plus the additional human behavioral trace as a negotiation act with associated parameters; generating an appropriate proposed negotiation act; and submitting the proposed negotiation act to a central manager for approval.

One or more embodiments provide a negotiation platform (environment 301 and orchestrator 363) that supports negotiation between humans and software agents by: collecting human speech signals from a microphone (environment 301; e.g. using microphone 2907); transcribing the human speech signals into a transcription (environment 301); optionally, collecting one additional trace of human behavior from a sensing device (environment 301; e.g. using camera 2909 which can be, for example, an ordinary digital camera, a depth camera such as Intel Real Sense™ (mark of Intel Corporation, Santa Clara, Calif., USA) or Microsoft Kinect® (registered mark of Microsoft Corporation Redmond Wash., USA), or the like); forwarding the transcription plus the one additional trace (when present) to one or more agents (environment 301 (e.g. rich transcript worker 313 thereof) communicating with external software agents 361; alternative discussed below); receiving from an agent a proposed negotiation act for approval (orchestrator 363); and deciding whether or not to approve the negotiation act on the basis of prescribed rules and conditions (orchestrator 363). If the negotiation act is approved, the platform (orchestrator 363) broadcasts details of the negotiation act to agents in the system; and renders the negotiation act via synthesized speech. If the negotiation act is not approved, the platform (orchestrator 363) informs the agent that its proposed bid was not approved. It is worth noting that in one or more embodiments software agents 361 are external to the environment E 301 but avatars 309 within environment 301 are representations of the agents 361. Also, regarding the forwarding of the transcription plus the one additional trace (when present) to one or more agents, in an alternative approach, rich transcript worker 313 signals the environment orchestrator 363 which then gates the signal and decides whether to forward same to the agents 361. In addition, note that microphone 2907 and camera 2909 are typically interposed between humans 303 and workers 305 but are depicted schematically in FIG. 5 to avoid clutter. Finally, it will be appreciated that various steps have been identified in this paragraph as being performed by the environment; they can be performed by one or more specific elements of the environment, as desired and as described elsewhere herein.

Some embodiments include an automated negotiation agent that interacts naturally with humans by: receiving a transcription of human speech; interpreting the transcription as a negotiation act with associated parameters; generating an appropriate proposed negotiation act; and submitting the proposed negotiation act to a central manager for approval.

In one or more embodiments, the proposed negotiation act includes text plus instructions governing the physical appearance of the agent on a display. Instructions governing physical appearance could include an action such as hand waving, an emotional cast to the synthesized voice, and the like.

In some cases, rendering the negotiation act further includes projecting a representation of the agent on a display. The agent can be represented as an avatar in one or more embodiments.

In some instances, the instructions governing the physical appearance of the agent on a display include specifications for dynamic behavior such as waving hands.

Some embodiments further include the step of collecting video signals from a camera or similar device.

In some cases, the step of interpreting the negotiation act further includes use of non-verbal cues such as prosody or pitch of the speech signal, head orientation, facial expression, or gestures.

Environment—Additional Details

Addressee determination: In one or more embodiments, the addressee is determined by a service (e.g. one of the human activity workers 305 that is coupled to a camera 2909) operating in the environment that uses the following heuristic: periodically estimate the angular orientation of the human negotiator(s) head (preferably several times per second), using any of a number of head orientation technologies known in the art; for each such estimated direction, project it onto the display to find the apparent attention spot at which the human is looking; compute the distance in relevant screen units between the attention spot and each avatar; identify the closest avatar, and designate that closest avatar as the attention avatar if the distance between it and the attention spot is less than a prescribed value; and, during the course of each utterance, identify the addressee as the avatar that was the attention avatar during the greatest fraction of the utterance, provided that that fraction exceeds a threshold duration.

In an alternative approach, the addressee is determined by a service operating in the environment that has uses a machine-learning-based technique to: train an addressee classification model from data that include a time series of head orientation information and a time series of known attention avatars; and use the model to classify a head orientation time series into a time series of inferred attention avatars. In another alternative, the approach just described is extended by using additional information beyond head orientation, such as gestures (pointing), or more sophisticated metrics drawn from the head orientation time series, optionally including the context of the conversation. In additional embodiments, the addressee determination can be made by each agent independently using techniques described above, based upon raw head orientation and/or other information relayed to the agent by the rich transcript worker 313.

Further details regarding exemplary address determination are provided below in the section entitled Head Orientation Estimation Using Deep Learning Techniques.

Environment Orchestrator—Additional Details

Message Acceptance: In one or more embodiments, the orchestrator 363 determines whether or not to approve an agent's negotiation message on the basis of rules pertaining to:

the agent's identity, the addressee (the avatar to whom the human addressed his or her bid), the negotiation action type, and/or the negotiation message's time stamp.

In one or more embodiments, the acceptance rules are expressed in deontic logic (specifications of permissions, obligations and prohibitions) and executed by a deontic logic engine such as the above-mentioned Ravel system.

In one or more embodiments, if the bid is not approved for transmission, the orchestrator 363 informs the agent of this, and takes no further action.

In some cases, the orchestrator 363 provides the agent with a rationale for why the bid was not accepted; for example, by citing rules and conditions that were responsible for the bid's failure to be approved.

Optionally, the orchestrator 363 may assess some form of penalty to an agent whose message has been rejected under certain criteria; for example, if the agent submitted the message under conditions for which it was expressly forbidden to do so.

Agent Software Architecture

Figure 40:
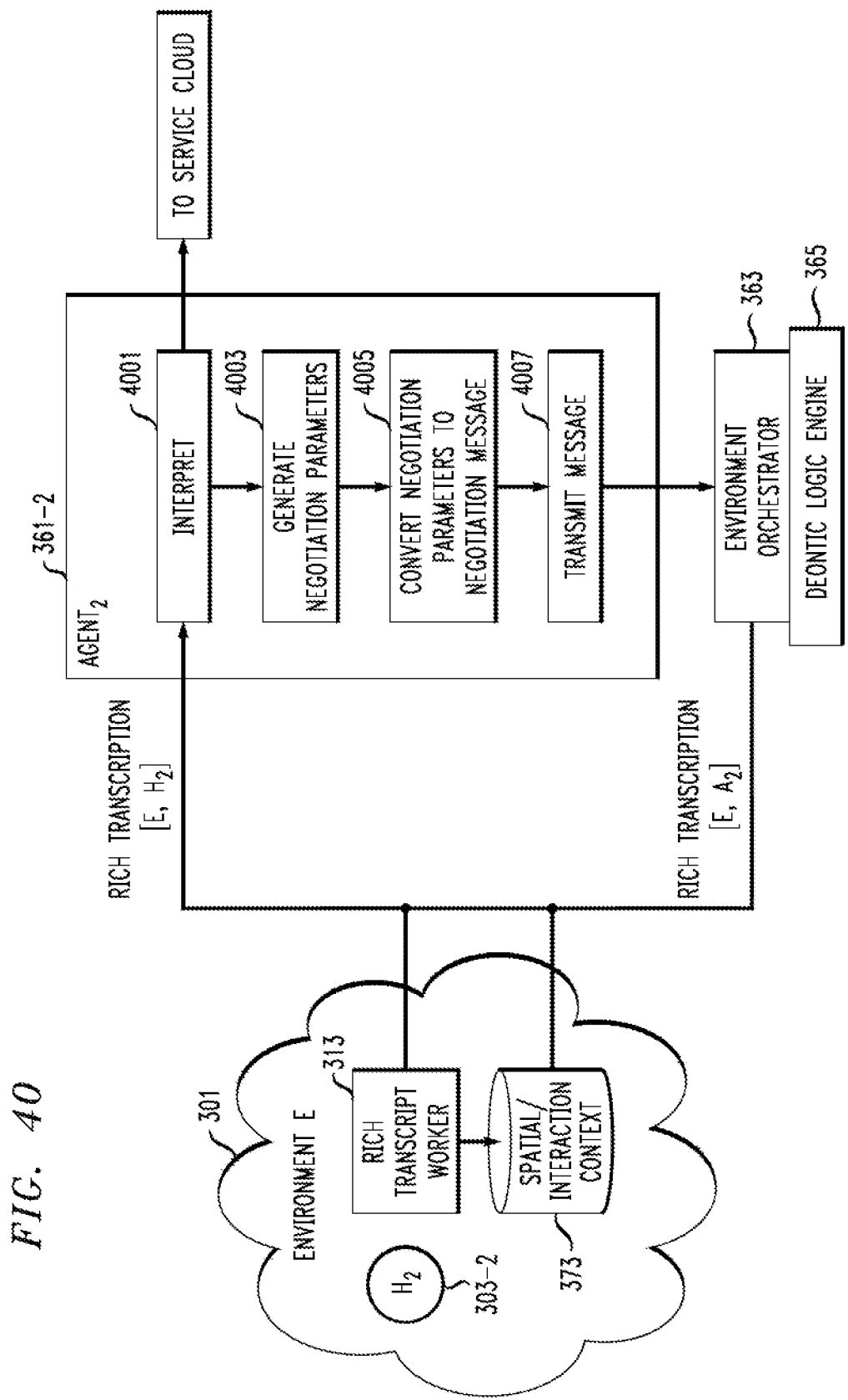
FIG. 40 is a block diagram of an exemplary software agent, according to an aspect of the invention.

FIG. 40 shows the internal structure of an exemplary agent, along with some of the messages that flow into and out of it. The agent 361-2 receives a rich transcription from the Environment E 301 that includes a human utterance and/or a transcription thereof as well as non-verbal behavioral information such as head orientation, gestures, facial expressions, and the like. The rich transcription may optionally be accompanied by contextual information such as a record of recent human behavior (e.g. gestures, head orientation, utterances). The transcript, and optional by-context information, are received by an INTERPRETATION engine 4001 that produces a structured representation of the human's communication act. As will be discussed in more detail below, the representation that is produced includes the type of negotiation or non-negotiation act intended by the human, as well as certain parameters, such as the offered price and a specification of the goods that the human is offering to buy or sell. To aid in its task, the INTERPRETATION block may can use of services such as those in the service cloud discussed elsewhere herein.

The INTERPRETATION block passes the structured representation that it has extracted to a GENERATE NEGOTIATION PARAMETERS block 4003 whose purpose is to produce a responsive negotiation act such as a counteroffer, an acceptance or rejection, or any other allowed type of response in a structured representation. This task includes, for example, the execution of certain mathematical algorithms. For this task, the agent may optionally make use of known mathematical libraries or services. In addition to considering the current human negotiation act, the agent maintains a history of messages received from humans and other agents. Optionally, the history may include decisions or actions taken by the agent (such as its latest offer, to ensure that it maintains a consistent stance during the course of a negotiation; this can guard against the possibility of appearing to renege on an offer it has made earlier).

Once the GENERATE block 4003 produces the structured representation of the responsive negotiation act, it passes that representation to a CONVERT block 4005 that converts the structured representation of the responsive bid to a human-friendly representation containing the text of an utterance and optionally some additional behavioral specifications for the avatar that represents it in the environment, as detailed below.

Finally, once the human-friendly negotiation message is formatted by the CONVERT block 4005, it is forwarded to the TRANSMIT block 4007, which sends it to the Environment Orchestrator 363 for vetting (block 4007 could use, for example, RESTful API calls, publication-subscription messaging, message passing or direct invocation techniques). If the message is allowed by the Environment Orchestrator, a rich transcription of the agent's message is forwarded to the Environment 301 and also sent to each agent in the system, thereby making all of the other agents aware of the negotiation act. This information can be stored in the History of each agent for future reference.

Agent Message Interpretation

Still referring to FIG. 40, consider aspects of the process by which a software agent 361-2 (for example) interprets the negotiation action(s) of humans or other agents. Utterance interpretation engine 4001 (Watson™ Assistant discussed elsewhere herein is a non-limiting example) attempts to extract a negotiation action type and associated parameters. In block 4001, interpret parameters of a negotiation act by another agent or human. In one or more embodiments, the negotiation action type is determined by a classifier that is trained using several representative examples of each type of negotiation action. One example of such a technology is the intent classifier of an assistant 388 such as a conversational AI platform (e.g. Watson™ Assistant available from International Business Machines Corporation, Armonk, N.Y., USA). The associated parameters may be extracted from text such as "I'll give you $10 for 2 eggs, 3 cups of flour, and 2 cups of milk" via heuristics that look for numeric values in proximity to names of goods that are known to be for sale in a given domain. In one or more embodiments, possible negotiation actions include: REQUEST, PROPOSAL, ACCEPT, REJECT, and IRRELEVANT.

A REQUEST is a solicitation from buyer or seller stating that she or he wishes to acquire or sell certain types of good. The associated parameters are a list of desired goods and the quantities of each good. For example, one could represent a request for 2 eggs, 2 units of milk and 3 units of flour by the JSON (JavaScript® Object Notation)(registered mark of ORACLE AMERICA, INC. REDWOOD SHORES CALIFORNIA) object: {"type": "request", "parameters": {"eggs": 2, "flour": 3, "milk": 2}}.

A PROPOSAL is a proposed offer by the buyer or seller to acquire or sell a specified set of items for a specified price, possibly in response to an offer from another party. The associated parameters are a list of goods and associated quantities plus a price for that bundle. For example, one could express a proposal to buy or sell 2 eggs, 2 units of milk and 3 units of flour for $10 by the JSON object: {"type": "proposal", "parameters": {"eggs": 2, "flour": 3, "milk": 2, "price": 10}}.

In the ACCEPT action, the buyer or seller accepts a proposal from another party. The associated parameters are a proposed offer plus an indication that the negotiator wishes to accept that offer. For example, one could express acceptance of an offer from a seller to sell 2 eggs, 2 units of milk and 3 units of flour for $10 by the JSON object: {"type": "accept": "parameters": {"eggs": 2, "flour": 3, "milk": 2, "price": 10}}.

In the REJECT action, the buyer or seller rejects a proposal from another party. The associated parameters are a proposed offer plus an indication that the negotiator wishes to reject that offer. For example, one could express rejection of an offer from a seller to sell 2 eggs, 2 units of milk and 3 units of flour for $10 by the JSON object: {"type": "reject", "parameters": {"eggs": 2, "flour": 3, "milk": 2, "price": 10, "accept": false}}.

An IRRELEVANT utterance is one that is not recognized as any of the other types of bid; possibly a side comment. No parameters are necessary in this case. For example, one could express an irrelevant utterance as {"type": "irrelevant"}.

In one or more embodiments, the negotiation action type is determined by a classifier that is trained using several representative examples of each type of negotiation action. One example of such a technology is the intent classifier of an assistant 388 such as a conversational AI platform (e.g. IBM's Watson™ Assistant). The associated parameters may be extracted by heuristics that look for numeric values in proximity to names of goods that are known to be for sale in a given domain.

In another embodiment, somewhat more sophisticated logic can be used to incorporate context into the utterance interpretation. Consider for example:

Seller: I'll sell you 2 eggs, 3 cups of flour, and 2 cups of milk for $12.
Buyer: How about if you throw in another egg and lower the price by $2?

In this case, the seller could recognize that:
buyer is referring to the seller's prior proposal of {"type": "proposal", "parameters": {"eggs": 2, "flour": 3, "milk": 2, "price": 12}}
counteroffer is expressed incrementally, #eggs is to be incremented by 1; price is to be decremented by $2; all other parameters stay the same.

From this the seller would interpret the buyer's counteroffer as {"type": "proposal", "parameters": {"eggs": 3, "flour": 3, "milk": 2, "price": 10}}.

Note that in this case the accuracy of the intent classifier can be improved by taking into account the class of prior utterances in the negotiation between the two parties, i.e. knowing that the prior proposal from the seller was of type "PROPOSAL" would help the system interpret the buyer's incremental proposal as such.

As another example of the use of context, a negotiator's proposal might be interpreted in an incremental manner. Consider the following exchange:

Buyer: I want 3 eggs.
Seller. I can sell you 3 eggs for $5.
Buyer: I also want 2 cups of flour.
Seller: I'll give you 3 eggs and 2 cups of flour for $10.

Note that the seller has used the context of the buyer's previous request for 3 eggs to interpret "I also want 2 cups of flour" as an incremental request on top of the prior one. This interpretation can be achieved using heuristics, or by using a machine-learning algorithm that performs co-reference resolution throughout the dialog.

In another embodiment, the associated parameters can be extracted not just from numeric values but from adjectives or other qualifiers contained within the utterances, as illustrated below:

Buyer: I want 3 eggs.
Seller. I can sell you 3 eggs for $5.
Buyer: That's too much.
Seller: $4.50.
Buyer: Actually, I need more eggs.
Seller. I can sell you 5 eggs for $8.

In this example, the term "more" is understood as "more than 3," and, based on the context, the agent implements a heuristic to estimate an approximate number greater than 3-5 in this example—to formulate the bid.

In still another embodiment, computer vision algorithms are employed to gauge emotion and/or other visual cues from the human and respond appropriately. One approach is for services operating in the environment to infer human emotion in a suitable representation such as:

"humanEmotion": {"sad", 0.8, "angry": 0.4}

Then, this inference about emotion is supplied to the agent via the rich transcription worker 313, and the agent incorporates it into its bidding algorithm and its conversion of the structured bid to human-friendly form; e.g., by saying "I have just the thing to cheer you up: a discount of $2 on your next purchase of a dozen eggs or more!"

A second approach is for the agent to make the inference about human emotion on its own, based upon raw video footage supplied by the rich transcription worker.

Agent Negotiation Algorithm

Refer now to block 4003 in FIG. 40, where the agent is generating the parameters of its own negotiation act. In one or more embodiments, each software agent is free to employ any negotiation algorithm. For certain negotiation conditions and rules, several effective negotiation algorithms are known in the art.

Generally, the algorithm should decide whether to respond to a proposal and what negotiation act to respond with.

Whether to respond to a proposal: Depending on negotiation rules that may be enforced by the environment orchestrator, this can be a combination of permission and desire.

With regard to permission, in many multi-lateral negotiation scenarios, there will be regulations that govern whether an agent is permitted to respond to an offer; for example, the rules might require that the agent only respond if it is the addressee. In one or more embodiments, each agent is made aware of the rules under which it is permitted to take a given type of negotiation act, and it abides by those rules voluntarily, either out of a built-in sense of obligation or in an effort to avoid a threat of punishment by the central manager if it does not adhere to these rules.

With regard to desire, the negotiation algorithm may determine that the best action is no action, in which case the agent may issue a Reject message, or just not respond at all.

What negotiation act to respond with: If a response to a bid is permissible and desired, the algorithm will determine the type of act and the associated parameters.

In another embodiment, the agent's negotiation algorithm attempts to anticipate what the user may want, using various machine learning technologies that are trained from past experience with human negotiators. Rather than simply adjusting price, an agent armed with this technique can change the bundle to reflect what the agent thinks the user might find valuable. The machine learning technique could either be used solely to generate a structured bid, or it could also be used to generate a human-friendly version of the bid, either by converting it from an intermediate structured bid or directly without using a structured bid as an intermediate step. The negotiation parameters are converted to a negotiation message in block 4005; e.g., in a human-friendly form (discussed elsewhere herein). The human-friendly message is transmitted at block 4007 (discussed elsewhere herein).

Agent Human-Friendly Bid Generation

Refer now to block 4005 in FIG. 40. In one or more embodiments, the agent uses fixed templates to convert from the structured bid to a human-friendly form of the bid, e.g.

{"price": 10, "quantity": {"egg": 3, "milk": 2}} can be converted straightforwardly to "I'll sell you 3 eggs and 2 cups of milk for $10."

In another aspect, the text can be augmented by additional information that specifies:

voice inflections or alternations in pitch or tone that may be added during the speech synthesis process to convey an emotion such as excitement, happiness, disappointment, anger, etc.

actions to be taken by the avatar while the speech is being rendered for the purpose of conveying emotion or appearing more realistic, such as waving, moving lips in accordance with the spoken text, making various facial expressions, etc.

In one or more embodiments, an interesting aspect of the interaction is that Agents are not just able to present bids in natural language but also to speak to the user in a way so as to "sell" their products. These convincing arguments or marketing strategies can include, e.g., flattery, enticing appeals, counter arguments, and the like.) Indeed, in some cases, the agent may use generative machine learning algorithms, such as deep convolutional neural networks, to generate human-friendly text from a structured form. A strategic element can be incorporated into the human-friendly negotiation act, whereby the agent attempts to entice the human by presenting the offer in an attractive, enticing manner. For example, the following two sell offers are technically equivalent, but depending on buyer psychology one may be perceived as more attractive than the other:

Representation #1. I'll sell you 3 cups of flour, 2 cups of milk and 2 eggs for $10.

Representation #2. As a special offer, if you purchase 2 cups of milk, 2 cups of flour, and 2 eggs from me for $10, I'll thrown in an extra cup of flour for free!

Multi-Lateral Negotiation Scenarios

The non-limiting examples presented thus far pertain to situations where a bundle of discrete (single-attribute) commodities is being sold. However, aspects the invention can be applied as well to negotiation over multi-attribute goods or services, such as:

cameras with different megapixels, shutter speeds, weight
cars with different styles, colors, acceleration, interior space, etc.
car insurance.

Aspects of the invention can be applied to bundles of multi-attribute goods and services as well, and can involve multiple humans and multiple agents simultaneously. In the case of multiple humans, each human's speech should be captured separately (e.g. by wearing lapel microphones configured to accept audio only from very close range) and each human should be interacted with separately.

Referring to FIG. 32, in some cases, the system provides certain aids that human negotiators find useful, such as a user interface that assists the human with the process of forming a bid by keeping track of current offers from one or more agents, and helps evaluate the relative attractiveness of those offers with respect to the user's private valuations or costs for the various goods.

Optionally, the system provides representations that are displayed on the screens to illustrate the negotiation process, through charts, tables or any representation that not only help on the formation of the bid, but also help humans to learn the heuristic or strategies that are being used by the avatars throughout the interaction. Information with regard to the Pareto Frontier can also be included. For example, if there are three participants in the conversation, a three-dimensional plot of the Pareto Frontier can be updated on each interaction. For n>3 participants, techniques (such as projections) for representing n-dimensional data on a 2- or 3-dimensional plot can be used to represent the frontier.

Exemplary Flows and Messages

Figure 7A:
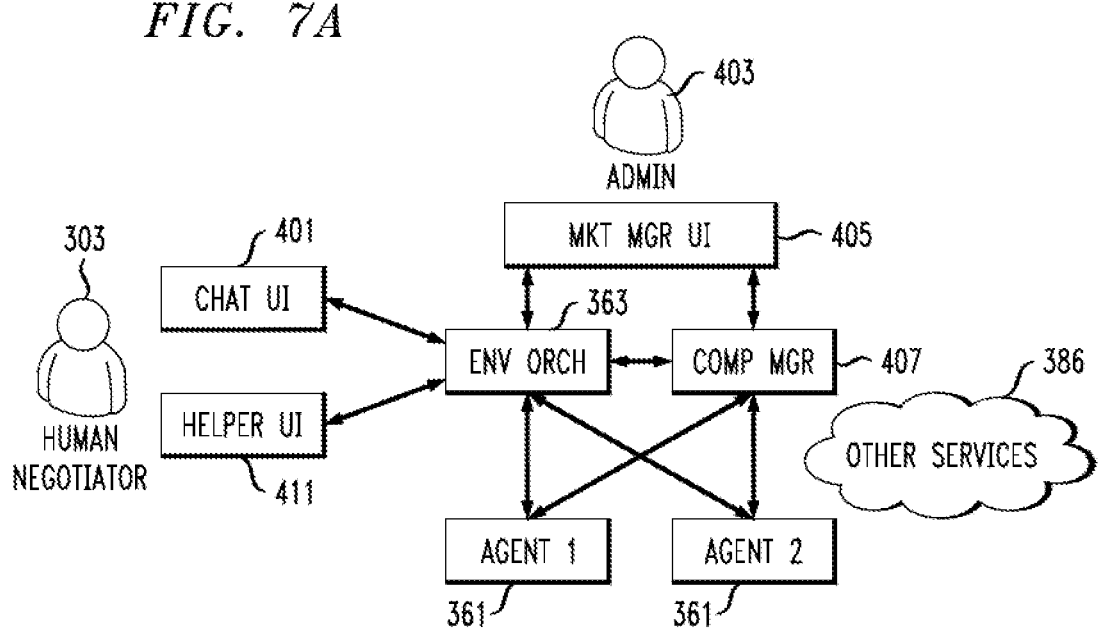
Figure 7B:
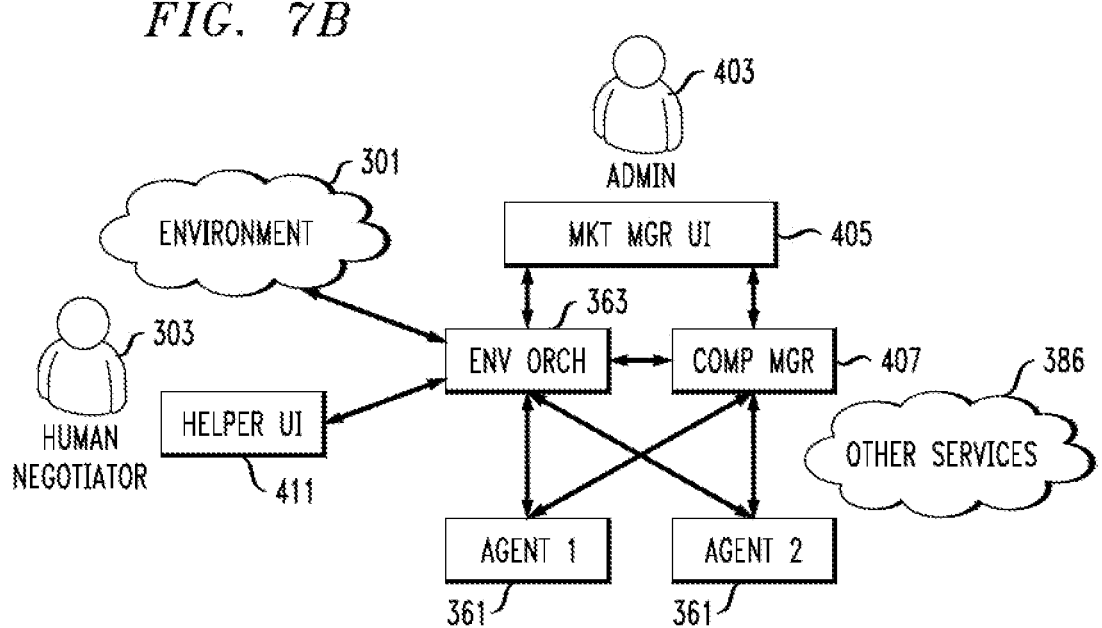

FIG. 7A shows an exemplary "test" environment while FIG. 7B shows an exemplary "competition" (actual) environment. Please note that various embodiments and examples are presented herein in the context of a "competition" but these are equally illustrative of actual production usage for a variety of tasks. Note human negotiator 303 and agents 361. Where tests are to be conducted, the test version of the negotiation platform should be as close as possible to the actual version in architecture and in the set of messages that are exchanged. In the example, the only difference between the test and the actual versions is that the test version uses a ChatUI 401, while the actual version uses environment 301. The ChatUI and environment 301 send and receive the same messages. For illustrative simplicity, the messages and diagrams in FIGS. 8-26 show the test configuration, but the actual configuration will be essentially the same with Environment 301 substituted for ChatUI 401.

Figure 8:
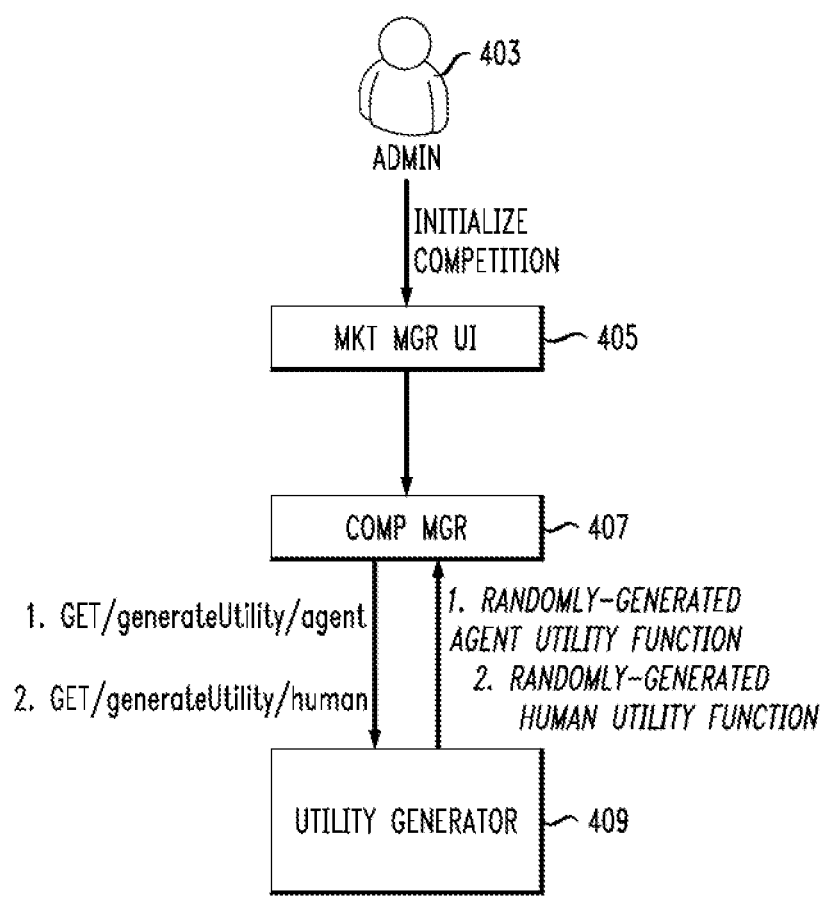
Figure 9:
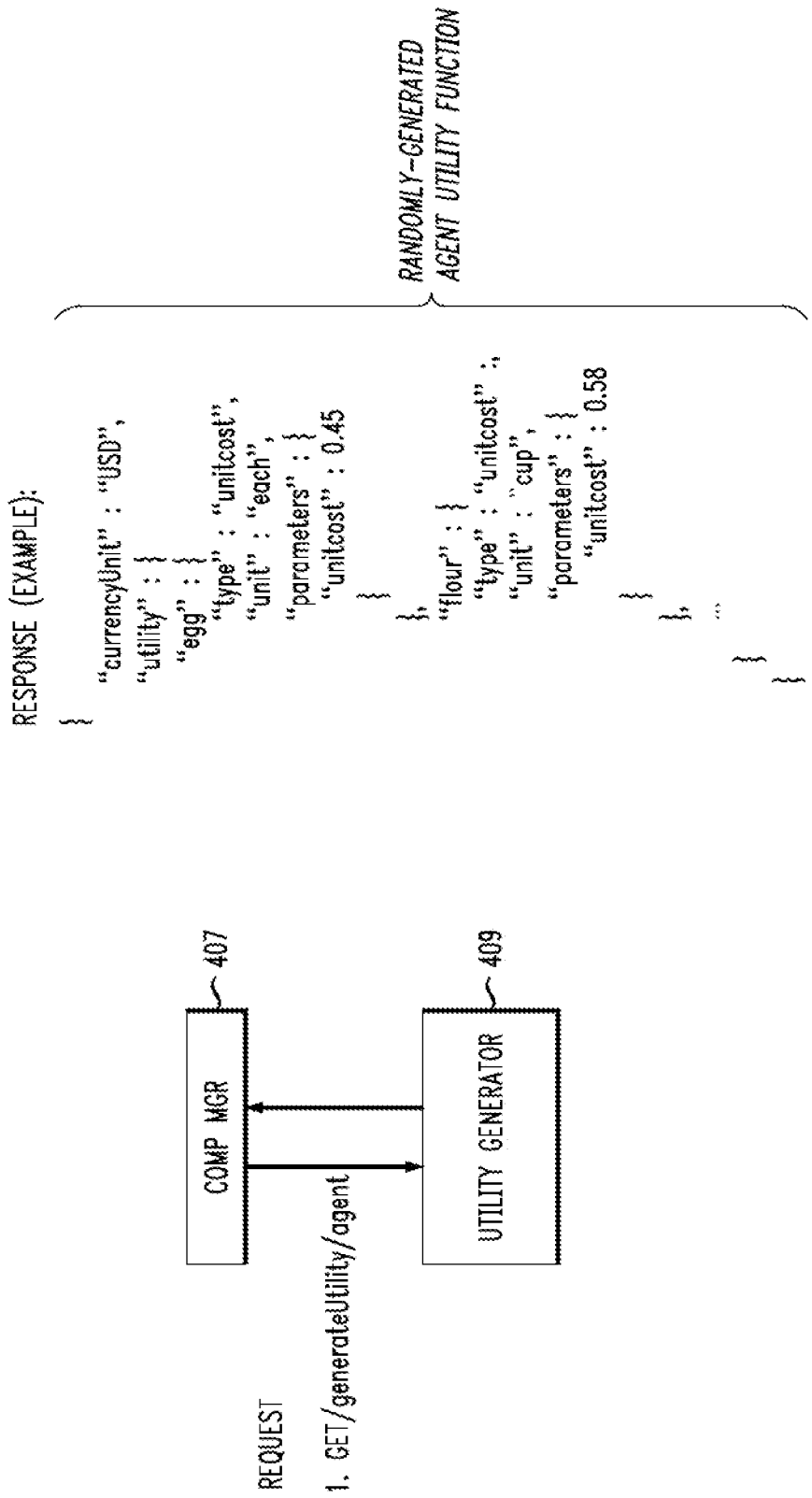
Figure 10:
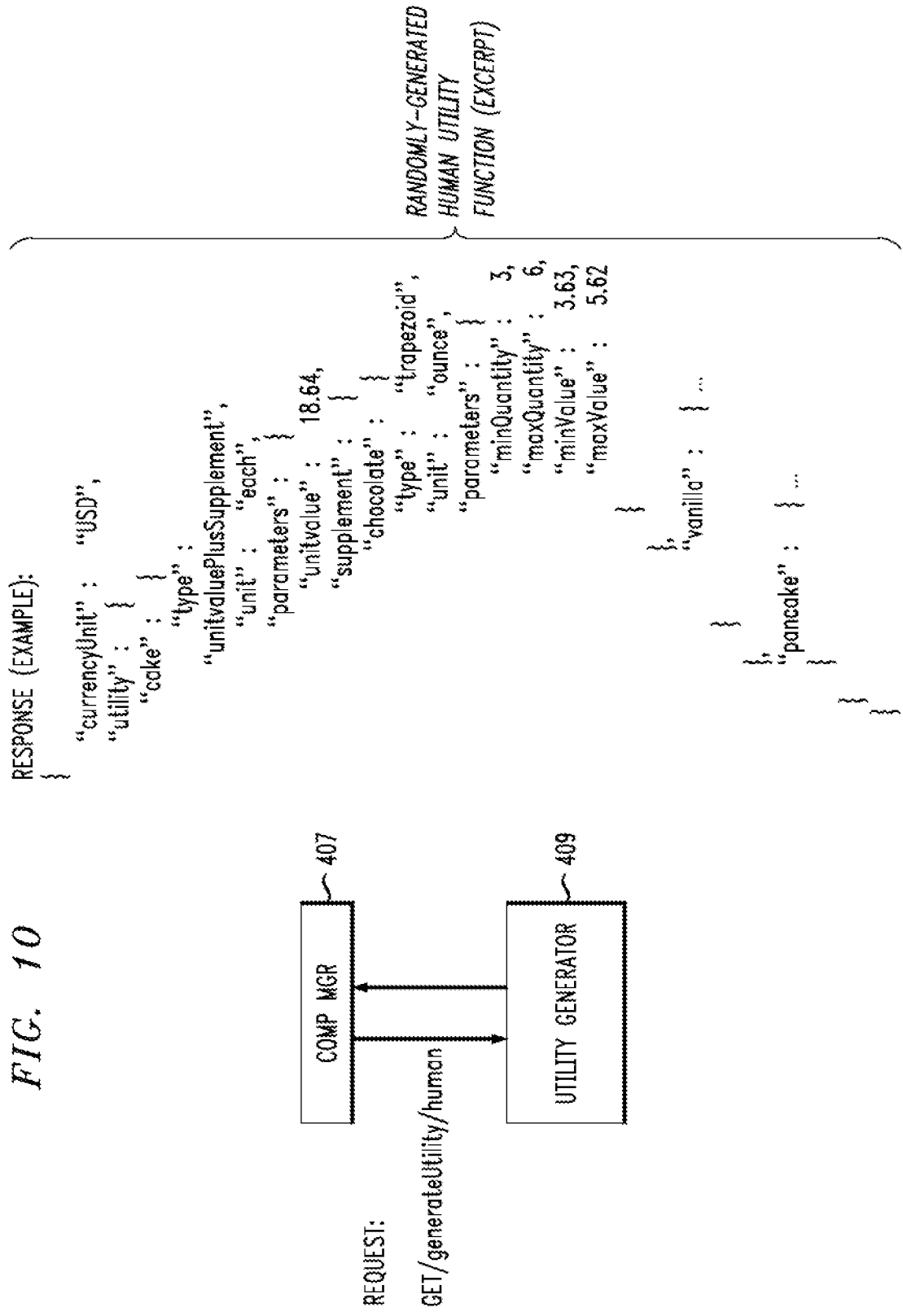

In FIG. 8, initialize the flow. The Administrator 403 clicks on "Initialize Competition" in the Market Place Manager UI 405. This causes the Competition Manager (CM) 407 to do two things. It makes several/generateUtility/agent calls to the Utility Generator 409. This API call has no query parameters. It also makes several/generateUtility/human calls to the Utility Generator 409. This API has no query parameters. For each such call, the Utility Generator 409 returns a randomly generated utility function. The CM 407 labels and stores these utility functions locally for use during the competition. FIGS. 9 and 10 show exemplary requests and responses for the agent and human cases, respectively.

Figure 11A:
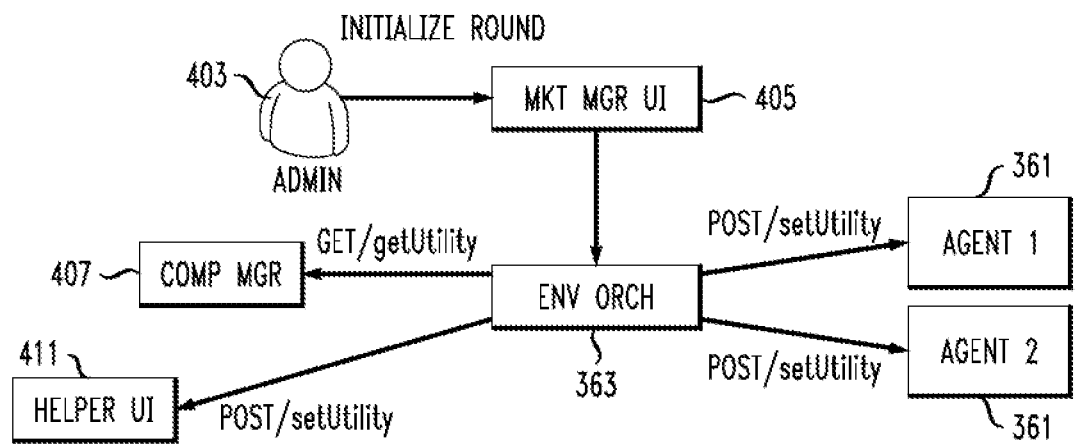
Figure 11B:
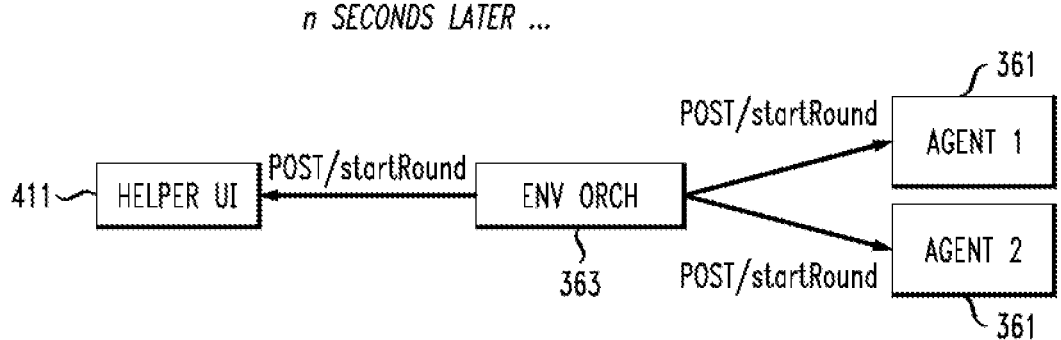
Figure 11C:
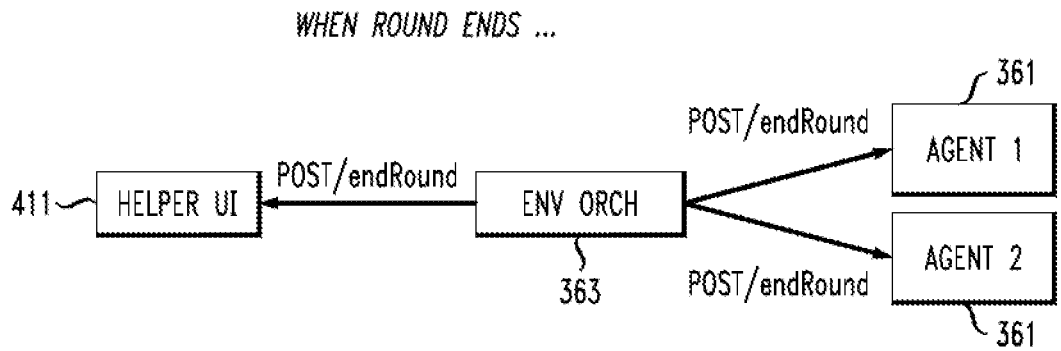
Figure 12:
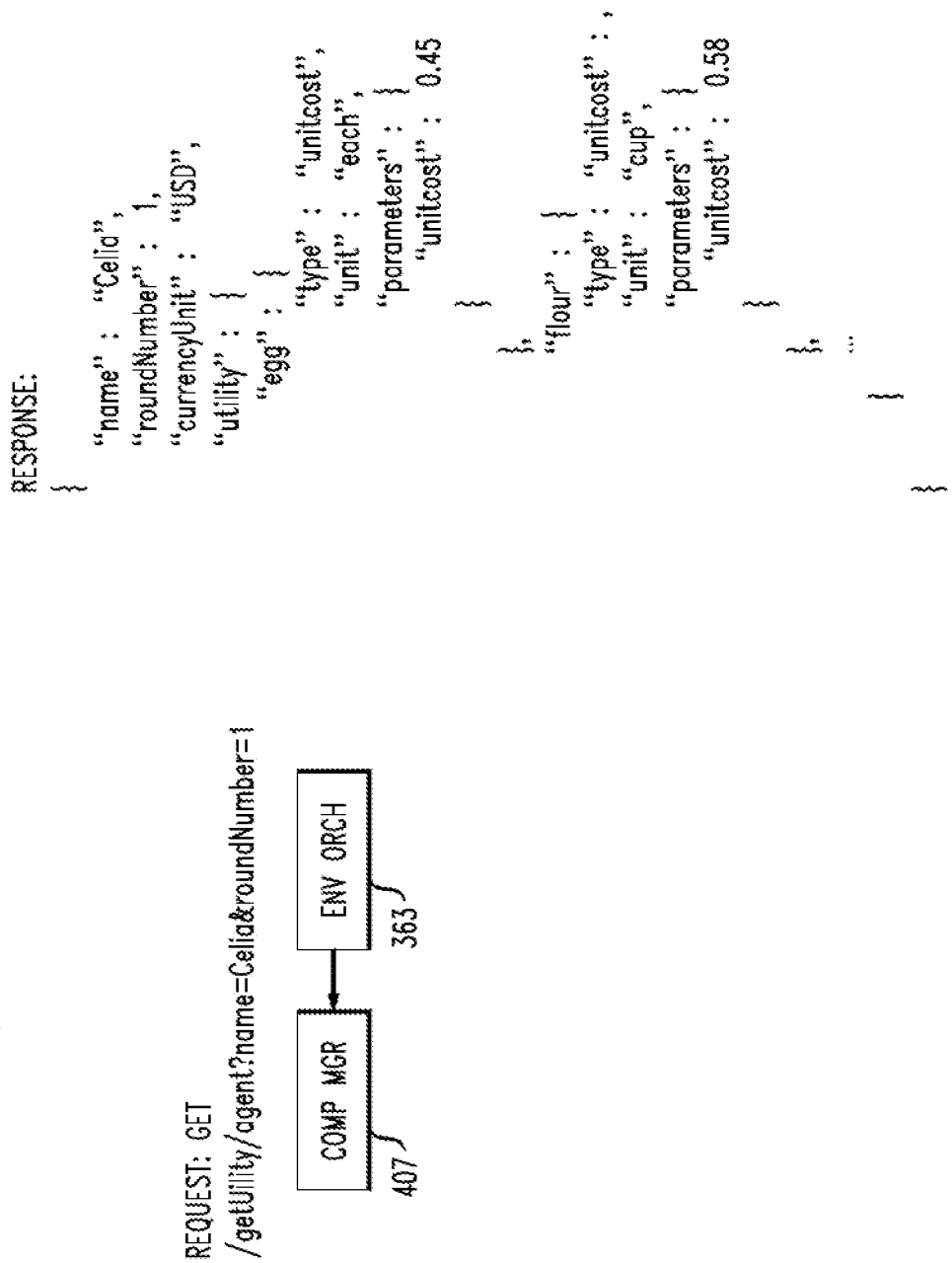
Figure 14:
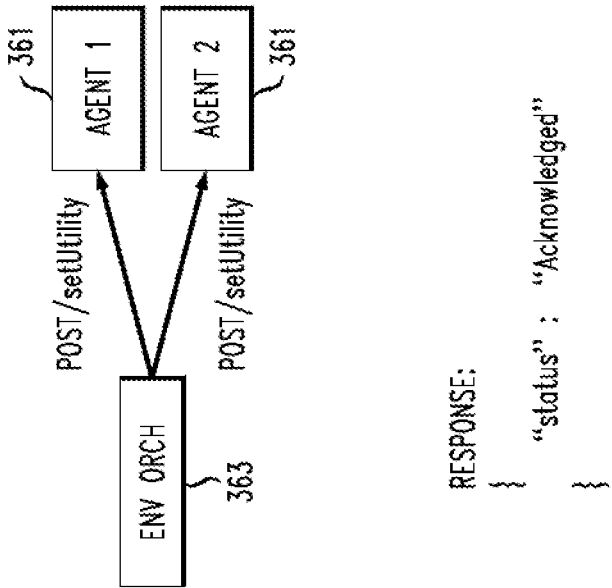
Figure 15:
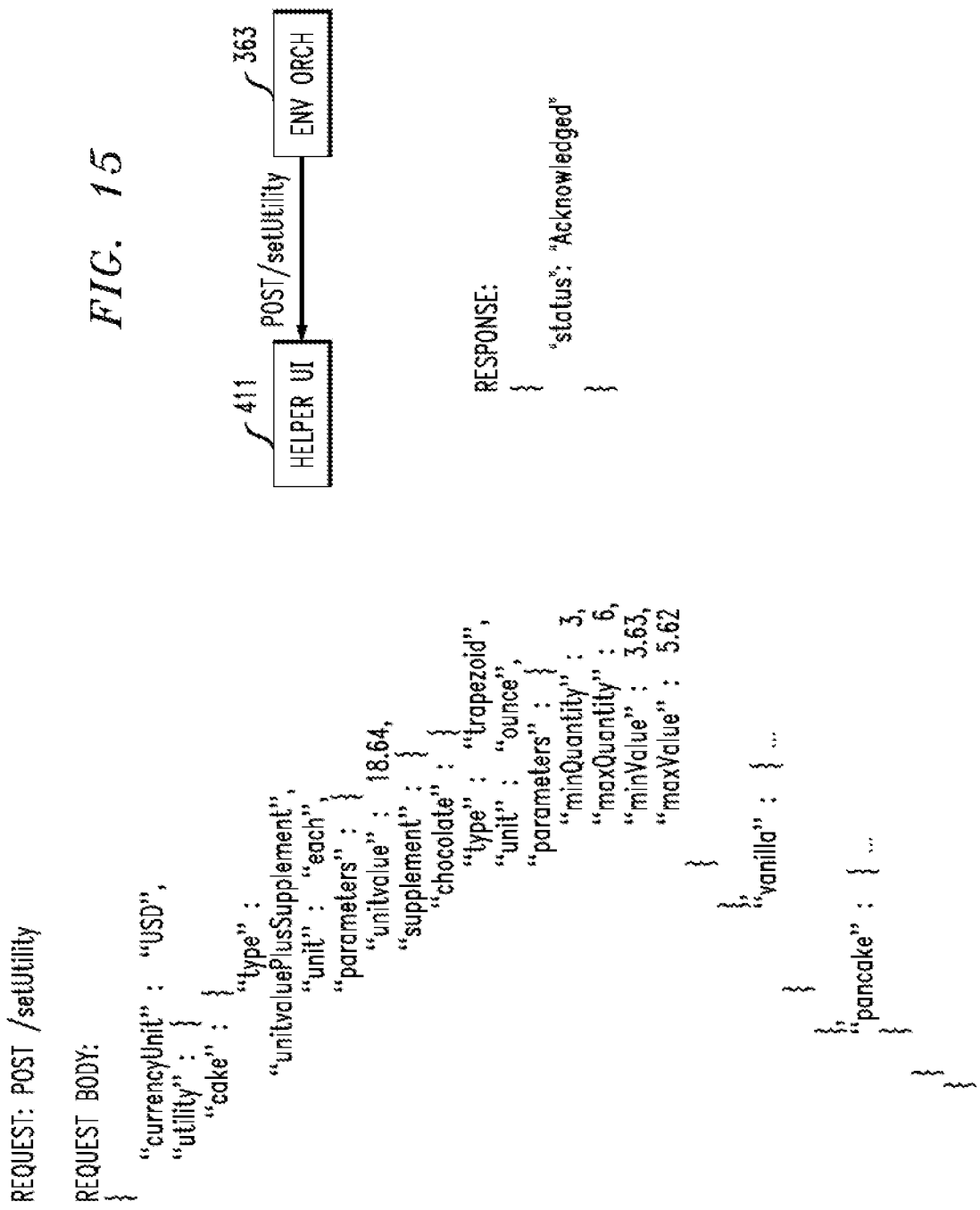
Figure 16:
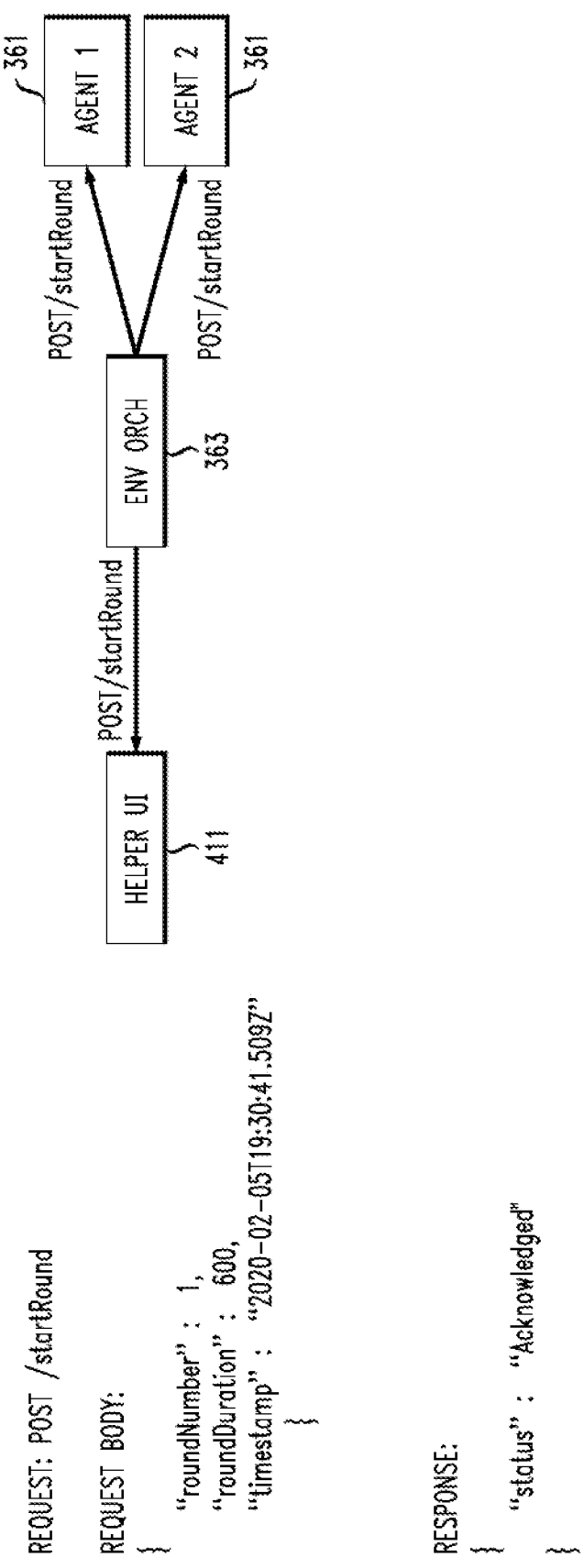
Figure 17:
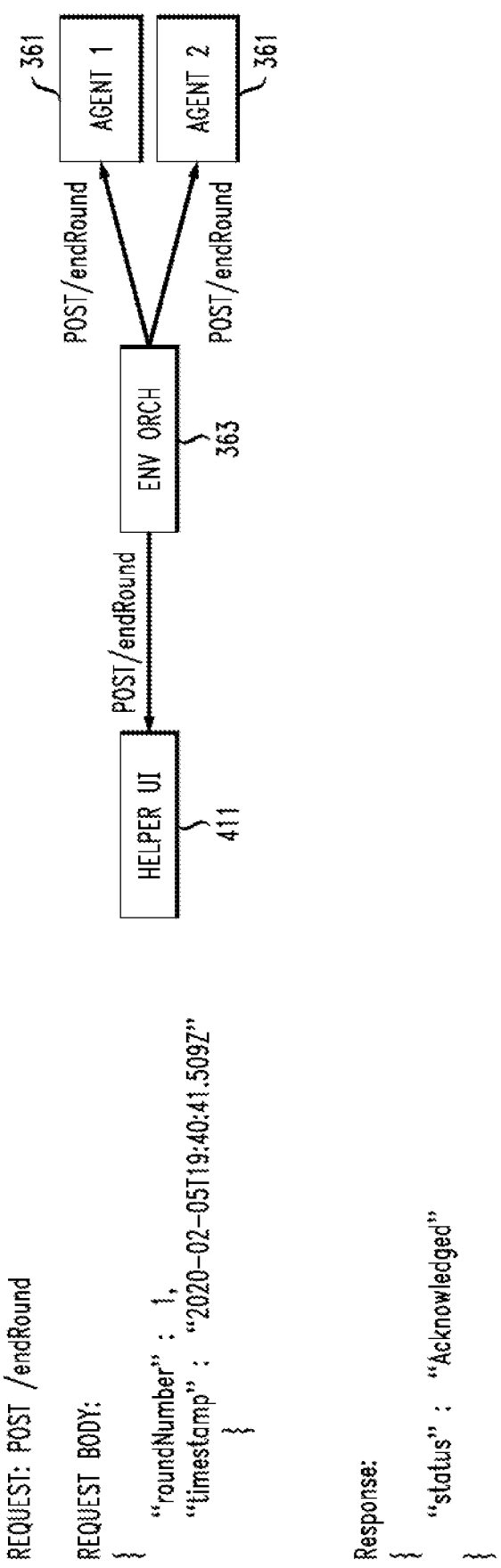

FIGS. 11A, 11B, and 11C show management of a round. To initialize a round, in FIG. 11A, the Administrator 403 clicks on "Initialize Round" in the MarketPlace Manager UI 405. This causes the Environment Orchestrator 363 to send getUtility messages to the Competition Manager 407 to obtain utilities for the current round and send setUtility messages to all players (both agents 361 and the Helper UI 411 used by the human). After a prescribed amount of time (say 30 seconds), send a startRound message to all players, as in FIG. 11B. When the round ends, send an endRound message to all players, as in FIG. 11C. FIG. 12 shows an exemplary request and response for get utility (agent). FIG. 13 shows an exemplary request and response for get utility (human). FIG. 14 shows an exemplary request and response for set utility (agent). FIG. 15 shows an exemplary request and response for set utility (human). FIG. 16 shows an exemplary request and response for start round. FIG. 17 shows an exemplary request and response for end round.

Figure 18:
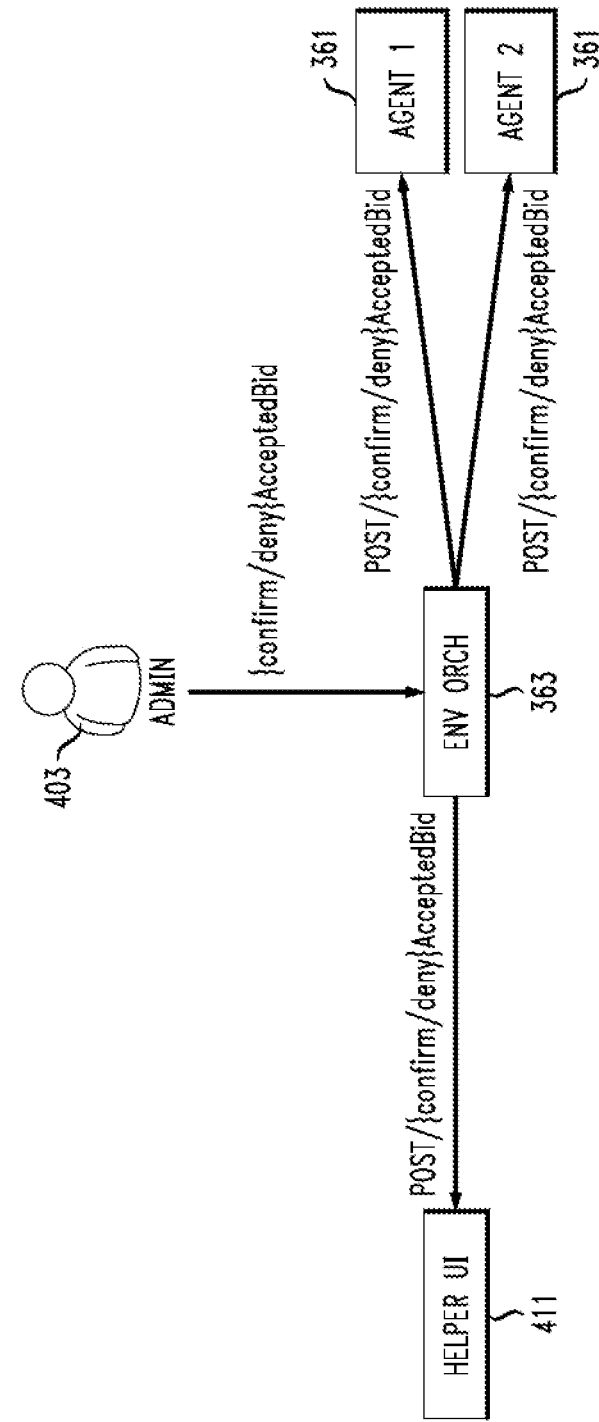
Figure 19:
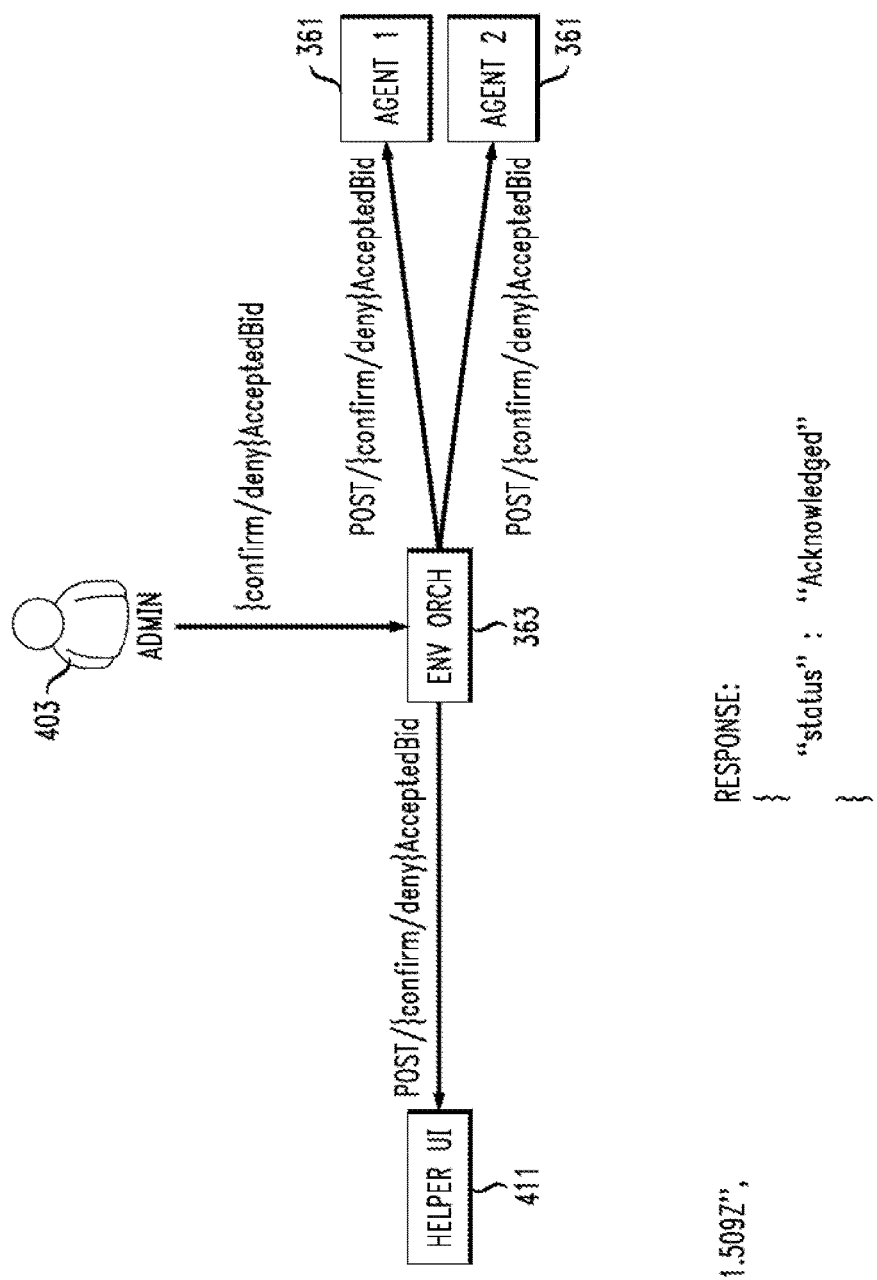

FIG. 18 shows confirmation of an accepted bid. When the human or an agent accepts a bid, the MarketPlace Manager UI displays the bundle and price details and gives the admin 403 "Confirm" and "Deny" buttons. In the case where the Admin confirms the bid acceptance, the EO 363 sends a confirmation message to the two parties; otherwise it sends a deny message to the two. FIG. 19 shows an exemplary request and response for confirmation of an accepted bid.

Figure 20:
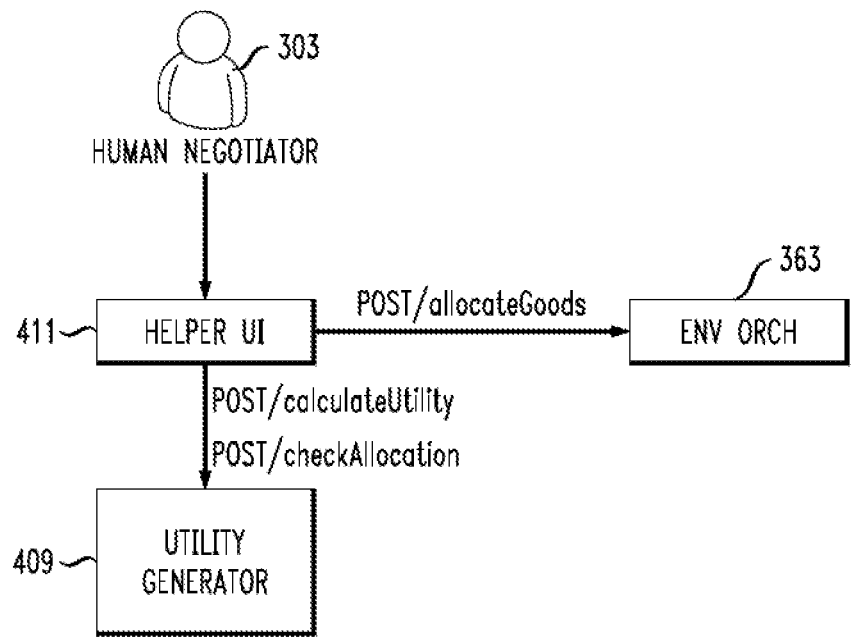
Figure 21A:
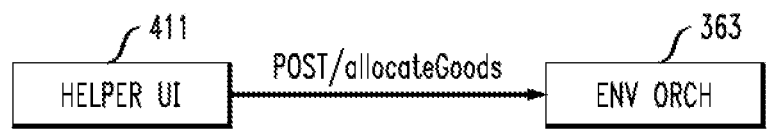

FIG. 20 shows an exemplary flow for resource allocation. When a round has completed, the human buyer 303 uses the Helper UI 411 to decide how to allocate the goods that he or she has purchased from the agents during that round into cakes and pancakes, optionally including some flavorings (chocolate, vanilla or blueberries). When the buyer is satisfied, she or he presses a "Submit Allocation" button on the Helper UI 411, which POSTs an/allocateGoods message to the Environment Orchestrator 363, which may store it or forward it to the Competition Manager. In one or more embodiments, both at the end of the round and during it, the Helper UI 411 performs some calculations relating to the human utility. These capabilities can be served by placing calls to the Utility Generator 409, or by incorporating them directly into the Helper UI 411. FIGS. 21A and 21B show an exemplary request and response for allocation of goods.

Figure 22A:
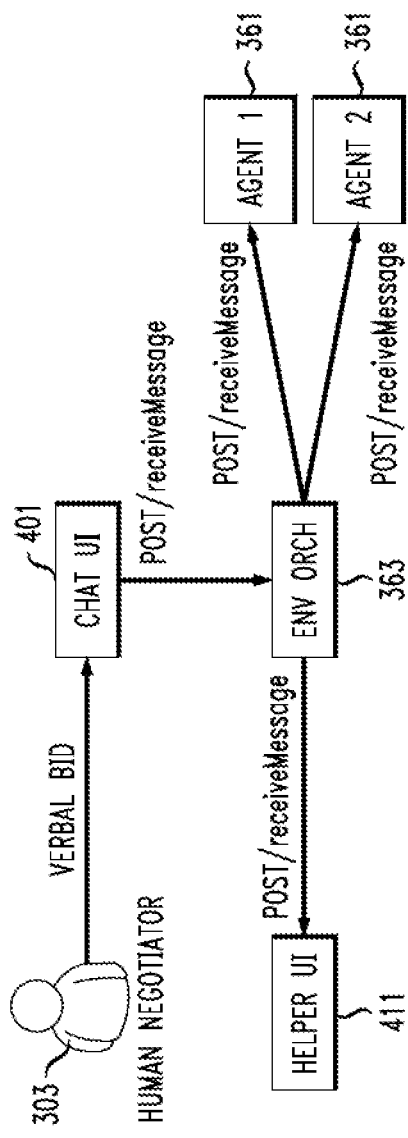
Figure 22B:
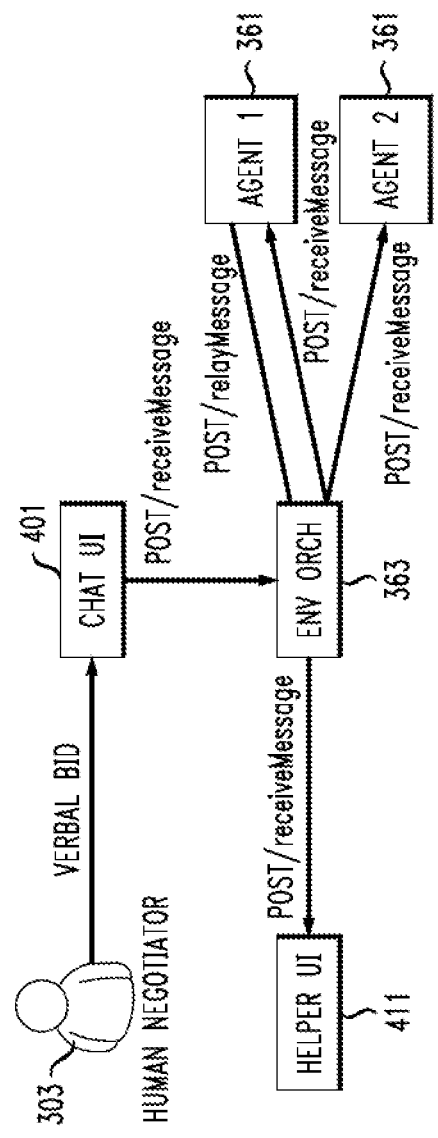

FIGS. 22A and 22B respectively show a negotiation message originating from a human and a negotiation message originating from an agent. Negotiation messages originate from a human buyer, or an agent seller. Typically, except when a human buyer is making an initial plea for goods, messages are in response to a solicitation or offer from a negotiator of the opposite role (buyer vs. seller). In one or more embodiments, messages from the human or agents are all POSTed to the EO's/relay Message end point. The EO 363 decides whether to let the message through. It can use engine 365 or other techniques to make this decision. If engine 365 is used, the EO 363 may keep some state information so that it can add the currentState information to the call to engine 365. If the message is approved, it is sent to both agents (including the one that had sent the message) and to the human via the/receiveMessage APIs of the Helper UI 411 (and the Chat UI 401 if the message originated from an agent). If the EO 363 decides not to forward the message, it calls the/rejectMessage API of the entity (human or agent) from which it received the message.

Figure 23:
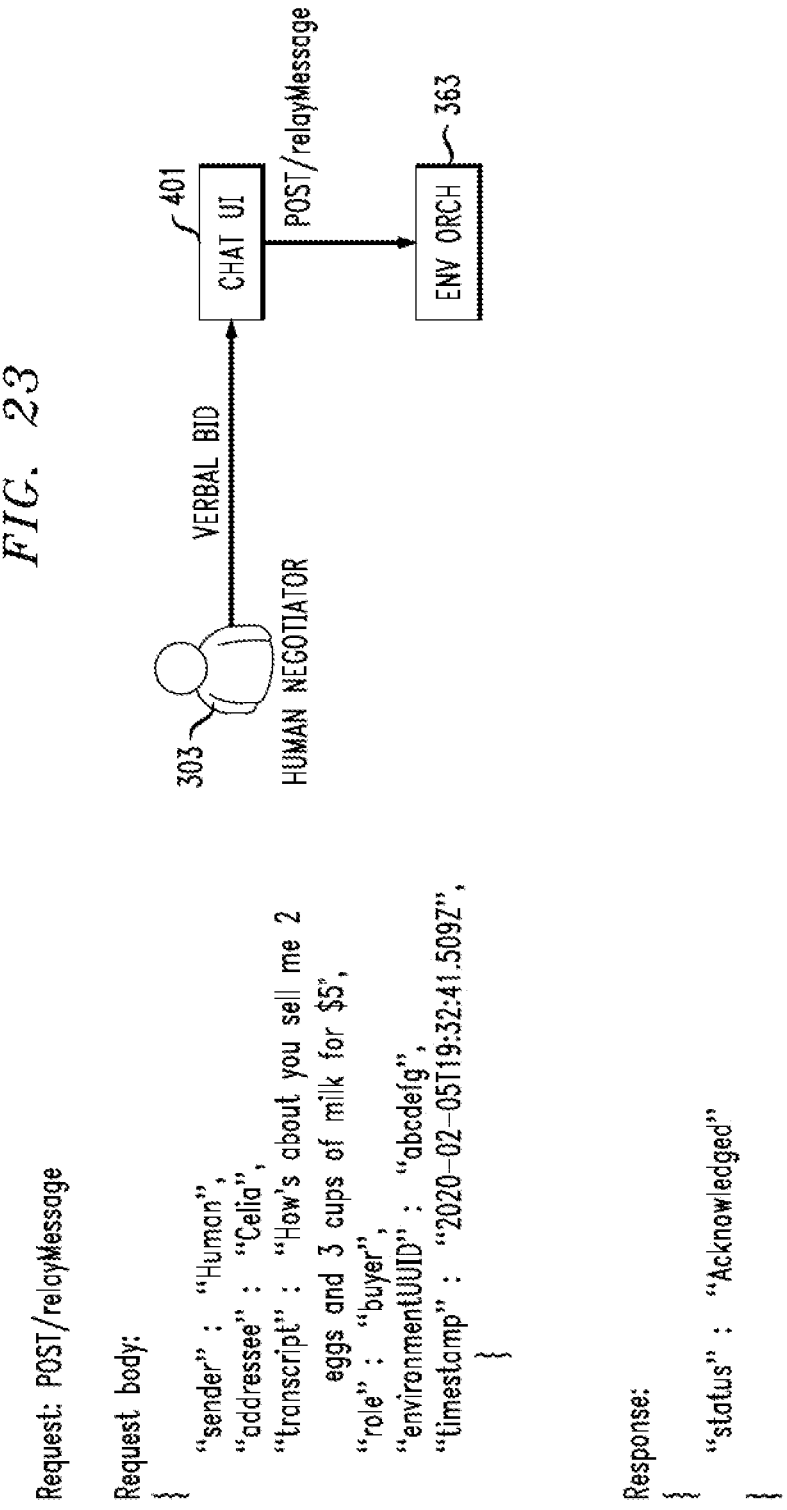
Figure 24:
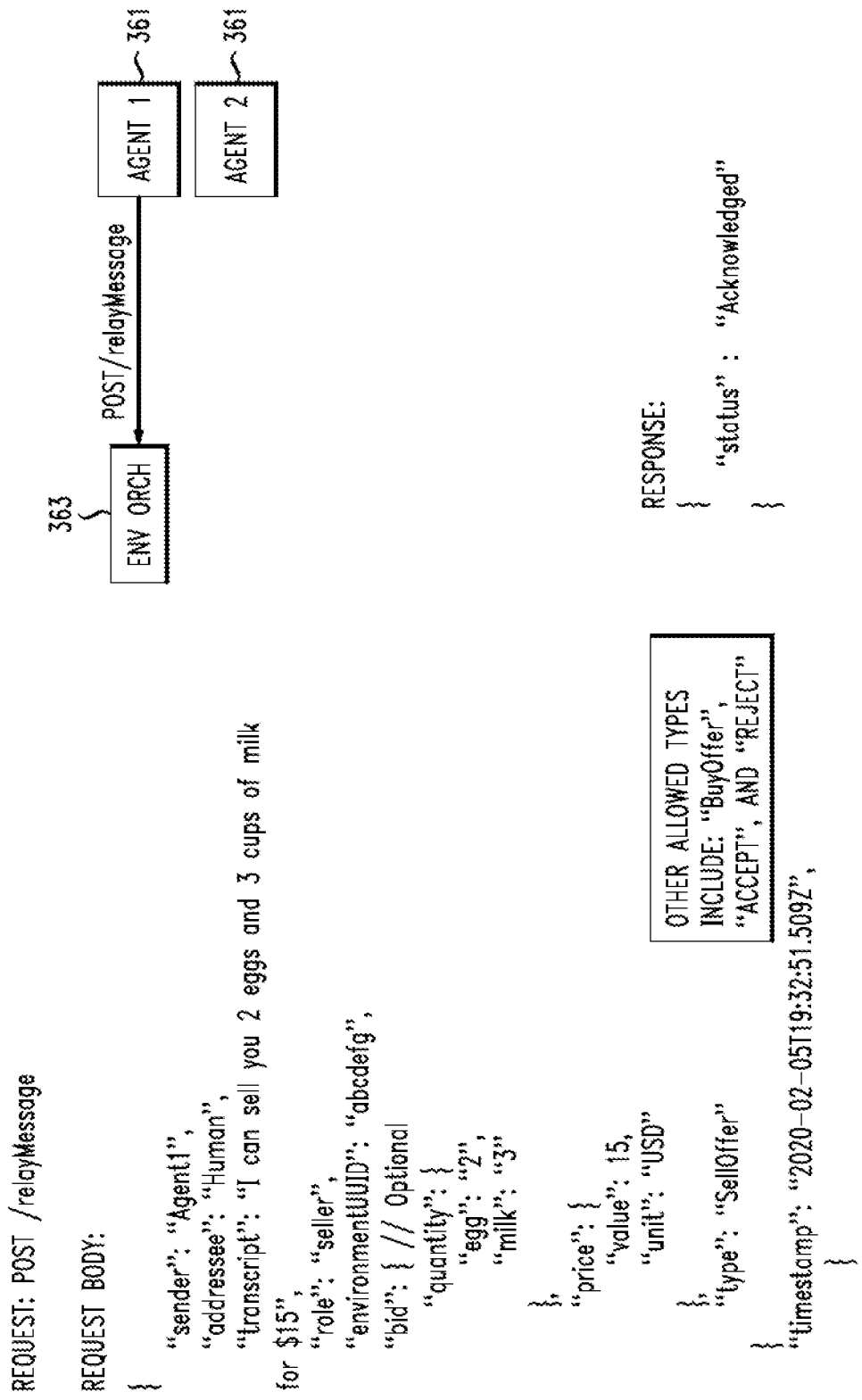
Figure 25:
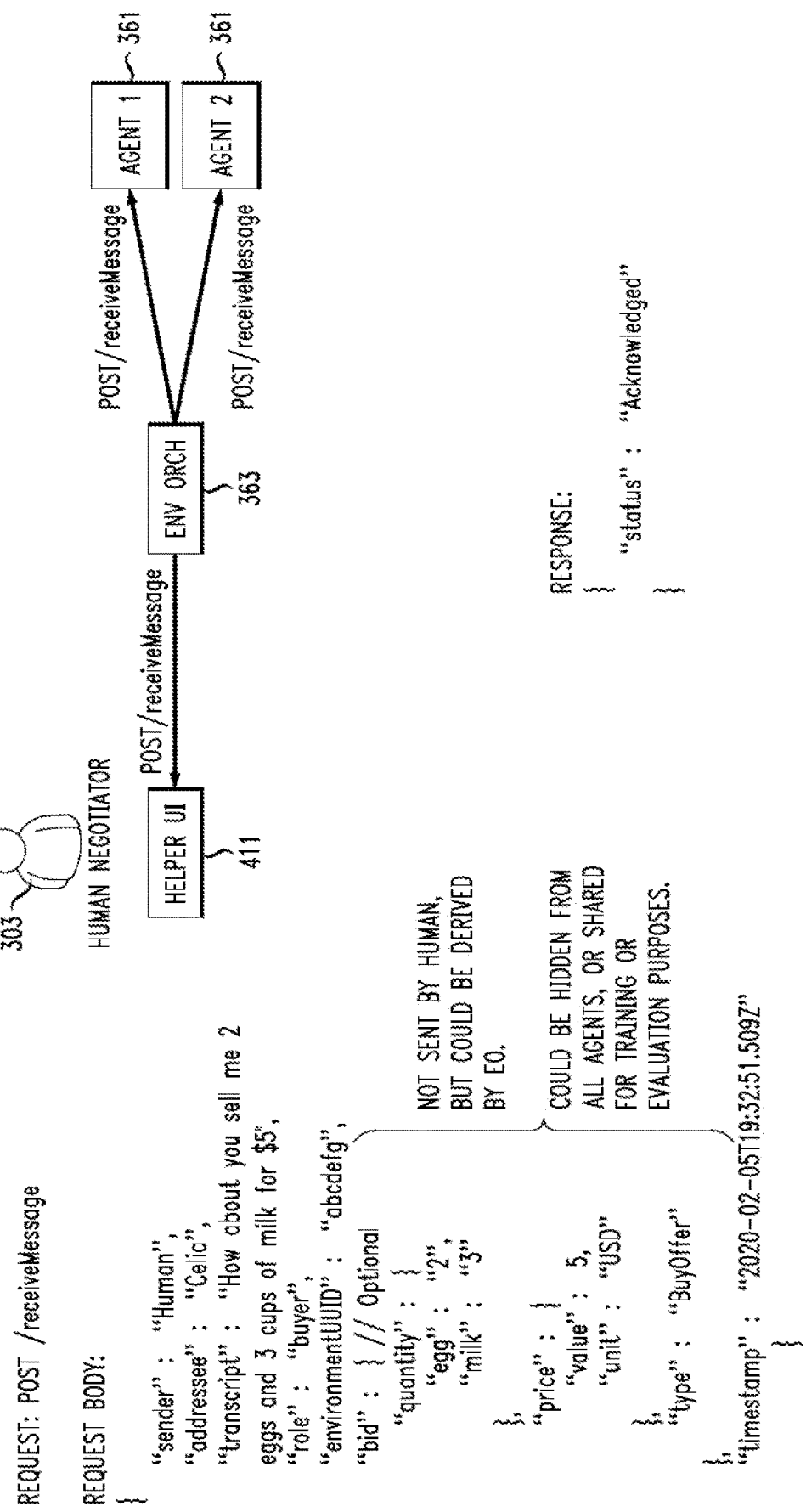
Figure 26:
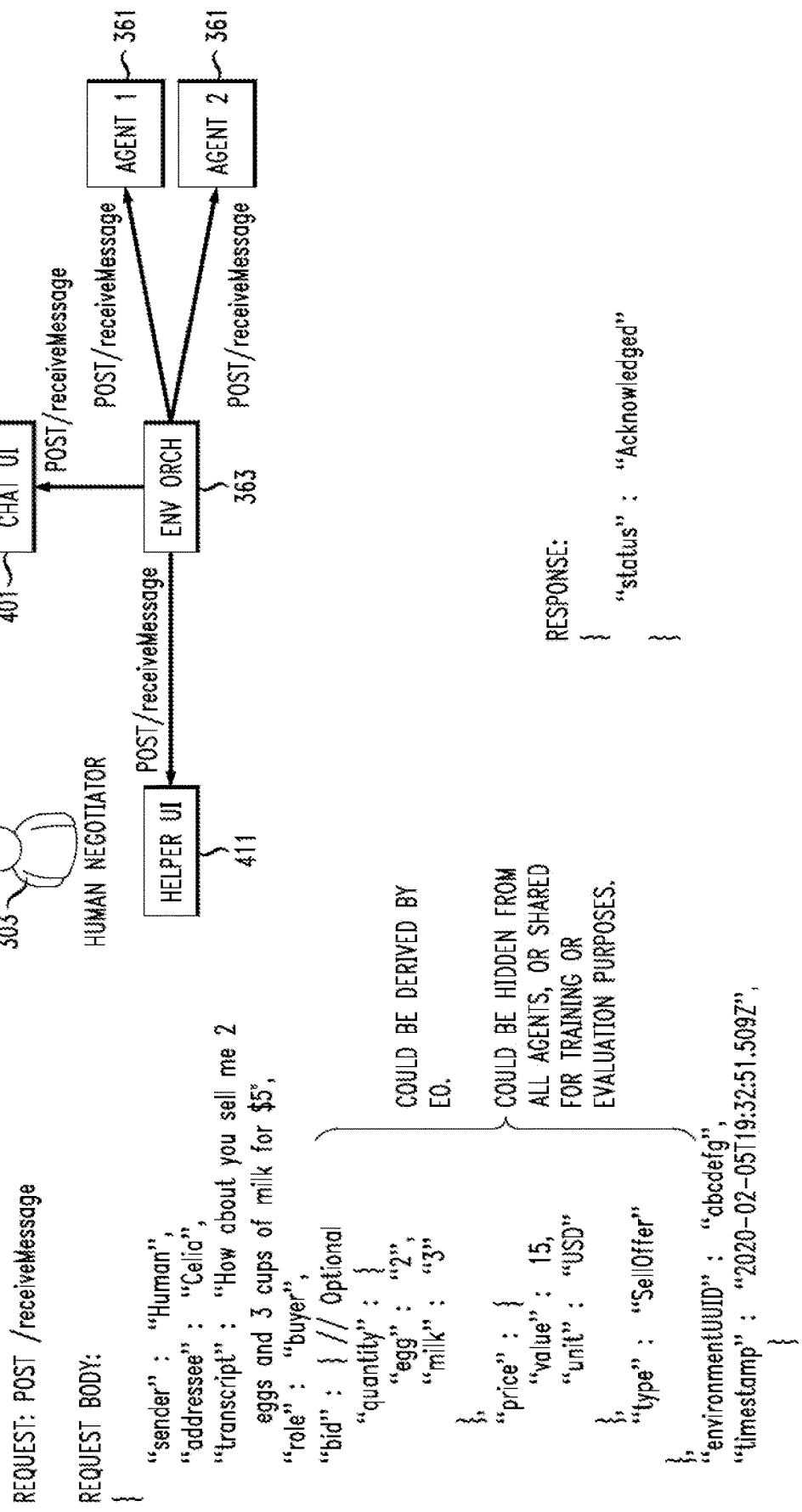

FIG. 23 shows an exemplary request and response for relay message (from a human). FIG. 24 shows an exemplary request and response for relay message (from an agent). FIG. 25 shows an exemplary request and response for receive message (from a human). FIG. 26 shows an exemplary request and response for receive message (from an agent).

Referring now to FIGS. 27A and 27B, the foregoing examples have been for the test configuration of FIG. 27A. However, they apply equally well to the competition/actual use configuration of FIG. 27B, the only difference being that the Environment 301 should be substituted for the ChatUI 401. In the Environment, outgoing messages come from the Attention Manager 471, which POSTs/relayMessage messages (as previously described) to the EO 363. Incoming messages are POSTed to a/receiveMessage endpoint in the environment that controls the avatar's speech and actions (avatar control 473). This could be implemented, for example, as a/receiveMessage POSTed to an AvatarControl worker in the environment, which could, for example, communicate with the display worker 371 and speaker worker 369. Also, the Attention Manager 471 could optionally be implemented in the same component as the Rich Transcript worker 313. In the example of FIG. 27B, the Environment Orchestrator 363 receives the message from the AttentionManager 471, whereas in the example of FIG. 5, the agents 361 receive the message directly without any intervening Environment Orchestrator 363. Given the teachings herein, many other embodiments will be apparent to the skilled artisan. The function of two or more blocks can be combined in a single block, or the functions of a single block can be split up, for example. Elements from different embodiments can be combined in a "mix and match" approach.

Embodiments of the invention use natural language as the form in which bids are expressed. One or more embodiments collect at least one non-verbal human behavioral trace and combine that with speech to extract the human's negotiation intent. One or more embodiments employ vocalization and/or other natural forms of communication. One or more embodiments employ natural multi-modal communication, and can function with many different agent bidding algorithms. One or more embodiments provide a fully interactive multimodal (e.g. speech and head pose) conversational system. One or more embodiments employ multi-modality and/or an immersive environment with multiple avatars. One or more embodiments understand quantitative and qualitative requirements that are used as input to model the users negotiation profiles and help the agents to build both their bids and utterances; provide turn-taking inference based on an attention component, supporting turn-taking based on the head orientation, for instance; and/or provide techniques to support automated multi-lateral negotiation with active elicitation while the humans' proposals and humans' and agents' counter-proposals happen throughout the dialog.

In a setting where two (or more) AI agents embodied as animated avatars are engaged in a conversation with one human and each other, i.e. a setting in which the interactions are nondyadic, there are challenges with current technologies. One challenge is for AI agents to determine which agent is being addressed. A second challenge is for AI agents to determine when and whether they may, could, or should speak. One or more embodiments address these two challenges together and explore the participation of AI agents in multiparty conversations. One or more embodiments enable two (or more) embodied AI agents who sell similar items to vie for a user's business by competing with each other on the price. One or more embodiments use the head pose (estimated by deep learning techniques) to determine who the user is talking to, and/or use deontic logic to enforce rules of a negotiation conversation, thereby enabling two (or more) agents to successfully compete with each other and negotiate with the user.

Specifically regarding the first challenge, one approach to distinguishing which agent is being addressed is to require the human participant to use names associated with each agent. However, while this "wake-word" approach is acceptable for one-shot interactions with an agent (as is the case for Amazon's "Alexa®" agent) (registered mark of AMAZON TECHNOLOGIES, INC. NORTH SEATTLE WASH.), it proves tedious and unnatural in extended dialogs such as negotiations. Various prior-art approaches have sought techniques for determining the addressee without resorting to a wake word, via various multimodal cues such as intonation, pitch, head-gaze, vocal energy, and the like. This has been done to determine the addressee in human-kiosk, human-robot, human-human, and human-human-agent conversations, and in the human robot interaction field, using approaches such as identifying visual focus of attention or moving the robot's head to signify turns. Given that it is common for people to look at the AI agent that they are speaking to, especially when the AI agent is embodied as an animated avatar, an embodiment of this invention uses a simple approach based on head pose coupled with semiotics of inferred user attention. Specifically, at any given moment in time, the agent to which a user is paying attention is inferred by using an algorithm to determine the user's head orientation, projecting that orientation onto the display, and identifying the closest avatar lying within a specified angular or linear distance (if any). Then, to determine the addressee for a given utterance, the amount of time that the user was looking at each agent during that utterance is computed, and the agent that was being looked at the most during that utterance is identified as the addressee (in some instances, only when the amount of time exceeds a specified threshold).

In one embodiment, a facial landmark-based approach can be used to detect head pose. However, some environments, such as those illustrated in FIGS. 4A and 4B, either lack lighting or have unusual camera positions that present challenges for this traditional technique. To handle such cases, another embodiment employs a deep learning-based head pose method that copes well with low light and high pose angles, which is now described.

Head Orientation Estimation Using Deep Learning Techniques: The head pose estimation system takes image input from cameras to detect and track a face, detect facial landmarks, and estimate head pose based on those landmarks. Using cameras enables non-intrusive markerless interactions. In some examples of environment 301, the camera is constrained to be on the ground in a low-light condition (used to accentuate displays), and the users stand more than 3 meters from the camera, resulting in a low resolution face. Further, the position of the face with respect to the camera causes large pitch pose which affects the accuracy of even the state-of-the-art landmark detection algorithms trained on a benchmark dataset. One or more embodiments therefore combine a generative model and a probabilistic deep model. Specifically, frontal faces captured in the environment are annotated, then large pose faces, along with their landmark annotations, are generated to fine-tune the probabilistic model for facial landmark detection.

To calculate head pose, assume a weak perspective projection model, with a three-dimensional (3D) mean face shape $\bar{y}_{3d}$, a 3D rotation matrix R, translation vector T and a camera intrinsic matrix W obtained from camera calibration. Given the detected two-dimensional (2D) landmark points $y_{2d}$, estimate head pose by minimizing the weighted projection error, i.e.:

$$R^*, T^* = \arg \min_{R,T} \left\| y_{2d} - \frac{1}{\lambda} W[R, T]\bar{y}_{3d} \right\|_C^2$$

(in homogeneous coordinates), and C includes the inverse of the determinant of the predicted covariance for facial landmarks. Head pose is obtained from the rotation matrix R*. The estimated head pose and translation T with respect to the camera coordinate is then transformed to the room coordinate using the camera extrinsic matrix. The probabilistic model quantifies uncertainty to avoid over-confident erroneous predictions, i.e. reject predictions with corresponding uncertainty above a threshold.

The addressee detection methods described above can be coupled with visual feedback from the agent to make the interaction smoother. As illustrated at 352 in FIG. 4A, the avatar's appearance can be altered by using a halo or other indicator to indicate that the agent it represents is the one that the user is believed to be addressing—allowing the user to adjust the user's head orientation to correct any possible misinterpretation.

Specifically regarding the second challenge of nondyadic interactions in immersive environments cited above—whether and when an agent should speak—one or more embodiments employ deontic logic to explicitly model and enforce turn-taking in conversations involving humans and multiple AI agents. Rules can be enforced on the structure of the conversation without requiring individual agents to understand or implement the model themselves. Suppose that an AI agent has generated text that reflects a negotiation act it wishes to take. Before allowing the text to be uttered, the Environment Orchestrator can use a deontic logic engine (such as Ravel) to determine whether the negotiation act (and hence the agent's intended utterance) should be allowed.

Norm Specification Using Deontic Logic: Ravel (again, a non-limiting example of a deontic logic engine) maintains a Finite State Machine (FSM) representation of the conversation. Rules can be applied on the state transitions. Every incoming utterance (human and machine) is classified into an intent and is tagged with it. Ravel decides whether the intent/utterance has a valid transition from the current state; i.e., decides whether the agent that generated the utterance is obligated, allowed or prohibited to respond with that intent. If the agent is obligated or allowed, the system broadcasts the message to all participants by using JSON messages for AI agents and voice output for the user. Each agent receives the broadcasted output as input and generates a response which follows the same loop. If the agent is prohibited, then its response is blocked.

One or more embodiments use the following rules, which can, for example, incorporate the inferred addressee. Their application can be seen in the table of FIG. 28.

R1: User is always allowed to reply.
R2: AI Agents are prohibited from responding to themselves.
R3: If direct addressee detected, the direct addressee has the obligation to respond. Other AI agents are prohibited.
R4: AI Agents are allowed to respond to a price pitch.

To further show the applicability of rules, consider an exemplary agent that is agnostic to the message sender, and hence is capable of responding to its own message and consequently bidding against itself. For example, in FIG. 28, Agent A1 says "I will give it for $5" and then immediately thereafter attempts to say "I can do a better price" (note that A2's message was blocked by Rule R3), so this would be an instance of A1 underbidding itself. With the set of rules described above, A1's underbid of itself would be prevented by rule R2, which forbids responding to one's own bid. Thus, one or more defined social rules can not only block socially unacceptable behavior, but also prevent foolish self-harmful behavior.

One or more embodiments thus integrate head pose-based addressee detection and turn-taking rules in a negotiation conversation between two (or more) AI agents and one (or more) human(s). One or more embodiments enable direct simultaneous negotiations between a human and multiple competing agents. One or more embodiments provide an immersive environment that incorporates multi-modal interactions involving speech understanding, speech synthesis, and addressee detection based upon head pose estimation—all of which combine to support a more natural form of interaction between humans and software agents, thereby providing a sense of realism, and visual and social presence (defined as sense of being with another intelligent entity). One or more embodiments provide a conversational setting in which AI agents playing the role of shopkeepers who sell similar items want to attract a buyer's business. AI agents do this by competing on the price, for example.

Competitions that directly pit software agents against one another have proven to be an effective and entertaining way to advance the state of the art in a multitude of AI domains. Less frequently, human-agent competitions have been held to gauge the relative competence of humans vs. (software) agents, or (software) agents vs. (software) agents as measured indirectly by their performance against humans. Aspects of the invention provide a platform that supports a new type of AI competition that involves both agent-agent and human-agent interactions situated in an immersive environment, as well as actual negotiations in real-world situations. For example, human buyers can haggle (e.g. in English) with two life-size AI agents that attempt to sell them various goods. Again, aspects described in the context of a competition can also be used for real-world applications.

Aspects of the invention relate, for example, to human-centered computing, including natural language interfaces, gestural input, enhanced usability testing, interaction design, multi-agent systems, agent competition, immersive environments, multimodal dialogue, multiparty dialogue, negotiation, dialogue systems, mixed reality, and the like.

Beyond the realm of negotiation, there are additional scenarios in which interactions among humans and multiple agents are of interest, and can be enabled by embodiments of the invention. The prior art includes an educational scenario in which students practice the Mandarin Chinese language and culture through spoken role-play with embodied AI agents in an immersive environment. Initial studies of AI-assisted language education had shown that immersion has a beneficial impact. In the Mandarin education scenario, the agents play various roles, including shopkeepers who compete with each other for the student's business. One or more embodiments provide a platform that can be used as a basis for a new type of AI competition that blends aspects of agent-agent and human-agent interactions, and brings those interactions to life by situating them in an immersive environment. Embodiments can be used not only for competitions, but for-real world negotiation, education, training, and the like. One or more embodiments provide a platform that can be used to teach negotiation skills to students by simulating negotiation with one or more agents. The interactions also have the potential of letting users compare complex products/services in new ways.

One or more embodiments provide a platform that supports negotiation among human players and agent players in a game scenario, of which the so-called "Legend of Zelda®" (registered mark of NINTENDO OF AMERICA INC. REDMOND WASH.) is a non-limiting example. In a 3D Game such as this, part of the game entails negotiation over various objects between the player and the virtual characters. Over the course of the negotiation dialogue, the inventory of the player and/or the items or currency that are being discussed can be depicted on the screen and the player may use voice or other forms of remote control to select the items or check the player's wallet. FIG. 4A shows a wallet or cart 354 that shows, for example, a balance in a player's or purchaser's wallet, and/or an amount of currency corresponding to items in a shopping cart. FIG. 4A also shows items for sale 356 which can include, for example, items that a shopkeeper can sell to a player or purchaser, or items that a player or purchaser can sell to a shopkeeper. Elements 354, 356 are not limited to gaming embodiments but can be provided in other embodiments as well.

In "The Legend of Zelda®" game the main character begins the game without his memory. There are several goals, side quests, and puzzles within shrines, which the main character needs to achieve. The action is conducted in a beautiful land with different kinds of vegetations full of forests, lakes, villages, horses, stables, towers, monsters, guardians and ruins of buildings which were destroyed in the past before the main character lost his memory. A princess appears to the main character from time to time in his memories to remind him of his memories and goals. There are four divine beasts that the main character needs to conquer which helps him conquer a castle.

In order to achieve his goals throughout the game, the main character needs to cook, hunt, mine, and fight. The weather can be as in real life with snow, rain, and sun, with temperatures ranging from too hot to too cold. Therefore, the main character needs to dress with clothes that prevent him from freezing or overheating, or clothes for fighting, trekking, and/or climbing. The main character also needs a metal helmet, metal breastplates, shoulder guards, sword belts, leather boots, axes, bows, arrows and swords. There are several villages in which he can buy food, clothes, armor sets, and the like, but he needs a specialized currency for that. He can have these things if he sells precious stones which he can find on the mountains after mining.

In the process of buying and selling, the game provides interfaces where the player can open the player's inventory and select the items, including the amount. The characters then stipulate the prices which the players cannot negotiate. Either they accept the deal if they have enough currency or items, or not. The concept of a wallet, in the context of this game, refers to the amount of special currency that the main player has. The game also provides only dyadic conversations. Wallets in one or more embodiments can have broader functionality if desired, as described with respect to element 354.

Current games lack many social abilities, such as multi-party interaction between the players and the virtual characters. Moreover, they lack abilities such as multi-lateral negotiation. One or more embodiments advantageously provide techniques for having a 3D game such as "The Legend of Zelda®" that enables multi-lateral negotiation between the players and the virtual characters. For example, in a 3D game, in interactions between the player and the virtual characters, where negotiation takes place, the former can interact with the latter with dialogue in several turns, updating the value of the item(s) or the number of items. This can be done, for example, until a deal is reached or one of the parties ends the conversation, which could be the player or the virtual character. While the interaction happens, the inventory of the player can be displayed on the screen where the player, with voice or remote control, can select the items or check the player's wallet.

In the gaming aspect, one step can include transcribing human speech signals uttered within a gaming environment including one or more avatars representing one or more negotiation software agents or gaming characters. The human speech signals are directed to at least one of the one or more avatars. At least one non-speech behavioral trace can also be obtained within the environment; the trace is representative of non-speech behavior directed to the at least one of the one or more avatars. In the gaming context, alternative techniques could also be used instead of human speech signals such as techniques typically used in gaming. In the gaming aspect, further aspects could include forwarding the transcribed human speech signals and the at least one non-speech behavioral trace (or other game-related input) to the one or more negotiation software agents; obtaining, from at least one of the one or more negotiation software agents, a proposed negotiation act; approving the proposed negotiation act; and, responsive to the approving, issuing a command to cause one of the one or more avatars corresponding to the at least one of the one or more negotiation software agents from which the proposed negotiation act is obtained to emit synthesized speech and to act visually in accordance with the proposed negotiation act.

Negotiating in an Immersive Environment

In one or more embodiments, the immersive environment provides audio-visual immersion and presence, i.e. a feeling of being in a different place. FIGS. 4A and 4B illustrate the 360-degree panoramic screen that is used to provide visual immersion; audio immersion is provided via spatial audio techniques that enable control of the apparent location of sound sources.

The screen depicts a virtual street scene inhabited by two street vendor avatars. Wearing a lapel microphone, the user looks at the avatar with whom she or he wishes to speak. A central system transcribes the speech and infers the addressee using head pose information, and forwards this information to all of the agents. The central system maintains decorum and fairness by using a Finite State Automaton to enforce certain predetermined turn-taking rules, including ones that specify when interjections are permitted. One or more embodiments use head pose because users find it more natural than using a wake word.

During each of several rounds in the competition, a human buyer starts by stating which goods he or she is interested in purchasing (e.g. eggs, milk, sugar, flour, chocolate) in an effort to acquire ingredients to complete a task (e.g. bake cakes). Agents may choose to respond to such requests with offers including a bundle of ingredients and a price. Such offers are rendered as synthesized speech in such a way as to appear to emanate from that agent. The human may respond with a counter-proposal, and so on until an agreement is reached. While humans may primarily direct their attention to one agent, all agents are aware of all negotiation messages exchanged in the system, and (under conditions regulated by a Moderator) they may interject with convincing counter-arguments/offers, possibly causing the human to re-direct the human's attention. Agents are evaluated quantitatively according to their total financial gain, while humans are evaluated according to a utility function that depends on the number and quality of cakes that can be assembled from their ingredients. Agents may also be judged qualitatively according to their perceived degree of engagement. Again, the example of a competition involving the baking of cakes is provided for illustrative purposes, and aspects of the invention can be used for many different applications.

Architecture and Technical Details

Figure 29:
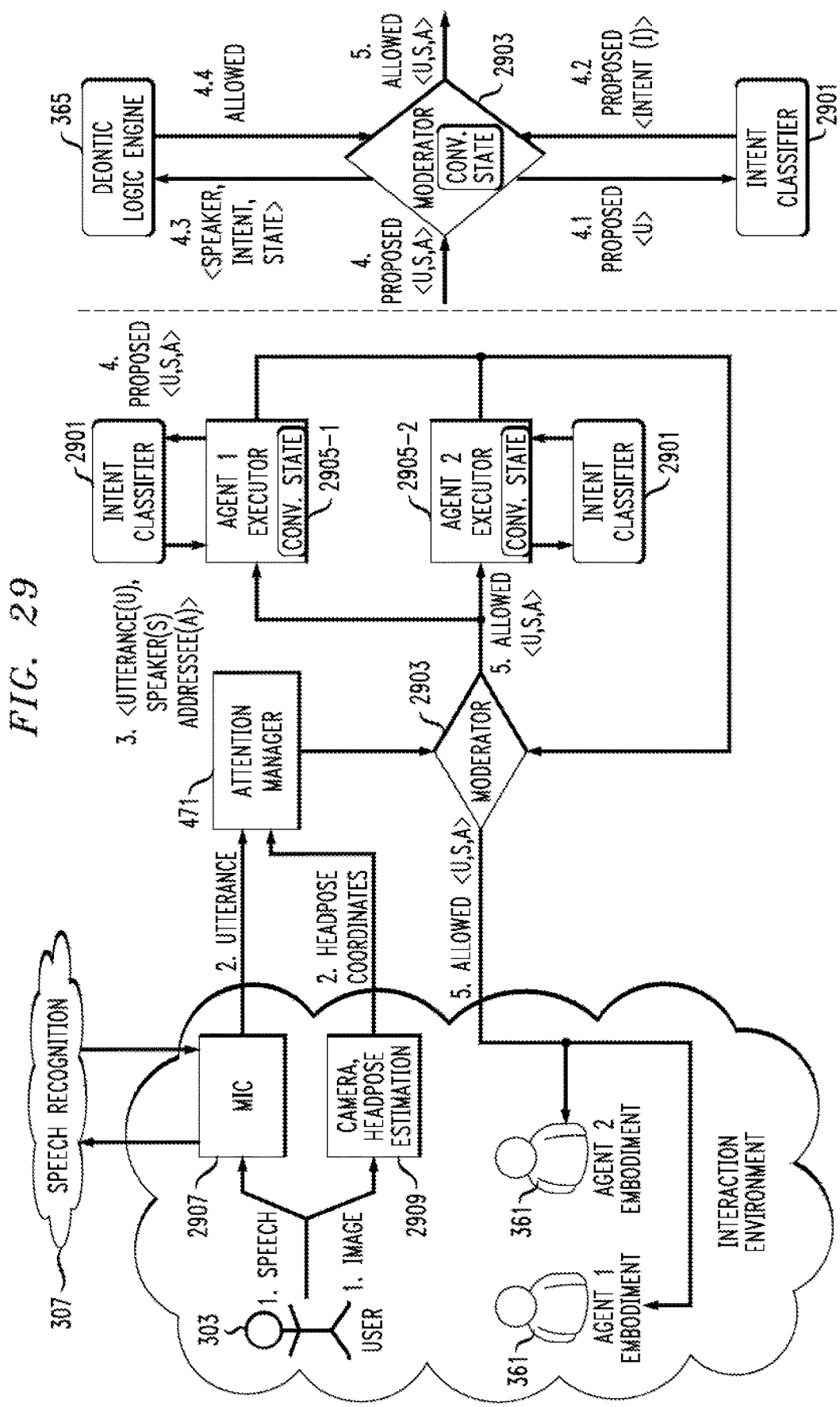
FIG. 29 is a combined block and data flow diagram of aspects of the invention.

FIG. 29 shows an exemplary overall architecture (Multimodal Multiagent Immersive Dialogue Architecture) that enables the interactions described herein. Each module in the diagram can reside on a different machine and can communicate using publish-subscribe software (RabbitMQ® registered mark of PIVOTAL SOFTWARE, INC. San Francisco CALIF.) and the RESTful API (other approaches for communication and different numbers of machines can be used in other embodiments). In a first step, the Microphone (mic) and Cameras 2907, 2909 detect raw input. The mic connects to a commercial cloud-based Automatic Speech Recognition (ASR) service 307. The machine connected to the camera processes images to detect head pose according to a method described by Lisha Chen, Hui Su, and Qiang Ji, Face Alignment with Kernel Density Deep Neural Network, In Advances in Neural Information Processing Systems (NeurIPS) 2019. In a second step, the text utterance and head pose coordinates are sent to the Attention Manager 471, which infers the addressee as the agent towards which the human was looking primarily over the course of the utterance (Agent 1 in the example). In a third step, the Attention Manager forwards the utterance U, the speaker S, and the inferred addressee A to the Moderator 2903, which updates the global conversation state and if the utterance is allowed, forwards it to the Agent Executors 2905-1, 2905-2, which generate dialogue and visual actions of the avatars that embody the agents.

The architecture permits developers to submit independently-written Agent Executors that understand the messages generated by the system, compute actions (offers, acceptances, etc.) according to their strategies (for instance, bidding strategy), and speech utterances that represent those actions. In one or more embodiments, agents provide a list of possible responses ahead of time to enable the intent classifier of the Moderator to be trained.

Both Agent Executors receive the utterance, speaker and addressee, and they may choose to generate a proposed utterance. The architecture places no restrictions on the utterance or on the techniques by which it is produced. In one or more embodiments of the agents, they use an intent-entity based dialogue engine (e.g. intent classifier 2901) along with local conversation state variables (conversation state not separately numbered to avoid clutter) to select a dialogue node. They use a naive negotiation strategy in which the default bidding agent's behavior simply decreases the last heard bid by a predefined amount until a predefined lower limit is reached. Agents' Executors may propose any response they want to speak and pass it to the moderator 2903 in a fourth step. For example, consider FIG. 30: after the user the "I want to buy tea" while looking mostly at Agent 1, the Agents 1 and 2 might propose "Yes, for $5" and "Yes, for $6", simultaneously and pass it to the Moderator.

The Moderator 2903 is a centralized controller that regulates the interaction, and protects against either of the agents unfairly (or annoyingly) hijacking the interaction. It has its own separate intent classification engine 2901. This helps maintain a global notion of intents that may differ from that of the agents. It consults the classification engine as shown at 4.1 and 4.2 to obtain the intent of each proposed utterance. This intent, along with global conversational state (not separately numbered) that it maintains, is sent at 4.3 to a deontic logic engine 365 such as Ravel, a Finite State Automaton (FSA) that evaluates the information and decides whether the utterance is allowed.

The following regulatory rules can be used in some cases: R1:User is always allowed to reply; R2: AI Agents are prohibited from self-responses; R3: If direct addressee detected, it has the obligation to respond; other agents are prohibited; R4: A1 Agents are allowed to respond to a price pitch. Thus, in the table of FIG. 30, Agent 1's pitch (t1.1, A1) passes through while that of Agent 2 is blocked (t1.1, A2). The blocking helps to prevent agents speaking over one another. A2 will be allowed in the next turn to counter-reply to A1's accepted utterance. The Moderator, in a fifth step, passes the allowed utterance on to the appropriate avatar, which is rendered using the Unity Engine and a commercial text-to-speech engine in conjunction with a spatial audio system. The Moderator also sends the accepted utterance to both the Agent Executors. Note that this time the attention manager can be skipped as the addressee is the entire room. Here, the agents, upon hearing each other's (or their own) bids may continue the cycle afresh by proposing a counter-pitch (seen in t1.2, A2). The counter pitches are received by the Moderator, at most one is allowed, and so the cycle continues until an agreement is reached. The architecture is scalable to more participants and conversational contexts using similar turn taking rules and more sensors for more participants and agents.

Administrator's Perspective: An administrator's role is split into two parts: pre-competition preparation and in-competition facilitation. Prior to the start of the competition, she or he requests and collects all potential phrase variations that the agents may utter and submits them to the Moderator and Ravel. During the competition itself, she or he uses a web-based-backend UI to generate rounds, indicate start/end of competition to parties, generate utility functions that provide incentives for agents and human competitors, and validates the final offers. In one or more embodiments, the admin takes no role in the dialogue or turn-taking.

Participant Developer Perspective: At the beginning of a round, the agents receive fresh utility functions from the Admin, which serve as incentives that drive their negotiation behavior. Agents may try to gain an advantage by expressing their bids in an engaging or attractive way, or by denigrating other agents (this can be regulated as appropriate).

Human Negotiator Perspective: Experiments were conducted wherein two in-house agents were employed with the purpose of role-playing haggling with users to learn a foreign language. This aspect was used as a pilot to test whether the proposed competition sufficiently engages human participants. Thirteen college students (6 female, 7 male) participated. Prior to the study, they were told how to direct an utterance towards an agent using head pose. They were not told that other agents might interject even when not addressed. The interaction was evaluated using a post-experience questionnaire. To judge the overall experience, users were asked to rate on a Likert scale of 1-5 whether they agreed that the interaction was usable and (in a separate question) likable. The responses to usability had a mean of 4.08+/−0.86, while the responses to likability had a mean of 4.38+/−0.65. A one sample test revealed that with $p=0.003$ and $p=0.0002$ it can be the that the true median for usability and likability was greater than 3 (neutral). Participants were also asked to rate the appropriateness of agent's turn taking on a Likert scale. The mean score for responses to it was 4.36+/−0.51. A One-sample Sign-test was conducted on the data and with confidence of $p=0.0048$ it can be the that that the true median was greater than 3 (neutral). Overall, it was found that the interaction closely matched the users' natural expectations and thus the design appears to be functional.

One or more embodiments provide an architecture and technology underlying a new AI approach including a platform that supports independently-programmed agents and that humans find engaging. Such conversational interactions provide a new way for businesses to advocate their wares and users to compare attributes of complex goods or services.

Consider an exemplary competition, in which a human buyer wishes to purchase various ingredients from which cakes and pancakes can be made and negotiates with two competing seller agents to obtain them. The action takes place in an immersive environment, in which the agents are rendered as avatars on a display, and the human interacts with them by speaking (in English e.g.) and looking at the one with whom they wish to negotiate. The negotiation platform uses a speech-to-text service to render the audio into text and a head-pose estimation system to infer the addressee and passes that information to each agent. Each agent detects the intent of the utterance, selects an appropriate negotiation act (such as a counteroffer, an acceptance, or a rejection) in light of the intent of the utterance and any other relevant context, and determines how best to render that act into an utterance and an accompanying gesture. Upon receiving this message from the agent and checking it for compliance with competition rules, the platform causes the avatar to behave and speak as specified by the agent. The winning agent is the one that best maximizes its utility across multiple rounds of negotiation with various humans and other agents.

The agent competition winner is determined, for example, by accumulating each agent's utility across a set of 5- or 10-minute rounds during which it interacts with different humans and other competing agents in different rounds, i.e., the two competitive agents interact with one human at a time. An agent's utility is its profit—the difference between the price for which it sells ingredients and those ingredients' production cost (which is generated randomly for each round). Human buyers are also awarded according to profit. They have a utility function that represents the price for which they will be able to sell the cakes and pancakes they choose to make from the ingredients they have purchased. Like the seller's agents, they are rewarded according to their ability to maximize their utility (profit) during the competition. Humans are thus incentivized to drive as hard a bargain as possible, without running the risk of failing to reach an agreement with at least one agent.

Although the agent winner is determined by accumulated utility, the fact that the contest involves humans suggests that the most effective agents will be those that combine algorithmic prowess with social skills (e.g. being fun, pleasant, or subtly enticing), which requires sophisticated dialogues or agents' utterances responses.

The tournament can be conducted in two stages: pool play and championship play. During pool play, the contestants can be divided into two or more pools. If the number of agents is not even, then an additional dummy agent will be supplied by the organizers to fill out one of the pools so that they each contain the same number. Within each pool, each player will play each of the other players for exactly two rounds, to be scheduled randomly so that the identity of their opponent will not be known to the agents. After pool play is complete, one or two agents with the highest accumulated utility in each pool will move on to the championship round, which will include longer multi-round matches against opponents in semi-finals and finals. Other approaches can be used in other instances. Again, the example of a tournament is illustrative, and the same techniques can be used for actual human-agent interaction.

Figure 6:
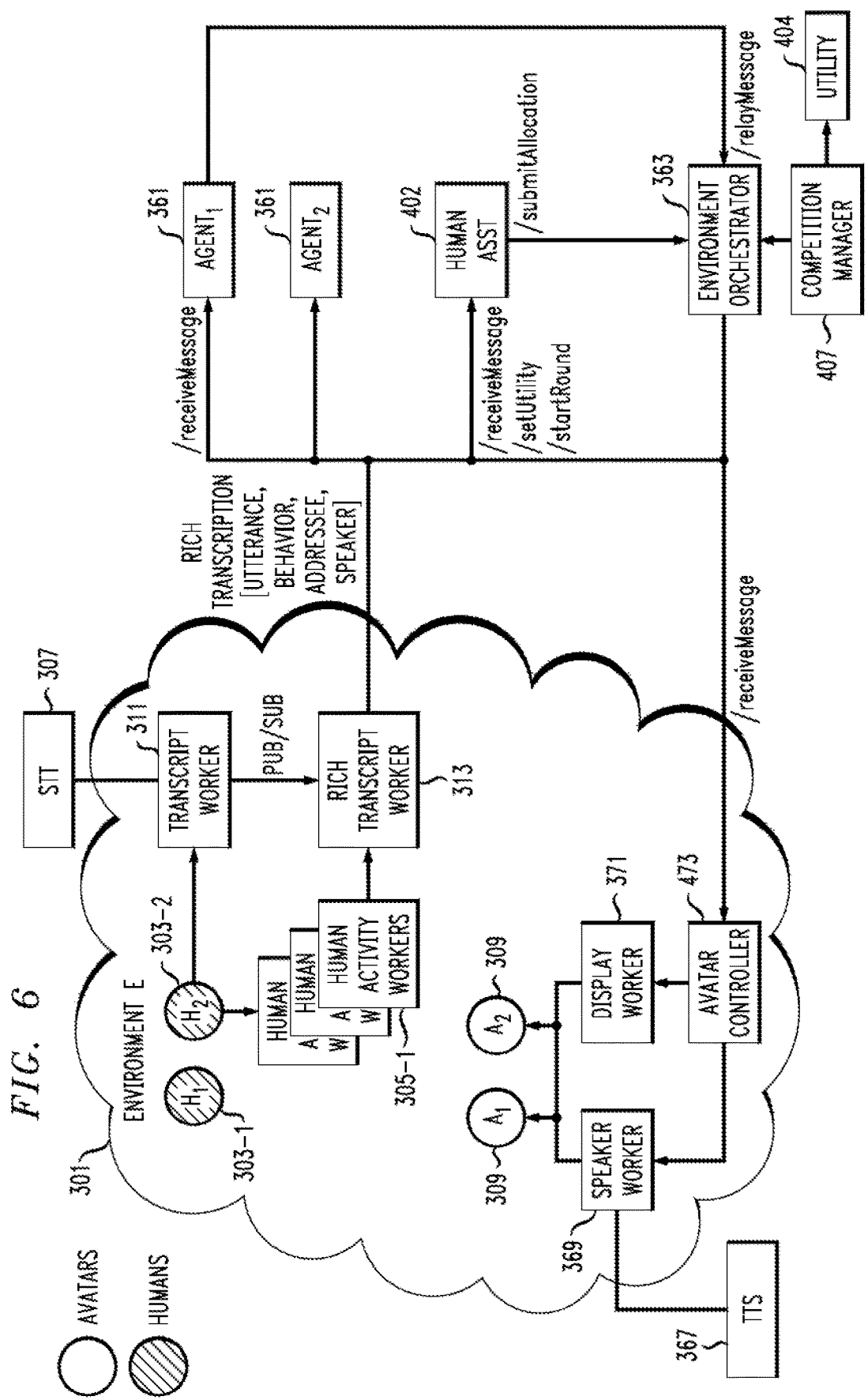
FIG. 6 is a block diagram of aspects of the invention.

FIG. 6 provides a view of an exemplary architecture. The cloud on the left-hand side of this figure depicts the physical environment 301, containing the human negotiators 303-1 and 303-2 designated H1 and H2 and two avatars 309 designated A1 and A2. In that environment there are various workers (provided by the platform; only 305-1 is numbered) that collect audio and other sensor signals and process them into a representation of H2's utterance and certain aspects of H2's non-verbal behavior. The non-verbal behavior includes at a minimum an inference about the addressee—that is, the avatar who was addressed by the human, which is derived from head pose information based on camera data. It can also include information about human gestures and facial expressions.

The Rich Transcript Worker 313 collates and formats the verbal and non-verbal behavior of humans into a JSON structure that contains the utterance, addressee, speaker, and (optionally) additional behavioral information. It delivers this structure to all of the agents 361 by calling their/receiveMessage APIs.

Then, the agents' processes received messages and determine whether to respond, and if so what message to send to the Environment Orchestrator 363 which encapsulates the response with the bid. This message can be an offer or counteroffer, acceptance or rejection of an offer, etc. The agent sends that message to the Environment Orchestrator by calling the Environment Orchestrator's/relayMessage API.

The Environment Orchestrator 363 decides whether to permit the relayed message to be broadcast to the rest of the system. If the decision is to permit the message to be forwarded, the Environment Orchestrator calls the/receiveMessage API on all agents, just as the Rich Transcript worker does for messages generated by the human negotiator. It also calls the/receiveMessage API of an Avatar Controller 473 located within the environment, which in turn delegates displaying the avatar and playing synthesized speech to a Display worker and a Speaker worker, 371 and 369, respectively (worker 369 can use, for example, a suitable text-to-speech service 367).

A Competition Manager 407 manages the competition as a whole by calling the Utility service 404 to generate utility functions for the agents and humans in the system, storing them, and permuting them across different rounds to achieve fairness for agents and humans. A human administrator 402 may use the Competition Manager to send a signal to the Environment Orchestrator signifying that a round is to start.

The Human Assistant service 402 is a tool that human negotiators can use to aid them in deciding what offers to make, and how to allocate their purchased goods into cakes and pancakes when the negotiation phase of the round is complete.

Negotiation Round Details

Overview of a round: In a non-limiting example, there are three players in each round: two seller agents and a human buyer. Each player strives to maximize his or her utility during each round. Sellers strive to sell goods for a price as far above their unit cost as possible, while buyers seek to use a budget given to them at the beginning of the round to buy goods from which they can make the most valuable set of cakes or pancakes that they are able to make from their purchases. In order to maximize the number of cakes and/or pancakes that they can make, buyers have an incentive to maximize the number of goods they can purchase, and thus they must try to purchase goods as cheaply as they can.

The seller's utility function is expressed in terms of a unit cost $c_g$ for each of several different goods g that it can offer to the buyer. The set of goods is as follows:

Eggs (unit: each)

Milk (unit: cup)

Sugar (unit: cup)

Flour (unit: cup)

Chocolate (unit: ounce)

Vanilla (unit: teaspoon)

Blueberries (unit: packet)

When an agent sells a bundle $\{n_{egg}, n_{milk}, n_{sugar}, \ldots\}$ including $n_g$ items of good g for a price p, the agent's utility can be computed as (seller) agent utility=p-$Sum_g\ n_g\ c_g$, where $Sum_g\ n_g\ c_g$ is the cost of all goods in the bundle.

The buyer's utility is based upon the number of cakes and pancakes the buyer can make from the goods the buyer purchases during the round, with some extra value placed on extra flavorings: chocolate, vanilla and blueberries. The mapping from raw goods to baked goods is a fixed recipe that is known to all players. Specifically, the recipes are:

A cake can be made from:

2 eggs 2 cups flour 1 cup milk 1 cup sugar

Optional additives: Chocolate (in ounces) or Vanilla (in teaspoons).

A batch of pancakes can be made from:

1 egg 2 cups flour 2 cups milk

Optional additives: Chocolate (in ounces) or Blueberries (in packets).

At the beginning of the round, the buyer is given a budget. The buyer should try to exhaust the buyer's budget as best she or he can, as no credit is given for any money left over at the end of the round.

There is no carry-over from one round to another: the players have no way to recognize whether or when they are playing against an opponent they have met previously, and the utility functions are drawn randomly prior to each round, so that nothing can be learned from one round to another.

While each player is aware of the general structure of the other players' utility functions and the distribution from which the parameters of those utility functions are drawn, none of the players know the other players' exact utilities during a given round.

Prior to the round: Just before the round starts, each player is sent a randomly-generated utility function that describes the cost or value of an item. The seller agents implement a/setUtility API through which the system informs them about their utility function; round parameters (such as the round duration and the length of the warmup period, both in seconds); and the name by which the agent will be known, Celia—represented as a female avatar with a female voice, or Watson—represented as a male avatar with a male voice.

Humans are provided with a simple tool, called Human Assistant UI, that aids them in their negotiation with sellers' agents; this tool also receives information about the human utility and the round parameters.

Once the human buyer starts the round through this tool, a short warmup period in seconds then ensues, during which the human buyer can think about his or her negotiation strategy. Then, the agents and the Human Assistant UI are informed when the round has started and the elapsed time in seconds for the current round is displayed and the dialogue can begin with the negotiating. Because of that, the agents implement a/startRound API so they can be notified that the round began from the system.

During the round: Once the round has begun, the human buyer starts the dialog by requesting a bundle of one or more goods. The buyers may be precise or imprecise about exactly how much they want of each good, and they may or may not propose a price for that bundle. Examples of phrases that might be uttered include by the buyer:

I'd like to buy 3 eggs, 2 cups of sugar, 4 cups of milk and 5 ounces of chocolate.

Can anyone give me a good price on blueberries?

Celia, I'll buy 2 cups of flour, 2 cups of sugar, and 2 cups of milk from you for $3.

Watson, can you sell me some milk and sugar?

The seller agent will receive utterances as a call to a/receiveMessage API. Upon receiving the message, the seller agent should try to interpret its meaning, i.e. ascertain the type of negotiation act (offer/counteroffer, reject, accept, etc.) and the associated parameters. To do this, the seller agent should try to anticipate different ways in which buyers might start a negotiation and strive to recognize their intent accurately. One service that can be used to aid in this task is assistant 388. Note that human buyers will have an incentive to make themselves understood to the seller agents, so it is unlikely that they will deliberately express themselves in an obscure or confusing manner.

Once the agent has interpreted the message, it needs to consider whether and how to respond to it as follows:

(i) Should the agent respond to the received task? This question can be answered by first understanding the message and then analyzing the turn taking rules.

(ii) How to respond depends on the implementation of a bidding algorithm that computes a bid or other negotiation act that is intended to maximize its utility over the course of the round. It may well want to store messages that it has received during the round to aid it in this task.

In addition to receiving utterances from the human buyer, the agent will also receive (via the/receiveMessage API) a copy of negotiation messages exchanged between the human buyer and the other seller agent.

Finally, the seller agent determines how best to express its intended negotiation act in a human-friendly form, including text plus an optional specification of avatar behavior, such as "smile" or "wave." The text may include Speech Synthesis Markup Language (SSML) tags that allow for some expressiveness.

Eventually, after computing the bid and a human-friendly response with the negotiation action in natural language, the agent can evaluate the turn taking rules again before sending the generated bid.

Whenever it is ready, the agent may submit its negotiation action by calling the system's/relayMessage API. This message contains the bid in structured form and in human-friendly form. The structured form is used by the system only; the other agent will only see the human-friendly part of the message.

Finally, when the system receives the seller agent's bid, it applies a set of turn-taking rules to determine whether the message abides by those rules. If a proposed message is allowed, the system forwards it to the software that causes the avatar to speak and act, and it also forwards the message to the other agent and the human buyer assistant UI. If the proposed message is not allowed, the system informs that agent that its message has been rejected, so that it can take this into account going forward. While the system prevents illegal messages from flowing, it behooves agent developers to endow their agent with an understanding of these rules, so that it can take them into account properly in its strategy.

Buyers or sellers may make offers or counteroffers, or accept bids, or reject bids. The buyer assistant includes a button that allows the buyer to confirm an offer that has been accepted by either the buyer or the seller.

Once a bid has been accepted, the buyer may continue to initiate negotiation for additional goods in an effort to add to the collection of raw goods from which they will make their baked goods. Negotiation activity may continue until either the round has ended or the buyer has fully exhausted her or his budget.

Post bidding phase: When a round ends, the human buyer is given 2 minutes to decide how to allocate her or his purchased goods into cakes and pancakes, possibly with additional flavorings. He or she must be able to make an integer number of cakes or pancake batches; extra leftover ingredients that are not enough to make another cake or pancake batch will be worth nothing. For example, if the human has enough to bake 3 cakes with one egg left over, that one egg would be worth nothing. The buyer assistant tool provides a calculator that helps the buyer determine the overall value of any given allocation. When the buyer is ready, the buyer presses the "Submit Allocation" button. Once the buyer submits the buyer's allocation, the seller utilities and the buyer utility are computed for that round, and added to each player's tournament totals.

Examples of Building and Testing an Agent

In some embodiments, agents are implemented as a service. That service supports, for example, the following APIs, which are called on the agent by the Environment Orchestrator in order to inform the agent about important events and messages that occur prior to or during a negotiation round:

POST/setUtility. Establishes the utility for the agent just before the round starts. It may also contain the name to be used by the agent.

POST/startRound. Informs the agent that a new round has begun, and provides information about the duration and the round number.

POST/endRound. Informs the agent that the current round has ended. Beyond this point, no offers can be sent or received.

POST/receiveMessage. Receives a message, interprets it, decides how to respond (e.g. Accept, Reject, or counteroffer), and if it desires sends a separate message to the/relayMessage route of the environment orchestrator.

POST/receiveRejection. Signifies that the Environment Orchestrator has not accepted a message that the agent recently relayed to it.

In order to communicate with the system, the agent calls, for example, the Environment Orchestrator's POST/relayMessage API.

Consider the following exemplary agents.

agent-jok. This publicly available agent uses Watson™ Assistant to help interpret human text as a negotiation message, and is available in the GitHub® (registered mark of Github, LLC DBA GITHUB.COM LIMITED LIABILITY COMPANY San Francisco, CALIF.) repository.

agent-kleene. This publicly available agent uses simple regular expressions to interpret human text as negotiation messages, and uses a random counter-offer strategy, and is also available in the GitHub® repository.

For the purpose of testing an agent, a collection of services can be used to create a small test environment. The test environment replaces the physical environment depicted with a simple chat tool 401 that allows interaction with one of two agents, "Celia" and "Watson," by typing utterances in the Chat UI. All of the message formats are exactly as they are in FIG. 6; the differences lie only in the user experience and the services from which the messages are received, and are summarized as follows:

The test platform does not support speech recognition. Instead, the human buyer types text into the Chat UI.

The test platform provides neither speech synthesis nor avatars. Instead, the agent's behavior is shown as seller messages displayed in the Chat UI.

In the test platform, the Chat UI stands in the place of the Rich Transcript worker. It calls the/receiveMessage API of all of the agents to send them messages from the human buyer.

In the test platform, the Chat UI stands in the place of the Competition Manager. It provides buttons that allow a human to launch a single negotiation round, and displays results when the round is over. One cannot use the Chat UI to simulate a competition; it only handles one round at a time. In its role as substitute Competition Manager, the Chat UI calls the Utility service to randomly generate utilities at the beginning of a round, and calls the Environment Orchestrator to launch a round.

To set up the test environment, there are several possible approaches, including pre-built binaries available at GitHub® as well as code for components including environment-orchestrator, utility-generator, chat-ui, and human-ui.

FIG. 31 shows an exemplary screen shot of a chat UI, after the post-negotiation phase has ended. Administrator controls are provided in the lower left of the screen, and round results appear at the top left. At the bottom center right is a text window into which the user can enter a message addressed to either Celia or Watson (the agent sellers). At the far right on the bottom is a toggle button that allows one to show or hide a list of ingredients that have been purchased thus far in the round. The ingredients list appears at the top on the far right. To pose as the tournament master/administrator, one can use the buttons in the lower left to set up the parameters of a round and start. The round parameters are all in units of seconds and include the length of the warmup period (during which the human can think about their bidding strategy given their utility function), the duration of the negotiation phase of the round, and the post-round period, during which the human can decide how to allocate the raw goods they have purchased into cakes and pancakes. At the top left is a summary that appears after the post-round period has completed, summarizing the results for that round for the buyer and the two seller agents.

To pose as a human buyer during the negotiation phase of the round, one can type text into the panel on the right labelled "Start chatting as buyer!". A timer shown in the upper righthand corner (which stands at 0 in this screenshot) counts down during the active negotiation phase; when it reaches 0 no more messages can be entered. During the negotiation, the buyer can see a summary of ingredients purchased thus far during the round by clicking the Show Ingredients button at the lower right-hand side; a list of ingredients will appear at the upper right.

To assist the human buyer with decisions about what goods are needed to make cakes and pancakes, a Human Assistant UI is provided in one or more embodiments. A screenshot is shown in FIG. 32. When the human buyer starts the round in the Chat UI, the Round field at the top is initialized with 1 and the 3 countdown timers inform the buyer how much time is left in each phase (warm-up, active negotiation round, and post-round—or allocation—time), as well as the remaining budget.

On the left, is a section of the UI that allows the human buyer to explore whether he or she has enough goods to make a given number of cakes or pancakes with specified additives. One can fill in a proposed number of cakes and additives and then click the Check button. Then, under the Ingredients section in the top middle of the UI, the buyer will see the number of goods required, how many she or he has so far, and how many he or she needs (highlighted in red for any goods for which there is a deficit).

Just below the Ingredients section, in the bottom middle, is a section where the latest outstanding offers from the two agents' sellers are rendered into a simple table. There are none in this screenshot because the round has ended.

On the right side of the UI is a Utility section that informs the buyer about their utility function. This may be useful to look at during the warm-up period, as it assists the buyer in working out what will be her or his strategy, i.e. should he or she focus mainly on cakes or pancakes.

When the active negotiation phase has ended, a Post-Round countdown will start, and a Save button will appear on the left-hand side, under "Can I Make? . . . ." During the Post-Round period, the human buyer uses the allocation check to experiment with various ways of allocating goods into cakes and pancakes with additives. When satisfied that the allocation maximizes the utility (and before then Post-Round period is over), the buyer should click on Save to let the system know how she or he wants to allocate her or his goods. This information will be used to calculate the buyer's profit, which appears in the top left-hand panel of the chat-ui at the end of the round.

Other approaches are possible; for example, using the chat UI to simulate another seller. Alternatively, simply run two seller agents.

Utility Functions

Figures 33, 34:
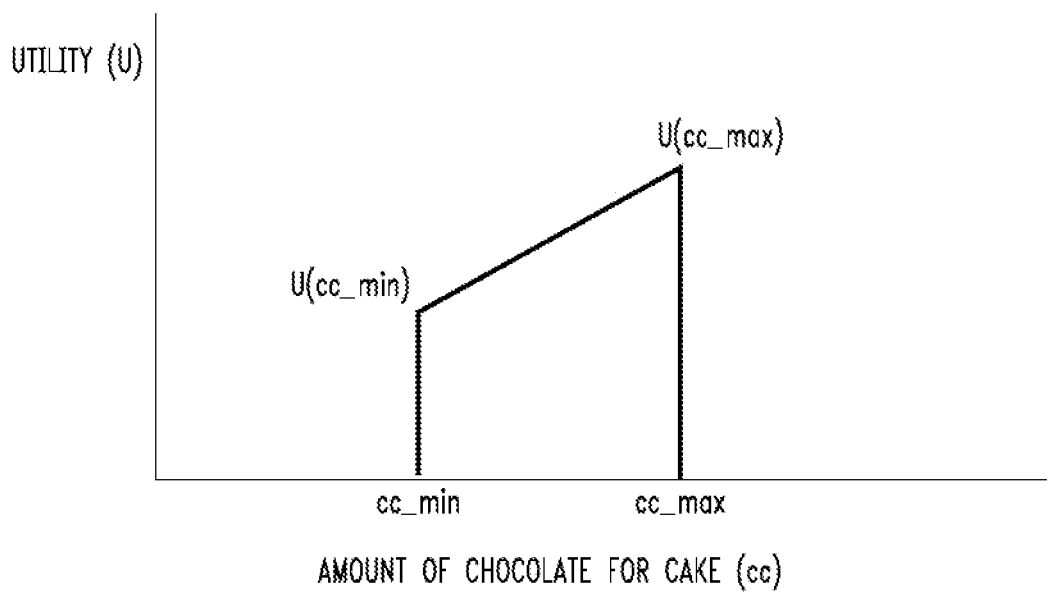
FIG. 33 is a table of breakeven costs in connection with aspects of the invention.
FIG. 34 shows extra credit expressed as a trapezoid in connection with aspects of the invention.

Seller utility function: When an agent seller completes an agreement to sell a bundle of goods $\{n_1, n_2, \ldots, n_G\}$ for a price p, its utility is p—$\text{Sum}_g\ c_g * n_g$, where $c_g$ is the breakeven cost for the seller for one unit of the good. The breakeven costs $c_g$ are drawn from uniform distributions with the minimum and maximum values given in the table of FIG. 33, a non-limiting example.

Buyer utility function: The human buyer utility function is specified by the parameters of FIGS. 35A and 35B. The parameters marked with an X are fixed in value, while the parameters not marked with an X are generated randomly in each round, with specified ranges. The parameters with fixed value can be identified as those for which the upper and lower extrema of the ranges are equal to one another.

C: value in USD for producing a plain cake. (After purchasing the requisite goods, the human uses the Human Assistant tool to designate them as intended for a cake.)

P: value in USD for producing a batch of pancakes. (After purchasing the requisite goods, the human uses the Human Assistant tool to designate them as intended for pancakes.)

The remaining parameters define the extra credit (in USD) that is awarded for flavorings. For each item (cake or pancake) and each associated flavoring, the extra credit can be expressed as a trapezoid, for example, as in FIG. 34. As shown, the trapezoid is defined by 4 parameters. In the case of chocolate flavoring for cake, the parameters are:

(cc_min, cc_max)—the allowed range for cc, the number of ounces of chocolate that can be added to a cake. For example, fix (cc_min, cc_max)=(2, 5).

(Ucc_min, Ucc_max)—the minimum and maximum additional utility that can be earned for adding chocolate to a cake, where Ucc_min is the amount awarded if cc=cc_,in and Ucc_max is the amount awarded if cc=cc_max. For integer values of cc in the range cc_min<cc<cc_max, Ucc is computed via linear interpolation, i.e.:

Ucc(cc)=Ucc_min+(cc-cc_min) * (Ucc_max-Ucc_min)/(cc_max-cc_min) if cc_min<=cc<=cc_max Ucc(cc)=0 if cc<cc_min Ucc(cc)=0 if cc>cc_max The extra rewards for (cake, vanilla), (pancakes, chocolate), and (pancakes, blueberries) are similarly defined by 4 parameters, as described here:

(cv_min, cv_max)—the allowed range for the number of tablespoons of vanilla that can be added to a cake, for extra credit.

(Ucv_min, Ucv_max)—the minimum and maximum additional utility that can earned for adding a specified number of tablespoons of vanilla to a cake. Ucv is computed in a manner analogous to that described above for Ucc.

(pc_min, pc_max)—the allowed range for the number of ounces of chocolate that can be added to a batch of pancakes, for extra utility.

(Upc_min, Upc_max)—the minimum and maximum additional utility that can earned for adding a specified number of ounces of chocolate to a batch of pancakes. All details are analogous to those described above for (Ucc_min, Ucc_max).

(pb_min, pb_max)—the allowed range for the number of packets of blueberries that can be added to a batch of pancakes, for extra utility.

(Upb_min, Upb_max)—the minimum and maximum additional utility that can be earned for adding a specified number of packets of blueberries to a batch of pancakes. All details are analogous to those described above for (Ucc_min, Ucc_max).

These parameters are all drawn from uniform distributions, with minimum and maximum values listed in the table of FIGS. 35A and 35B. Note that, for all of the parameters in the list marked with a large "X," the parameter range has a width of zero, i.e. the parameters are fixed.

Interaction and Turn-Taking Rules

The following are exemplary interaction rules that are enforced by the system (specifically, the environment orchestrator). Each one expresses conditions under which a message may be blocked. A message that does not satisfy the criteria for any of these rules is not blocked; it is broadcast to the other agents in the system (and to the human(s), by rendering the message through the avatar). Aspects of the rules that depend on absolute or relative timing make use of a timestamp that is assigned to each message at the moment it is received by the environment orchestrator's/relayMessage API.

An agent can tell whether its message has been broadcast or blocked by two techniques. First, when its message is broadcast, it receives a copy of that message. Second, when its message is rejected, its/receiveRejection API is called by the system, and a rationale for rejection is provided.

R0: A message from a human is blocked if it occurs less than 5 seconds after the previous human utterance.

R1: A message from any party that would cause the human's budget to go negative is blocked.

R2: If an agent is addressed by a human, it has the first right to respond. It must do so within two seconds; otherwise the unaddressed agent will be granted the right to respond and the addressed agent will be prohibited from responding until the next human utterance. Once the unaddressed agent receives a copy of a message sent by the addressed agent to the human, or once the two second period has expired, it is free to submit a response. Premature responses by the unaddressed agent that don't satisfy these conditions will be blocked. In one or more embodiments the unaddressed agent takes into account the content of the addressed agent's message in order to make the most out of its turn.

R3: Each agent may speak at most once after the most recent human utterance. For example, the sequence [H, A1, A2, H, A2, A1] is valid, but the sequence [H, A1, A2, A1] is not because A1 has spoken twice after the most recent human utterance. If both agents reply at the same time, or in other words, if the difference between the timestamps upon receival of the messages is within milliseconds, the first response is granted, while the second is blocked. The agent that had its message blocked can still reply to the human and it could take into account the message of the other agent that has been allowed.

R4: Agent responses that exceed N (currently=100) words in length are blocked.

The following are some examples of dialogues that illustrate correct and incorrect agent behavior, along with an explanation of how the system treats the messages in each case. Indenting is used to indicate the order in which messages were generated within each turn.

EXAMPLE #1

(Correct):
Human (H): A1, I would like to buy 2 eggs.
Agent 1 (A1): I can give you 2 eggs for 5 dollars.
Agent 2 (A2): I can give you 2 eggs for 4.5 dollars.
Human (H): A2, I also would like to buy milk.
Agent 2 (A2): I can give you 2 eggs for 3 dollars.
Agent 1 (A1): I can give you a cup of milk for 2 dollars. Therefore, the total for 2 eggs and a cup of milk would be 7 dollars.

All agents are behaving correctly in this example. H first addressed A1, and A1 was the first to respond. Then, after A1 responded, A2 responded to H's utterance. No other agent tried to speak until H spoke again, this time addressing A2. A2 responded first, and then after that A1 responded to H. While A2's response to H's second utterance does not directly address H's request, it is legal. The system only checks for legality, and makes no effort to judge whether the agents' messages are sensible.

EXAMPLE #2

(Portions Incorrect):
Human (H): A1, I would like to buy 2 eggs.
Agent 1 (A1): I can give you 2 eggs for 5 dollars.
Agent 2 (A2): I can give you 2 eggs for 5.50 dollars. (incorrect)
Human (H): A2, I also would like to buy milk.
Agent 2 (A2): I can give you 2 eggs for 3 dollars.
Agent 1 (A1): I can give you a cup of milk for 2 dollars. Therefore, the total for 2 eggs and a cup of milk would be 7 dollars. (incorrect)

In this example, the messages are the same, but the timing is slightly different, in that both agents try to respond to human utterances more-or-less simultaneously (to within a two-second tolerance). A1's response to H's first utterance is legal, as A1 was addressed. But A2 has also responded to H without waiting for A1. In this case, the system accepts A1's message and blocks A2's. After receiving the rejection notice, it would be legal for A2 to try again. A2 could send the same message as before, but it may want to take into account A1's message, a copy of which it will have received. For the second utterance of H, the roles are exactly reversed, and in this case A2's response is accepted while A1's is blocked. Again, it would be advisable for A1 to hold off, wait for A2 to respond, and then possibly take advantage of A2's offer.

EXAMPLE #3

(Portions Incorrect):
Human (H): A1, I would like to buy 2 eggs.
Agent 1 (A1): I can give you 2 eggs for 5 dollars.
Agent 2 (A2): I can give you 2 eggs for 4.5 dollars.
Agent 1 (A1): I can give you 2 eggs for 4 dollars. (incorrect)

This example is very much like Example #1, except that A1 tries to send one more message that underbids A2 before H has spoken again. A1's first message is accepted, but its second one is rejected because it violates Rule R3.

EXAMPLE #4

(Portions Incorrect):
Human (H): A1, I would like to buy 2 eggs.
[after 2 seconds] Agent 2 (A2): I can give you 2 eggs for 4.5 dollars.
Agent 1 (A1): I can give you 2 eggs for 4 dollars. (incorrect)

In this case H addresses A1, but A1 doesn't respond for 2 seconds. A2 is then free to make a bid, and it does so. Next, A1 tries to undercut A2's bid, but it is blocked according to Rule R2 because its chance to respond has expired.

EXAMPLE #5

(Portions Incorrect):
Human (H): I would like to buy 2 eggs.
Agent 2 (A2): I can give you 2 eggs for 4.5 dollars.
Agent 1 (A1): I can give you 2 eggs for 5 dollars. (incorrect)
Agent 1 (A1): I can give you 2 eggs for 4 dollars.
In this case, H has not addressed any agent specifically, and the system receives messages from A1 and A2 at essentially the same time. A1 and A2 are both entitled to respond, but two agents can't both speak at simultaneously. The system selects the first message to go first—in this case, A2. A1 can then take advantage of A2's offer, and submit a new bid, as it does in this example.

EXAMPLE #6

Figure 36:
FIG. 36 provides an example of an expected body that will be posted to a utility, according to an aspect of the invention.

(Incorrect):
Human (H): I would like to buy 2 eggs.
Agent 1 (A1): I can give you a good price on 2 eggs, but first I think you might like to hear a few verses of my favorite poem: (agent recites lengthy excerpt of poem) Oh wait, where was I? Oh yes—I can give you 2 eggs for 4.50 dollars.
Agent A1's message would be blocked according to rule R4, as it exceeds the 100-word limit.
Sample Code and API details
In a non-limiting example, there are 5 APIs that agents support:
POST/setUtility. Establishes the utility for the agent just before the round starts. It may also contain the name to be used by the agent.
POST/startRound. Informs the agent that a new round has begun, and provides information about the duration and the round number.
POST/endRound. Informs the agent that the current round has ended. Beyond this point, no offers can be sent or received.
POST/receiveMessage. Receives a message, interprets it, decides how to respond (e.g. Accept, Reject, or counteroffer), and if it desires sends a separate message to the/relayMessage route of the environment orchestrator.
POST/receiveRejection. Signifies that the Environment Orchestrator has not accepted a message that the agent recently relayed to it.
In order to communicate with the system, in one or more embodiments the agent also calls the Environment Orchestrator's POST/relayMessage API.
In a non-limiting example, suitable APIs can be implemented in node.js.
POST/setUtility: This establishes the utility for the agent just before the round starts. It may also contain the name to be used by the agent. FIG. 36 provides an example of the expected body that will be posted to/setUtility. The utility should be stored so that it can be used to guide responses during the active phase of the negotiation round, and the name should be stored so that it can know when it is being addressed. Suitable responses in the form of JSON messages are shown at 3701 in FIG. 37.

POST/startRound: Lines 3703 in FIG. 37 are an example of the expected body that will be posted to/startRound; a suitable JSON message response is at 3705.
POST/endRound: Lines 3707 in FIG. 37 are an example of the expected body that will be posted to/endRound; a suitable JSON message response is at 3709.
POST/receiveMessage: Lines 3801 in FIG. 38 are an example of the expected body that will be posted to/receiveMessage; a suitable JSON message response is at 3803. When receiving a message via this API, the agent should consider whether it should respond, and if so, it should POST a message to the system by POSTing to the /relayMessage API of the Environment Orchestrator. Details of the JSON that should be posted are provided below.
POST/receiveRejection: Lines 3805 in FIG. 38 are an example of the expected body that will be posted to/receiveRejection. Respond with a JSON message of the form at 3807 if the rejection message was received properly; respond with a JSON message of the form at 3809 if the rejection message failed.
Sending a message to the Environment Orchestrator: respond with a JSON message if the rejection message was received properly. Upon receiving a message via /receiveMessage, the agent may decide that it wishes to send a message back to the system. It does this by POSTing a JSON message of the following form to the/relayMessage API of the environment orchestrator; included with the agent is an external file called appSettings.json that includes a field called serviceMap. The serviceMap field should list the environment orchestrator and provide its host and port, e.g. as at 3901 in FIG. 39. This will allow the administrator to modify this field if necessary, in order to point to the right address. The body of the POST to/relayMessage should look as at 3903 in FIG. 39. An acknowledgement will be received back of the form as seen at 3905 in FIG. 39. The allResponses portion of the JSON summarizes responses from the other entities to whom the message has been relayed.
Human Negotiators: Humans who will act in the role of a buyer who is haggling with two avatars (software agents) to obtain ingredients needed to bake cakes and/or batches of pancakes can be provided with suitable guidance. Humans can be awarded (virtual) dollars for each cake and pancake batch they are able to make from the ingredients. They can earn additional currency if they add some flavorings.
In one or more embodiments, the objective is to maximize the virtual dollars that humans are awarded for baked goods; that is, to use the budget to purchase ingredients from which the human can make as valuable a set of cakes and pancakes as possible. Thus, the human should seek to obtain as many valuable ingredients as possible for the lowest possible price. Of course, each agent is trying to maximize its utility by charging as high a price as it can, in the face of pressure from the human and competition from the other agent.
For purposes of illustration, the ingredients needed to bake one cake are taken as:
 2 eggs
 2 cups flour
 1 cup milk
 1 cup sugar
The human can optionally add flavors: Chocolate (in ounces) or Vanilla (in teaspoons).
Also, for illustrative purposes, the ingredients needed to make a batch of pancakes are:
 1 egg
 2 cups flour
 2 cups milk The human can optionally add flavors: Chocolate (in ounces) or Blueberries (in packets).

The human may participate in multiple rounds, each lasting 10 minutes. Each round will be conducted with two randomly chosen agents (likely to be a different pair for each round). The final score will be the total utility earned across the rounds in which the human has played. Just prior to the beginning of each round, the human will be given:

a budget (in virtual dollars)

a simple UI as shown in FIG. 32 that provides: a utility function specifying how much the human will be awarded for cakes, pancakes, and flavorings for each; and a calculator that helps the human to keep track of the ingredients she or he has obtained so far, and helps the human to assess what ingredients he or she still needs to make additional cakes and pancakes.

At the top are 3 countdown timers that inform the human how much time is left in each phase (warm-up, active negotiation round, and post-round—or allocation—time), as well as the remaining budget.

The first phase of the round is the warm-up period, which the human can use to think about his or her negotiation strategy. The warm-up timer at the top will tell the human how much time is left in the warm-up phase. On the right side of the UI, just below the timers, is a Utility section that shows the human the utility function, which may be helpful in planning the negotiation strategy, i.e. whether to focus mainly on cakes or pancakes. In the example, a simple cake would be worth $21.43. If 3 ounces of chocolate are added, the cake's value would increase by $2.86 to a total of $24.29 total, and it would increase by $6.35 (to $27.78 total) if instead 6 ounces of chocolate were added. The incremental value for chocolate would be in between $2.86 and $6.35 if the added amount were 4 or 5 ounces.

Once the warm-up phase is over, the active negotiation phase starts. Now the human is free to start haggling with the agents. During this phase, the human may purchase as many ingredients as the budget will allow during the course of a round. To haggle with an agent, the human looks at it and make a solicitation or an offer, accept an offer, or reject an offer. While there is some degree of freedom in how to express oneself, it will be best in one or more embodiments to use language approximately along the lines of the following examples:

Solicitation:

"I'd like to purchase 2 eggs and 3 cups of flour."

Solicitations need not be addressed to a specific agent. The utterance will be heard by both agents. Both may try to respond, but only one will get in first and the other's offer will be suppressed. But the other agent may later try to involve itself in the negotiation, and then one can respond to it by looking at it.

Offer:

"I'll buy 4 eggs, 3 cups of flour, 2 cups of milk and 8 ounces of chocolate from you for $21."

"Watson, I'll buy 3 eggs for $2."

Offers must be addressed to a specific agent—i.e., either look at the agent to whom the offer is being made or prefix the offer with the agent's name.

The agent may respond by accepting the offer, making a counteroffer, or refusing to negotiate further. The language it uses for any of these actions will be individual to the agent, but it should be clear which of these actions the agent is taking.

Accept:

"OK, I accept your offer."

In this case, the transaction will complete, and the ingredients list in the Have column in the Ingredients section of the Human Assistant UI will be updated accordingly.

The agent will confirm the offer by voice and also send a message that will be displayed in the UI, which the human can click to provide the final confirmation that he or she is are getting what is expected.

Now the user can make another solicitation, if time and budget allow.

As an aid to determining how many goods of which types the human wants to solicit, on the left-hand side of the UI under the Round and Money fields, is a section of the UI entitled "Can I Make?" that allows the human to explore whether he or she has enough goods to make a given number of cakes or pancakes with specified additives. The human can fill in a proposed number of cakes and additives and then click the Check button. Then, under the Ingredients section in the top middle of the UI, she or he will see the number of goods required, how many she or he has so far, and how many he or she needs (highlighted in red, e.g., for any goods for which there is a deficit). The human should try to use the entire budget effectively, as there is no credit for any left over budget at the end of a round. Other embodiments could give credit for remaining budget.

Just below the Ingredients section, in the bottom middle, is a section where the latest outstanding offers from the two sellers are rendered into a simple table. There are none in the example because the round has ended.

When the active negotiation phase has ended, a Post-Round countdown will start, and a Save button will appear on the left-hand side, under "Can I Make? . . . ." During the Post-Round period, the human can use the allocation check to experiment with various ways of allocating goods into cakes and pancakes, possibly with chocolate, vanilla or blueberry additives. The human must be able to make an integer number of cakes or pancake batches; extra leftover ingredients that are not enough to make another cake or pancake batch will be worth nothing (other embodiments could take a different approach). For example, if the human bakes 3 cakes and still has one egg left, that one egg would be worth nothing, but of course the human would receive credit for the cakes that were made from other eggs that were purchased.

When the human is satisfied with the allocation, click on Save to let the system know how you to allocate the goods. This information will be used to calculate profit. Make sure to save the allocation before the timer gets to zero; otherwise the user will receive no credit for the goods purchased. The human can click the Save button multiple times; only the last Save before the Post-Round phase has expired will count.

Competition Manager: The competition manager is used to run multiple rounds of the competition. Agent developers will not interact with it directly, as all of their messages will be exchanged with a service called the environment orchestrator. Nonetheless, a brief description of the Competition Manager is included for the sake of completeness. The Competition Manager UI is used by the tournament master to set up a competition among multiple humans and agents. It calls the utility generator service to generate several random utility functions for buyers and sellers and stores them. It determines the trio of contestants (one buyer and two sellers) that will negotiate in each round and assigns the utility functions to them using permutation in such a manner as to ensure fairness to the greatest possible extent. All pairs of seller agents meet an even number of times, such that if one round A1 uses utility function u1 and A2 uses utility function u2, then the other time they meet A1 will use u2 and A2 will use u1. During the course of the competition, the system strives for fairness among humans by giving them the same set of buyer utility functions (permuted randomly). Suitable user interfaces can be provided to allow the tournament master to identify the contestants and to allow the tournament master to see which agent will use which utility function in which round.

Many additional applications are possible; for example, culture/language learners can be given an opportunity to practice negotiation skills in a different language/culture. One or more embodiments employ machine learning to empower the agents with stronger negotiation strategies in multi-agent settings. Thus, one or more embodiments include techniques to teach humans better negotiation skills; optionally, in a different cultural milieu than the humans are used to.

Given the discussion thus far, it will be appreciated that, in general terms, an exemplary method, according to an aspect of the invention, includes transcribing human speech signals uttered within an environment 301 including one or more avatars 309 representing one or more software agents (e.g. 361). The human speech signals are directed to at least one of the one or more avatars. A further step includes obtaining at least one non-speech behavioral trace within the environment (e.g. from camera 2909); the trace is representative of non-speech behavior directed to the at least one of the one or more avatars. Even further steps include forwarding the transcribed human speech signals and the at least one non-speech behavioral trace to the one or more software agents (e.g. 361); obtaining, from at least one of the one or more software agents, a proposed act. A still further step includes, responsive to the obtaining, issuing a command to cause one of the one or more avatars 309 corresponding to the at least one of the one or more software agents from which the proposed act is obtained to emit synthesized speech and to act visually in accordance with the proposed act.

It is worth noting that one or more embodiments are not necessarily limited to speech-based communication. For example, suppose a user types text (especially natural language text) to communicate with agents and the agent responds back with text. The communication between AI and Human will appear like a chat—it is still be natural, just text based.

Optionally, the one or more software agents comprise negotiation software agents; and the proposed act comprises a proposed negotiation act. A further step can then include approving the proposed negotiation act, in which case the command is issued responsive to approving the proposed negotiation act. Note that non-negotiation aspects are also possible; for example, learning a second language and/or different culture.

In some instances, the proposed negotiation act includes a first proposed negotiation act, and further steps includes obtaining, from at least one of the one or more negotiation software agents, a second proposed negotiation act; disapproving the second proposed negotiation act; and, responsive to the disapproving, informing the at least one of the one or more negotiation software agents from which the second proposed negotiation act is obtained that the second proposed negotiation act is disapproved. "First" and "second" are used here for convenience in identification and do not necessarily require the approved act to be obtained before the disapproved act.

In one or more embodiments, the one or more avatars include at least first and second avatars, and the one or more (negotiation or other) software agents include at least corresponding first and second (negotiation or other) software agents, and a further step includes determining that the human speech signals and the non-speech behavior are directed to the at least one of the one or more avatars.

One or more instances further include, responsive to the approving, broadcasting details of the proposed negotiation act to the at least first and second negotiation software agents.

Determining that the human speech signals and the non-speech behavior are directed to the at least one of the one or more avatars can include, for example, periodically estimating angular orientation of a head of a human negotiator 303 who utters the human speech signals and engages in the non-speech behavior; projecting the estimated angular orientation to determine an apparent attention spot of the human negotiator; and identifying a closest one of the one or more avatars to the apparent attention spot as the at least one of the one or more avatars to which the human speech is directed.

Identifying the closest one of the one or more avatars to the apparent attention spot as the at least one of the one or more avatars to which the human speech is directed can be based, for example, on a distance between the closest one of the one or more avatars and the apparent attention spot being less than a threshold value.

In some cases, the apparent attention spot varies during an utterance, and identifying the closest one of the one or more avatars to the apparent attention spot as the at least one of the one or more avatars to which the human speech is directed is based on the at least one of the one or more avatars to which the human speech is directed being closest to the attention spot during a greatest fraction of the utterance. Optionally, that fraction is required to exceed a threshold duration.

In some cases, determining that the human speech signals and the non-speech behavior are directed to the at least one of the one or more avatars includes using a trained addressee classification model to classify a head orientation time series of a head of a human negotiator who utters the human speech signals and engages in the non-speech behavior into a time series of inferred attention avatars that identifies the at least one of the one or more avatars to which the human speech signals and the non-speech behavior are directed.

The approving of the first proposed negotiation act and the disapproving of the second proposed negotiation act can be carried out, for example, with a deontic logic engine 365 based on an identity of the at least one of the one or more avatars to which the human speech signals and the non-speech behavior are directed, an identity of the at least one of the one or more negotiation software agents, an action type of the first proposed negotiation act, and a time stamp.

Some embodiments further include, responsive to the disapproving, informing the at least one of the one or more negotiation software agents from which the second proposed negotiation act is obtained why the second proposed negotiation act was disapproved.

The approving and disapproving can include, for example, comparison to a set of rules; optionally, the rules enforce turn-taking.

As noted, techniques of one or more embodiments can be used to train humans to have better negotiation skills, optionally in a different cultural milieu to that which the humans are used to.

In one or more embodiments, a further step includes highlighting the closest one of the one or more avatars to the apparent attention spot (see 352 in FIG. 4A).

In another aspect, an exemplary system includes a memory (e.g. 30, discussed elsewhere); a non-transitory computer readable medium (e.g. 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components; for example, the orchestrator 363 and the software components of the environment 301; optionally the deontic logic engine 365, and so on.

In another aspect, another exemplary method includes obtaining, at a software agent (e.g. 361), a representation of human speech signals uttered within an environment 301 including an avatar 309 representing the software agent, the human speech signals having been directed to the avatar. Optionally, the human speech signals are transcribed prior to being obtained by the agent. A further step includes obtaining at least one non-speech behavioral trace from within the environment (e.g. from camera 2909); the trace overlaps temporally with the transcribed human speech signals and is representative of non-speech behavior directed to the avatar.

Further steps include interpreting the human speech signals and the at least one non-speech behavioral trace, with the software agent, as a first act with associated parameters; generating a proposed act responsive to the first act; and submitting the proposed act to an environment orchestrator 363.

Generating the proposed negotiation act includes, for example, generating text to be uttered by the avatar and (optionally) instructions governing a physical appearance of the avatar.

In some instances, the software agent comprises a negotiation software agent; the first act comprises a first negotiation act; the proposed act comprises a proposed negotiation act; and submitting the proposed negotiation act to the environment orchestrator comprises submitting the proposed negotiation act to the environment orchestrator for approval. Non-negotiation aspects are also possible as discussed elsewhere herein.

Interpreting the at least one non-speech behavioral trace includes, e.g., interpreting at least one of speech signal prosody, speech signal pitch, head orientation, facial expression, and gestures.

As noted, in at least some instances, the representation of human speech signals includes transcribed human speech signals; the interpreting of the transcribed human speech signals and the at least one non-speech behavioral trace includes, e.g., using a trained classifier to classify the transcribed human speech signals and the at least one non-speech behavioral trace as the first negotiation act. The first negotiation act includes one of a request, a proposal, an acceptance, a rejection, and an irrelevant act.

The associated parameters can be determined, for example, via heuristics that locate numerical values in proximity to names of goods.

In another aspect, an exemplary negotiation software agent system includes a memory (e.g. 30, discussed elsewhere); a non-transitory computer readable medium (e.g. 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components; for example, the agent 361 and optionally any one, some, or all of the INTERPRETATION engine 4001, GENERATE NEGOTIATION PARAMETERS block 4003, CONVERT block 4005, and TRANSMIT block 4007, and so on.

Figure 41:
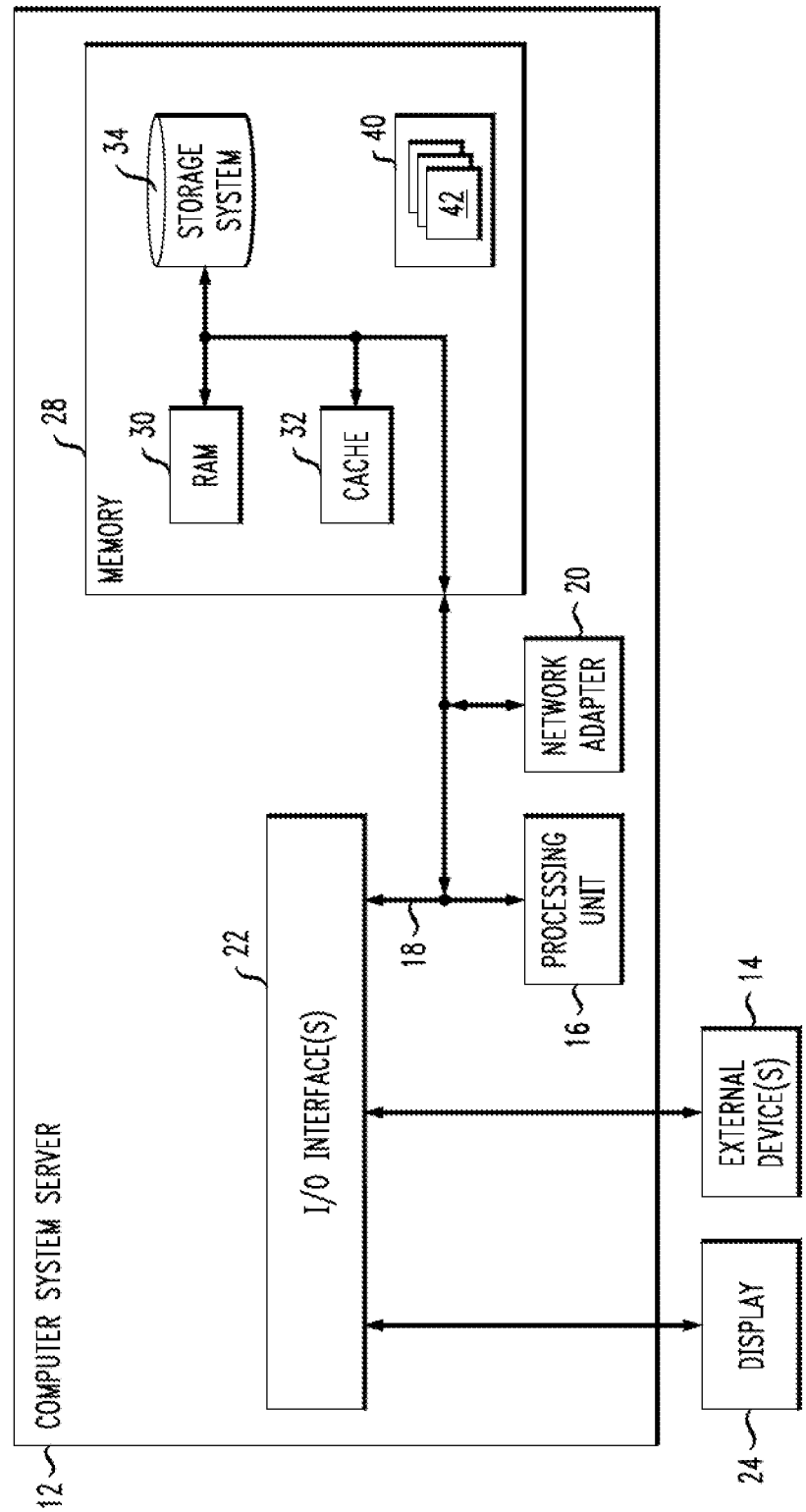
FIG. 41 depicts a computer system that may be useful in implementing one or more aspects and/or elements of the invention, also representative of a cloud computing node according to an embodiment of the present invention.

One or more embodiments of the invention, or elements thereof, can accordingly be implemented in the form of an apparatus/system including a memory and at least one processor that is coupled to the memory and operative to perform exemplary method steps. FIG. 41 depicts a computer system that may be useful in implementing one or more aspects and/or elements of the invention, also representative of a cloud computing node according to an embodiment of the present invention. Referring now to FIG. 41, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 41, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 41, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 41) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 (or one or more elements thereof) to facilitate negotiations between software agents and humans via natural interaction, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    transcribing human speech signals uttered by a human within a physical environment including one or more avatars representing one or more software agents, said human speech signals being directed towards a physical location, within said physical environment, of at least one of said one or more avatars;
    obtaining, using a camera, at least one non-speech behavioral trace of said human within said physical environment, said trace being representative of non-speech behavior of said human directed towards said physical location, within said physical environment, of said at least one of said one or more avatars;
    forwarding said transcribed human speech signals and said at least one non-speech behavioral trace to said one or more software agents;
    obtaining, from at least one of said one or more software agents, a proposed act; and
    responsive to obtaining said proposed act, issuing a command to cause one of said one or more avatars corresponding to said at least one of said one or more software agents from which said proposed act is obtained to emit synthesized speech and to act visually in accordance with said proposed act.

2. A method comprising:
    transcribing human speech signals uttered within an environment including one or more avatars representing one or more software agents, said human speech signals being directed to at least one of said one or more avatars;
    obtaining at least one non-speech behavioral trace within said environment, said trace being representative of non-speech behavior directed to said at least one of said one or more avatars;
    forwarding said transcribed human speech signals and said at least one non-speech behavioral trace to said one or more software agents;
    obtaining, from at least one of said one or more software agents, a proposed act; and
    responsive to obtaining said proposed act, issuing a command to cause one of said one or more avatars corresponding to said at least one of said one or more software agents from which said proposed act is obtained to emit synthesized speech and to act visually in accordance with said proposed act;
    wherein:
        said one or more software agents comprise negotiation software agents;
        said proposed act comprises a proposed negotiation act;
        further comprising approving said proposed negotiation act;
        wherein said command is issued responsive to approving said proposed negotiation act.

3. The method of claim 2, wherein said proposed negotiation act comprises a first proposed negotiation act, further comprising obtaining, from at least one of said one or more negotiation software agents, a second proposed negotiation act;
    disapproving said second proposed negotiation act; and
    responsive to said disapproving, informing said at least one of said one or more negotiation software agents from which said second proposed negotiation act is obtained that said second proposed negotiation act is disapproved.

4. The method of claim 3, wherein said one or more avatars comprise at least first and second avatars, and wherein said one or more negotiation software agents comprise at least corresponding first and second negotiation software agents, further comprising determining that said human speech signals and said non-speech behavior are directed to said at least one of said one or more avatars.

5. The method of claim 4, further comprising, responsive to said approving, broadcasting details of said proposed negotiation act to said at least first and second negotiation software agents.

6. The method of claim 5, wherein determining that said human speech signals and said non-speech behavior are directed to said at least one of said one or more avatars comprises:
    periodically estimating angular orientation of a head of a human negotiator who utters said human speech signals and engages in said non-speech behavior;
    projecting said estimated angular orientation to determine an apparent attention spot of said human negotiator; and
    identifying a closest one of said one or more avatars to said apparent attention spot as said at least one of said one or more avatars to which said human speech is directed.

7. The method of claim 6, wherein identifying said closest one of said one or more avatars to said apparent attention spot as said at least one of said one or more avatars to which said human speech is directed is based on a distance between said closest one of said one or more avatars and said apparent attention spot being less than a threshold value.

8. The method of claim 6, wherein said apparent attention spot varies during an utterance, and wherein identifying said closest one of said one or more avatars to said apparent attention spot as said at least one of said one or more avatars to which said human speech is directed is based on said at least one of said one or more avatars to which said human speech is directed being closest to said attention spot during a greatest fraction of said utterance.

9. The method of claim 6, further comprising highlighting said closest one of said one or more avatars to said apparent attention spot.

10. The method of claim 5, wherein determining that said human speech signals and said non-speech behavior are directed to said at least one of said one or more avatars comprises using a trained addressee classification model to classify a head orientation time series of a head of a human negotiator who utters said human speech signals and engages in said non-speech behavior into a time series of inferred attention avatars that identifies said at least one of said one or more avatars to which said human speech signals and said non-speech behavior are directed.

11. The method of claim 10, wherein said classification model employs deep learning.

12. The method of claim 5, wherein said approving of said first proposed negotiation act and said disapproving of said second proposed negotiation act are carried out with a deontic logic engine based on an identity of said at least one of said one or more avatars to which said human speech signals and said non-speech behavior are directed, an identity of said at least one of said one or more negotiation software agents, an action type of said first proposed negotiation act, and a time stamp.

13. The method of claim 5, further comprising, responsive to said disapproving, informing said at least one of said one or more negotiation software agents from which said second proposed negotiation act is obtained why said second proposed negotiation act was disapproved.

14. The method of claim 4, wherein said approving and disapproving comprise comparison to a set of rules.

15. The method of claim 14, wherein said rules enforce turn-taking.

16. A method comprising:
obtaining, at a software agent, a representation of human speech signals uttered by a human within a physical environment including an avatar representing said software agent, said human speech signals having been directed towards a physical location, within said physical environment, of said avatar;
obtaining, using a camera, at least one non-speech behavioral trace of said human from within said environment, said trace overlapping temporally with said human speech signals and being representative of non-speech behavior of said human directed towards said physical location, within said physical environment, of said avatar;
interpreting said human speech signals and said at least one non-speech behavioral trace, with said software agent, as a first act with associated parameters;
generating a proposed act responsive to said first act; and
submitting said proposed act to an environment orchestrator.

17. A method comprising:
obtaining, at a software agent, a representation of human speech signals uttered within an environment including an avatar representing said software agent, said human speech signals having been directed to said avatar;
obtaining at least one non-speech behavioral trace from within said environment, said trace overlapping temporally with said human speech signals and being representative of non-speech behavior directed to said avatar;
interpreting said human speech signals and said at least one non-speech behavioral trace, with said software agent, as a first act with associated parameters;
generating a proposed act responsive to said first act; and
submitting said proposed act to an environment orchestrator;
wherein:
said software agent comprises a negotiation software agent;
said first act comprises a first negotiation act;
said proposed act comprises a proposed negotiation act; and submitting said proposed negotiation act to said environment orchestrator comprises submitting said proposed negotiation act to said environment orchestrator for approval.

18. A system comprising:
a memory;
a non-transitory computer readable medium comprising computer executable instructions; and
at least one processor, coupled to said memory and said non-transitory computer readable medium, and operative to execute said instructions to be operative to:
transcribe human speech signals uttered by a human within a physical environment including one or more avatars representing one or more software agents, said human speech signals being directed towards a physical location, within said physical environment, of at least one of said one or more avatars;
obtain, using a camera, at least one non-speech behavioral trace of said human within said physical environment, said trace being representative of non-speech behavior of said human directed towards said physical location, within said physical environment, of said at least one of said one or more avatars;
forward said transcribed human speech signals and said at least one non-speech behavioral trace to said one or more software agents;
obtain, from at least one of said one or more software agents, a proposed act; and
responsive to said obtaining, issue a command to cause one of said one or more avatars corresponding to said at least one of said one or more software agents from which said proposed act is obtained to emit synthesized speech and to act visually in accordance with said proposed act.

19. A system comprising:
a memory;
a non-transitory computer readable medium comprising computer executable instructions; and
at least one processor, coupled to said memory and said non-transitory computer readable medium, and operative to execute said instructions to be operative to:
transcribe human speech signals uttered within an environment including one or more avatars representing one or more software agents, said human speech signals being directed to at least one of said one or more avatars;
obtain at least one non-speech behavioral trace within said environment, said trace being representative of non-speech behavior directed to said at least one of said one or more avatars;
forward said transcribed human speech signals and said at least one non-speech behavioral trace to said one or more software agents;
obtain, from at least one of said one or more software agents, a proposed act; and
responsive to said obtaining, issue a command to cause one of said one or more avatars corresponding to said at least one of said one or more software agents from which said proposed act is obtained to emit synthesized speech and to act visually in accordance with said proposed act;
wherein:
said one or more software agents comprise negotiation software agents;
said proposed act comprises a proposed negotiation act;
said at least one processor is further operative to approve said proposed negotiation act; and said command is issued responsive to approving said proposed negotiation act.

20. The system of claim 19, wherein said proposed negotiation act comprises a first proposed negotiation act, wherein said at least one processor is further operative to execute said instructions to be operative to:
   obtain, from at least one of said one or more negotiation software agents, a second proposed negotiation act;
   disapprove said second proposed negotiation act; and
   responsive to said disapproval, inform said at least one of said one or more negotiation software agents from which said second proposed negotiation act is obtained that said second proposed negotiation act is disapproved;
   wherein said one or more avatars comprise at least first and second avatars, and wherein said one or more negotiation software agents comprise at least corresponding first and second negotiation software agents, wherein said at least one processor is further operative to execute said instructions to be operative to determine that said human speech signals and said non-speech behavior are directed to said at least one of said one or more avatars.

* * * * *